(12) United States Patent
Lim et al.

(10) Patent No.: US 11,891,571 B2
(45) Date of Patent: Feb. 6, 2024

(54) ELECTROCHROMIC COMPOSITE, ELECTROCHROMIC ELEMENT COMPRISING SAME, AND MANUFACTURING METHOD FOR ELECTROCHROMIC ELEMENT

(71) Applicant: LG CHEM, LTD., Seoul (KR)

(72) Inventors: Bogyu Lim, Daejeon (KR); Jiyoung Lee, Daejeon (KR); Songrim Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 511 days.

(21) Appl. No.: 16/607,760

(22) PCT Filed: Sep. 28, 2018

(86) PCT No.: PCT/KR2018/011526
§ 371 (c)(1),
(2) Date: Oct. 24, 2019

(87) PCT Pub. No.: WO2019/066553
PCT Pub. Date: Apr. 4, 2019

(65) Prior Publication Data
US 2021/0284902 A1    Sep. 16, 2021

(30) Foreign Application Priority Data

Sep. 28, 2017 (KR) ......................... 10-2017-0126180
Mar. 28, 2018 (KR) ......................... 10-2018-0035643

(51) Int. Cl.
*C09K 9/02* (2006.01)
*G02F 1/1516* (2019.01)
(Continued)

(52) U.S. Cl.
CPC .............. *C09K 9/02* (2013.01); *C08G 61/126* (2013.01); *C08K 9/10* (2013.01); *G02F 1/155* (2013.01);
(Continued)

(58) Field of Classification Search
CPC ......................................................... C09K 9/02
See application file for complete search history.

(56) References Cited

U.S. PATENT DOCUMENTS 8,284,473 B2   10/2012 Reynolds et al.
11,094,899 B2 * 8/2021 Shimizu ........... G06K 19/07724
(Continued)

FOREIGN PATENT DOCUMENTS

CN    103777424    5/2014
CN    104774432    7/2015
(Continued)

OTHER PUBLICATIONS

Ikeda et al. "Single-Walled Carbon Nanotubes Template the One-Dimensional Ordering of a Polythiophene Derivative" Organic Letters, 8(24):5489-5492 (2006).
(Continued)

*Primary Examiner* — William D Young
(74) *Attorney, Agent, or Firm* — Myers Bigel, P.A.

(57) ABSTRACT

The present application relates to an electrochromic composite, an electrochromic device comprising the same, and a method for manufacturing an electrochromic device.

12 Claims, 14 Drawing Sheets

(51) Int. Cl.
*C08G 61/12* (2006.01)
*C08K 9/10* (2006.01)
*G02F 1/155* (2006.01)
*C01B 32/174* (2017.01)
*B82Y 20/00* (2011.01)
*B82Y 30/00* (2011.01)
*B82Y 40/00* (2011.01)

(52) U.S. Cl.
CPC .......... *G02F 1/15165* (2019.01); *B82Y 20/00* (2013.01); *B82Y 30/00* (2013.01); *B82Y 40/00* (2013.01); *C01B 32/174* (2017.08); *C08G 2261/3223* (2013.01); *C09K 2211/1011* (2013.01); *C09K 2211/1014* (2013.01); *C09K 2211/1051* (2013.01); *C09K 2211/1458* (2013.01); *G02F 2001/1552* (2013.01); *G02F 2001/1555* (2013.01); *G02F 2201/12* (2013.01); *G02F 2202/022* (2013.01); *G02F 2202/36* (2013.01)

(56) References Cited

U.S. PATENT DOCUMENTS

| | | | |
|---|---|---|---|
| 2006/0018231 A1* | 1/2006 | Kojima | G11B 7/24 |
| 2011/0049480 A1* | 3/2011 | Park | C08G 61/126 |
| | | | 257/E51.027 |
| 2011/0233532 A1 | 9/2011 | Sotzing et al. | |
| 2017/0200898 A1* | 7/2017 | Noh | H01L 51/0048 |
| 2017/0315384 A1* | 11/2017 | Saylor | G02C 7/104 |

FOREIGN PATENT DOCUMENTS

| | | |
|---|---|---|
| JP | 2004115778 A | 4/2004 |
| KR | 1020070071731 | 7/2007 |
| KR | 101368125 | 12/2010 |
| KR | 1020110021275 | 3/2011 |
| KR | 1020110132858 | 12/2011 |
| KR | 101735207 | 5/2017 |
| WO | 2014059802 | 4/2014 |

OTHER PUBLICATIONS

English translation of International Search Report corresponding to International Patent Application No. PCT/KR2018/011526 (2 pages) (dated Feb. 26, 2019).

Ko et al. "Multicolored Electrochromism of a Poly{1,4-bis[2-(3,4-ethylenedioxy)thienyl]benzene} Derivative Bearing Viologen Functional Groups" Advanced Functional Materials, 15:905-909 (2005).

Lee et al. "Effect of Polymer Gate Dielectrics on Charge Transport in Carbon Nanotube Network Transistors: Low-k Insulator for Favorable Active Interface" ACS Applied Materials & Interfaces, 8(47):32421-32431 (2016).

* cited by examiner

ELECTROCHROMIC COMPOSITE, ELECTROCHROMIC ELEMENT COMPRISING SAME, AND MANUFACTURING METHOD FOR ELECTROCHROMIC ELEMENT

CROSS REFERENCE TO RELATED APPLICATIONS

This application is a 35 U.S.C. § 371 national stage application of PCT International Application No. PCT/KR2018/011526, filed Sep. 28, 2018, which claims priority from Korean Patent Application No. 10-2018-0035643, filed Mar. 28, 2018, and Korean Patent Application No. 10-2017-0126180, filed Sep. 28, 2017, the contents of which are incorporated herein in their entireties by reference. The above-referenced PCT International Application was published in the Korean language as International Publication No. WO 2019/066553 A2 on Apr. 4, 2019.

TECHNICAL FIELD

The present application relates to an electrochromic composite, an electrochromic device comprising the same, and a method for manufacturing an electrochromic device.

BACKGROUND ART

An electrochromism technology is a technology changing colors of a material using an electrochemical reaction, and refers to properties of colors of a material changing reversibly while electron density changes with intercalation or deintercalation of cations in an electrode structure by an electrochemical redox reaction occurring from changes in the applied voltage.

An electrochromic device is a device having color changes by an electrochemical reaction. When a potential difference occurs in an electrochromic device due to an external electrical simulation, ions or electrons included in an electrolyte migrate into an electrochromic layer causing a redox reaction. Colors of the electrochromic device changes by the redox reaction of the electrochromic layer. A reductive electrochromic material means a material colorated when a reduction reaction (cathodic reaction) occurs and bleached when an oxidation reaction (anodic reaction) occurs. An oxidative electrochromic material means a material colorated when an oxidation reaction occurs and bleached when a reduction reaction occurs.

An electrochromic device has been very actively studied in applications such as optical shutters, displays, smart windows or electrochromic mirrors for automobiles due to exhibiting a high contrast ratio, a simple transmittance control by a driving voltage, a low driving voltage, bistability and a wide viewing angle.

DISCLOSURE

Technical Problem

The present application is directed to providing an electrochromic composite, an electrochromic device comprising the same, and a method for manufacturing an electrochromic device.

Technical Solution

One embodiment of the present application provides an electrochromic composite comprising an organic compound having electrochromic properties; and a carbon nanotube having at least a part of a surface thereof covered by a polymer.

Another embodiment of the present application provides an electrochromic device comprising a first electrode; a second electrode provided opposite to the first electrode; an electrolyte layer provided between the first electrode and the second electrode; and an electrochromic layer provided between the electrolyte layer and the second electrode, wherein the electrochromic layer comprises the electrochromic composite according to one embodiment of the present application.

Still another embodiment of the present application provides a method for manufacturing an electrochromic device comprising preparing a first electrode; forming a second electrode opposite to the first electrode; forming an electrolyte layer between the first electrode and the second electrode; and forming an electrochromic layer between the electrolyte layer and the second electrode, wherein the electrochromic layer comprises the electrochromic composite according to one embodiment of the present application.

Advantageous Effects

An electrochromic device according to one embodiment of the present application uses an electrochromic composite mixing an organic compound having excellent electrochromic properties and a carbon nanotube comprising a polymer with excellent charge mobility as an electrochromic layer, and as a result, an electrochromic device enhancing electrochromic properties (electrochromic contrast) and having enhanced electrical conductivity and process condition as well can be provided.

In addition, the organic compound having electrochromic properties according to one embodiment of the present application has excellent oxidation stability, and has an excellent lifetime when used in the electrochromic device.

REFERENCE NUMERAL

Figure 1:
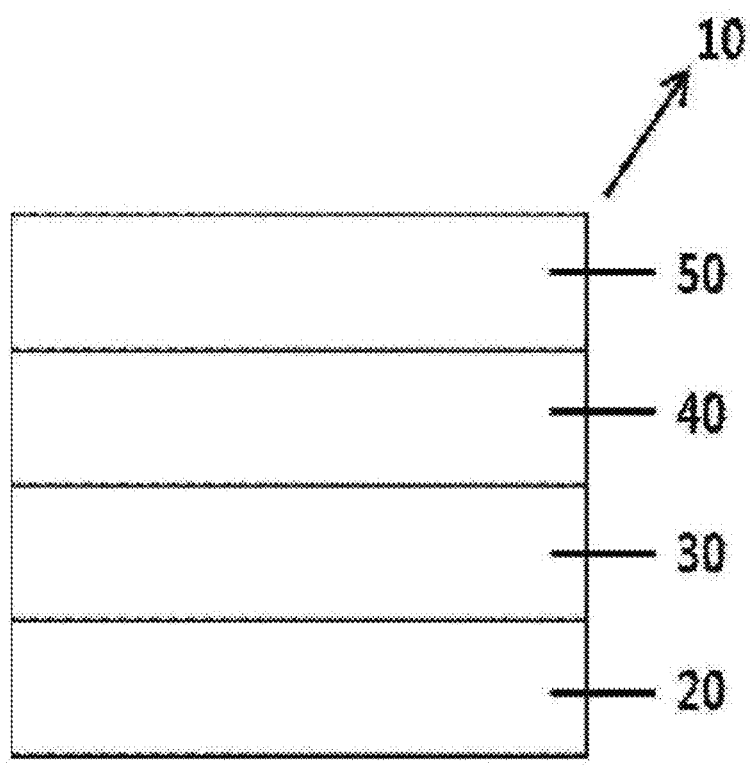
FIG. 1 is a side view of an electrochromic device according to one embodiment of the present application.

10: Electrochromic Device
20: First Electrode
30: Electrolyte Layer
40: Electrochromic Layer
50: Second Electrode

MODE FOR DISCLOSURE

Hereinafter, the present application will be described in more detail.

Embodiments of the present disclosure will be described in detail with reference to accompanying drawings so that those skilled in the art readily implement the present disclosure. However, the present disclosure may be embodied in various different forms, and is not limited to the embodiments described herein.

One embodiment of the present application provides an electrochromic composite comprising an organic compound having electrochromic properties; and a carbon nanotube having at least a part of the surface covered by a polymer.

The organic compound having electrochromic properties may comprise polymers having electrochromic properties, compounds having electrochromic properties, or the like, but is not limited thereto as long as it is a material having electrochromic properties.

Forming an electrochromic layer using a carbon material such as a carbon nanotube has a disadvantage in that a thin film may not be prepared to a uniform and thick film, and even when prepared to a thick film, transmittance may be low. Accordingly, electrochromism using only a carbon nanotube does not have favorable electrochromic contrast, and the thin film thickness is difficult to control since a carbon nanotube itself does not have favorable solubility for organic solvents.

In addition, forming an electrochromic layer using an electrochromic organic compound alone has an advantage of obtaining an excellent electrochromic contrast, but has a disadvantage of poor thermal stability, and a slow response rate due to lower charge mobility compared to other electrochromic materials such as oxide semiconductors.

In other words, an oxidation reduction reaction of an electrochromic organic compound needs to be progressed stably and fast in order for electrochromic properties to be well exhibited. A carbon nanotube may have excellent electrical conductivity properties, but has a limit to be used in a solution process by itself. A carbon nanotube may be used in electrochromism using methods other than a solution process, but, when forming a thick film, has a disadvantage of a bleached state being opaque due to decreased transmittance. A film may be formed to be thin when using a polymer-wound carbon nanotube due to favorable dispersibility, however, an electrochromic phenomenon is hardly observed by itself. Therefore, by mixing an electrochromic organic compound and a polymer-wound carbon nanotube, embodiments of the present application have an advantage of enhancing electrochromic properties of the electrochromic organic compound through introducing conductivity properties, an excellent property of the carbon nanotube.

The present application provides an electrochromic device enhancing electrochromic properties (electrochromic contrast) and having enhanced electrical conductivity and process condition as well by using a carbon nanotube having at least a part of the surface covered by a polymer to have excellent dispersibility for organic solvents, and thereby using an electrochromic composite obtained by mixing the carbon nanotube with an organic compound having excellent electrochromism in an electrochromic layer of the electrochromic device.

In the present specification, a description of a certain part "including" certain constituents means capable of further comprising other constituents, and does not exclude other constituents unless particularly stated on the contrary.

In the present specification, a description of a certain member being placed "on" another member comprises not only a case of the one member adjoining the another member but a case of still another member being present between the two members.

In the electrochromic composite provided in one embodiment of the present application, the carbon nanotube having at least a part of the surface covered by a polymer has a structure in which the polymer is wrapped by the carbon nanotube.

In addition, in the electrochromic composite provided in one embodiment of the present application, the carbon nanotube comprising a polymer has a structure in which the polymer is spirally wrapped by the carbon nanotube.

The carbon nanotube having at least a part of the surface covered by a polymer according to one embodiment of the present application may be prepared as described in ACS Appl. Mater. Interfaces, 2016, 8(47), pp 32421-32431.

Figure 2:
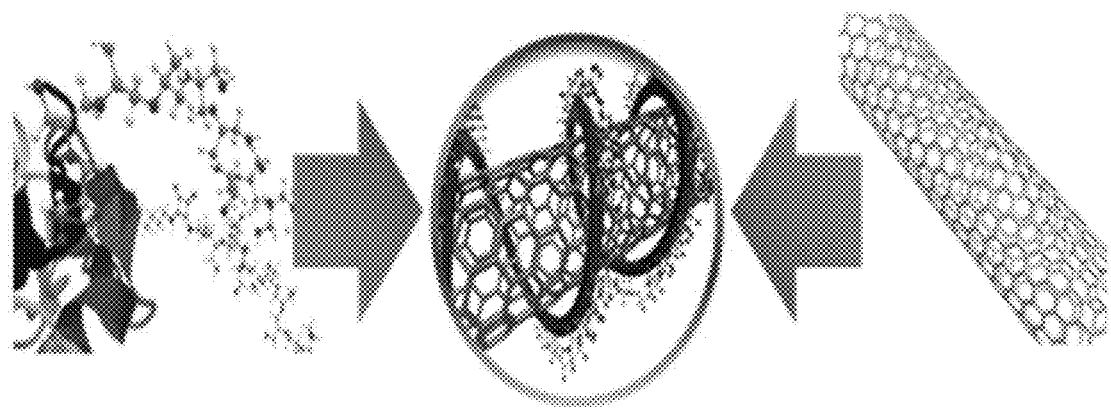
FIG. 2 is a diagram illustrating a shape of a carbon nanotube comprising a polymer according to one embodiment of the present application.

FIG. 2 is a diagram illustrating a shape of the carbon nanotube having at least a part of the surface covered by a polymer according to one embodiment of the present application. Specifically, it has a structure in which the polymer is spirally wrapped on the carbon nanotube.

In the electrochromic composite provided in one embodiment of the present application, the polymer comprises one or more selected from the group consisting of thiophene-based polymers and fluorene-based polymers.

Examples of the thiophene-based polymer may comprise poly(3-hexylthiophene) (P3HT) or poly(3-dodecylthiophene-2,5-diyl) (P3DDT), but are not limited thereto.

Examples of the fluorene-based polymer may comprise poly(9,9-di-n-octylfluorenyl-2,7-diyl) (PFO), but are not limited thereto.

In one embodiment of the present application, the polymer may be poly(3-hexylthiophene) (P3HT).

General carbon nanotubes tend to strongly aggregate and are not well-dispersed in a solvent, however, a carbon nanotube comprising the polymer may be well-dispersed compared to general carbon nanotubes due to solubility of the polymer, and the like.

In one embodiment of the present application, the organic compound and the carbon nanotube covered by the polymer may have a weight ratio of 10:1 to 400:1 and preferably 35:1 to 150:1.

In the electrochromic composite provided in one embodiment of the present application, the organic compound and the carbon nanotube covered by the polymer has a weight ratio of 10:1 to 400:1.

When the carbon nanotube mixing ratio is included in the above-mentioned range, proper transmittance is secured and charge mobility is enhanced, and as a result, an electrochromic response rate and a driving voltage may be enhanced.

As the solvent, generally used solvents may be used, and specifically, an organic solvent may be used. Specifically, the solvent is not limited as long as it is capable of dissolving organic compounds having electrochromic properties.

As the organic solvent, chlorobenzene, toluene, chloroform, 1,2-dichlorobenzene, xylene or the like may be used, and specifically, the organic solvent is not limited as long as it is capable of dissolving organic compounds having electrochromic properties.

According to one embodiment of the present application, the polymer may comprised of 30 parts by weight to 200 parts by weight, preferably in 35 parts by weight to 190 parts by weight, and more preferably in 40 parts by weight to 180 parts by weight with respect to 100 parts by weight of the carbon nanotube based on a solid content.

The polymer content being in the above-mentioned range has an advantage of increasing coloration and bleaching speeds since electrochromism is obtained even at a low voltage due to an increase in the charge mobility.

The electrochromic composite according to one embodiment of the present application has excellent processability for the organic solvent by the carbon nanotube comprising the polymer, and therefore, an electrochromic composite mixing the carbon tube with an organic compound having excellent electrochromism may be formed, and accordingly, may be used as an electrochromic layer of an electrochromic device.

In one embodiment of the present application, the polymer may have a weight average molecular weight of greater than or equal to 3,000 g/mol and less than or equal to 1,000,000 g/mol, and preferably greater than or equal to 5,000 g/mol and less than or equal to 1,000,000 g/mol.

When the polymer has a weight average molecular weight in the above-mentioned range, thermal stability of the polymer itself increases, which may increase thermal stability of an electrochromic device when using the polymer as an electrochromic layer of the electrochromic device afterword.

In one embodiment of the present application, the organic compound having electrochromic properties may be represented by any one selected from among the following Chemical Formulae 1 to 7.

[Chemical Formula 1]

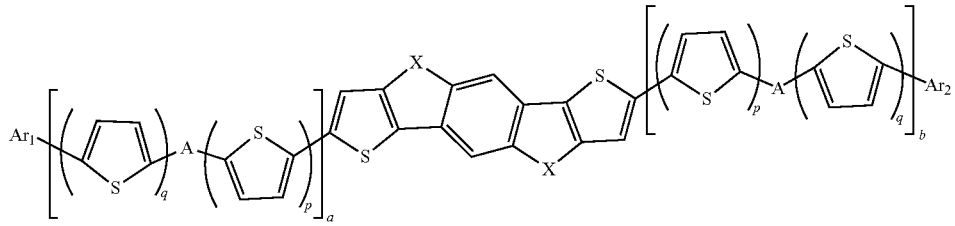

[Chemical Formula 2]

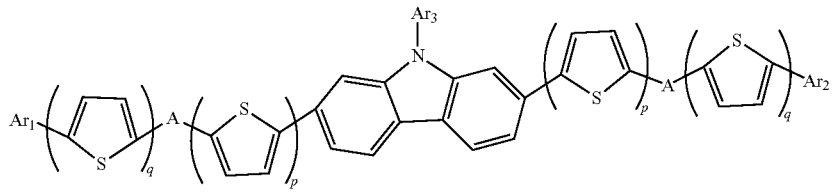

[Chemical Formula 3]

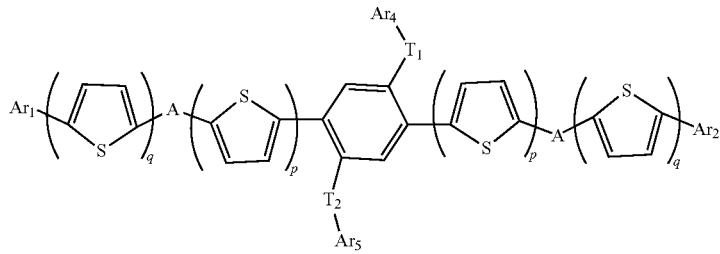

[Chemical Formula 4]

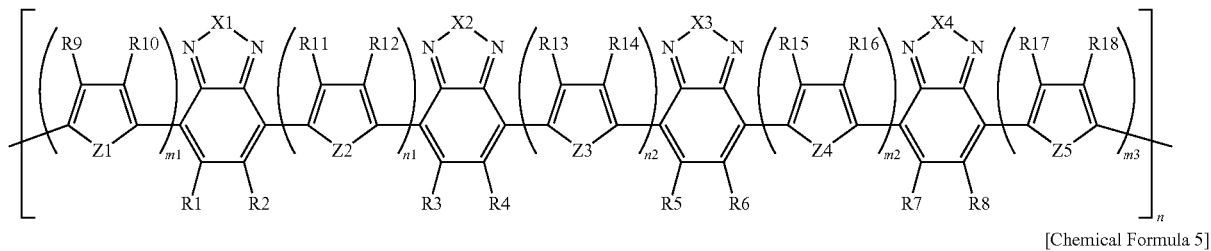

[Chemical Formula 5]

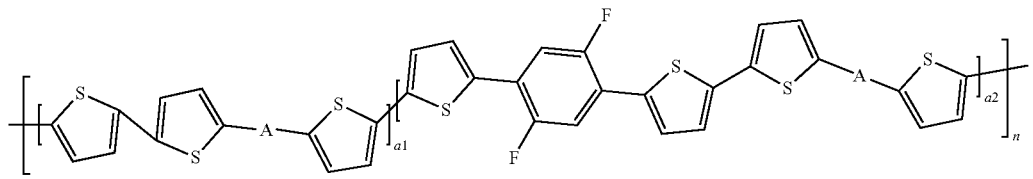

[Chemical Formula 6]

[Chemical Formula 7]

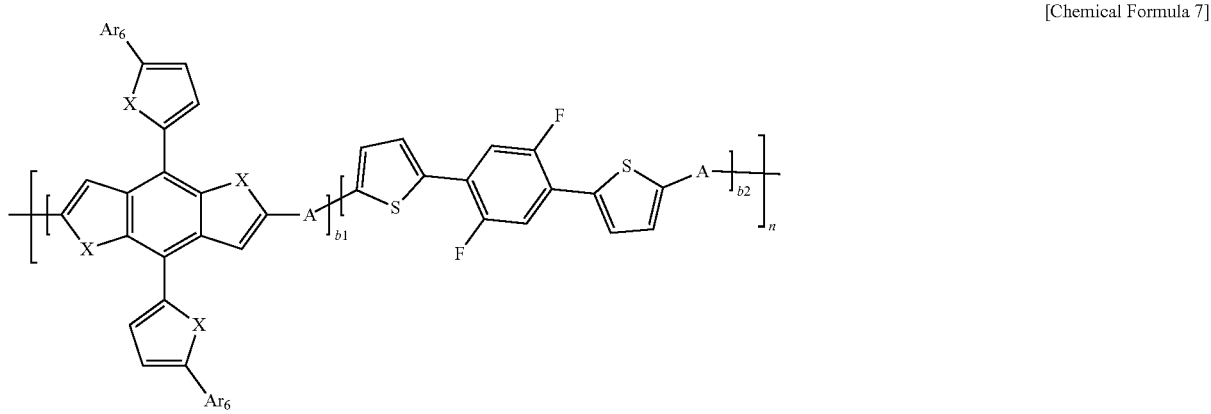

In Chemical Formulae 1 to 7,

X, X1 to X4 and Z1 to Z5 are the same as or different from each other, and each independently C=CRR'; SiRR'; O; S; or NR, Ar1 and Ar2 are the same as or different from each other, and each independently a group functioning as an electron acceptor, Ar3 to Ar6 are the same as or different from each other, and each independently hydrogen; deuterium; halogen; a substituted or unsubstituted alkyl group; a substituted or unsubstituted aryl group; a substituted or unsubstituted alkoxy group; or SiRR'R", A is a substituted or unsubstituted arylene group; or a substituted or unsubstituted heteroarylene group, T1 and T2 are the same as or different from each other, and each independently a direct bond; O; or S, R1 to R18 are the same as or different from each other, and each independently hydrogen; a halogen group; a substituted or unsubstituted alkoxy group; a substituted or unsubstituted alkyl group; a substituted or unsubstituted aryl group; or a substituted or unsubstituted heteroaryl group, R, R' and R" are the same as or different from each other, and each independently hydrogen; deuterium; a halogen group; a nitrile group; a nitro group; an imide group; an amide group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; or a substituted or unsubstituted heteroaryl group, p and q are each an integer of 0 to 5, a and b are each an integer of 0 to 3, n is an integer of 1 to 1000, a1 is a number of 0<a1<1 and a2 is a number of 0<a2<1, b1 is a number of 0<b1<1 and b2 is a number of 0<b2<1, a1+a2 and b1+b2 are an integer of 1, and m1, m2, m3, n1 and n2 are each an integer of 0 to 4.

In the present application, the organic compound according to Chemical Formulae 4 to 7 may have a weight average molecular weight of greater than or equal to 1000 g/mol and less than or equal to 100000 g/mol, and preferably greater than or equal to 10000 g/mol and less than or equal to 70000 g/mol.

In the present specification,

and

mean a site linked to other substituents.

Examples of the substituents are described below, however, the substituents are not limited thereto.

In the present specification, the term "substituted or unsubstituted" means being substituted with one or more substituents selected from the group consisting of deuterium; a halogen group; a nitrile group; a nitro group; a hydroxyl group; a carbonyl group; an ester group; an imide group; an amino group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkylamine group; an aralkylamine group; a heteroarylamine group; an arylamine group; an arylphosphine group; and a heterocyclic group, or being unsubstituted, or being substituted with a substituent linking two or more substituents among the substituents illustrated above, or being unsubstituted. For example, "a substituent linking two or more substituents" may comprise a biphenyl group. In other words, a biphenyl group may be an aryl group, or may be interpreted as a substituent linking two phenyl groups.

In the present specification, examples of the halogen group comprise fluorine, chlorine, bromine or iodine.

In the present specification, the number of carbon atoms of the carbonyl group is not particularly limited, but is preferably from 1 to 40. Specifically, compounds having structures as below may be included, however, the carbonyl group is not limited thereto.

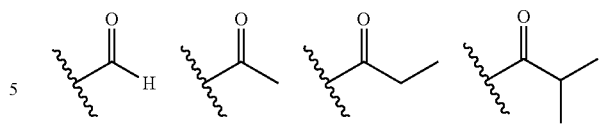
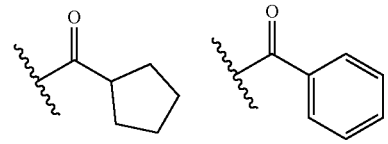
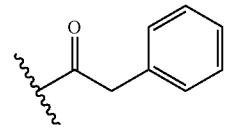

In the present specification, in the ester group, the oxygen of the ester group may be substituted with a linear, branched or cyclic alkyl group having 1 to 40 carbon atoms or an aryl group having 6 to 30 carbon atoms. Specifically, compounds having the following structural formulae may be included, however, the ester group is not limited thereto.

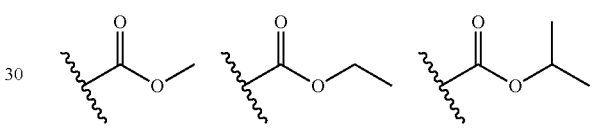
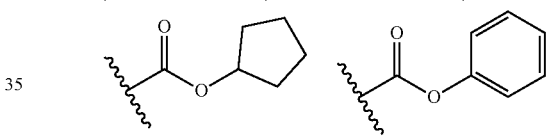
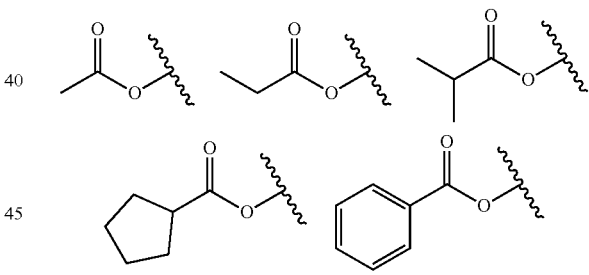

In the present specification, the number of carbon atoms of the imide group is not particularly limited, but is preferably from 1 to 25. Specifically, compounds having structures as below may be included, however, the imide group is not limited thereto.

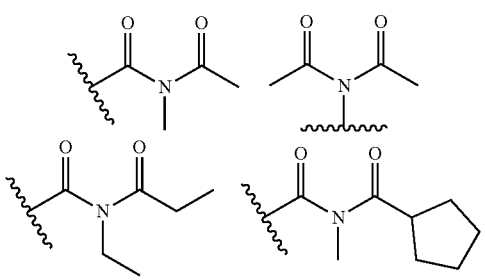

-continued

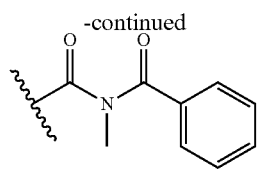

In the present specification, the silyl group may be represented by a chemical formula of —SiRaRbRc, and Ra, Rb and Rc may each be hydrogen; a substituted or unsubstituted alkyl group; or a substituted or unsubstituted aryl group. Specific examples of the silyl group may comprise a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group and the like, but are not limited thereto.

In the present specification, the boron group may be represented by a chemical formula of —BRaRbRc, and Ra, Rb and Rc may each be hydrogen; a substituted or unsubstituted alkyl group; or a substituted or unsubstituted aryl group. Specific examples of the boron group may comprise a trimethylboron group, a triethylboron group, a t-butyldimethylboron group, a triphenylboron group, a phenylboron group and the like, but are not limited thereto.

In the present specification, the alkyl group may be linear or branched, and although not particularly limited thereto, the number of carbon atoms is preferably from 1 to 40. According to one embodiment, the number of carbon atoms of the alkyl group is from 1 to 20. According to another embodiment, the number of carbon atoms of the alkyl group is from 1 to 10. According to another embodiment, the number of carbon atoms of the alkyl group is from 1 to 6. Specific examples of the alkyl group may comprise a methyl group, an ethyl group, a propyl group, an n-propyl group, an isopropyl group, a butyl group, an n-butyl group, an isobutyl group, a tert-butyl group, a sec-butyl group, a 1-methylbutyl group, a 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, 1-ethyl-propyl group, a 1,1-dimethyl-propyl group, an isohexyl group, a 4-methylhexyl group, a 5-methylhexyl group and the like, but are not limited thereto.

In the present specification, the alkoxy group may be linear, branched or cyclic. The number of carbon atoms of the alkoxy group is not particularly limited, but is preferably from 1 to 40. Specific examples thereof may comprise methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

The alkyl group, the alkoxy group and other substituents comprising an alkyl group part described in the present specification comprise both a linear or a branched form.

In the present specification, the alkenyl group may be linear or branched, and although not particularly limited thereto, the number of carbon atoms is preferably from 2 to 40. According to one embodiment, the number of carbon atoms of the alkenyl group is from 2 to 20. According to another embodiment, the number of carbon atoms of the alkenyl group is from 2 to 10. According to another embodiment, the number of carbon atoms of the alkenyl group is from 2 to 6. Specific examples thereof may comprise vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the cycloalkyl group is not particularly limited, but preferably has 3 to 60 carbon atoms, and according to one embodiment, the number of carbon atoms of the cycloalkyl group is from 3 to 40. According to another embodiment, the number of the carbon atoms of the cycloalkyl group is from 3 to 20. According to another embodiment, the number of carbon atoms of the cycloalkyl group is from 3 to 6. Specific examples thereof may comprise cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the number of carbon atoms of the alkylamine group is not particularly limited, but is preferably from 1 to 40. Specific examples of the alkylamine group may comprise a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group and the like, but are not limited thereto.

In the present specification, examples of the arylamine group comprise a substituted or unsubstituted monoarylamine group, a substituted or unsubstituted diarylamine group, or a substituted or unsubstituted triarylamine group. The aryl group in the arylamine group may be a monocyclic aryl group or a polycyclic aryl group. The arylamine group comprising two or more aryl groups may comprise monocyclic aryl groups, polycyclic aryl groups, or both monocyclic aryl groups and polycyclic aryl groups.

Specific examples of the arylamine group may comprise phenylamine, naphthylamine, biphenylamine, anthracenylamine, 3-methyl-phenylamine, 4-methyl-naphthylamine, 2-methyl-biphenylamine, 9-methyl-anthracenylamine, a diphenylamine group, a phenylnaphthylamine group, a ditolylamine group, a phenyltolyl amine group, carbazole, a triphenylamine group and the like, but are not limited thereto.

In the present specification, examples of the heteroarylamine group comprise a substituted or unsubstituted monoheteroarylamine group, a substituted or unsubstituted diheteroarylamine group, or a substituted or unsubstituted triheteroarylamine group. The heteroaryl group in the heteroarylamine group may be a monocyclic heterocyclic group or a polycyclic heterocyclic group. The heteroarylamine group comprising two or more heterocyclic groups may comprise monocyclic heterocyclic groups, polycyclic heterocyclic groups, or both monocyclic heterocyclic groups and polycyclic heterocyclic groups.

In the present specification, examples of the arylphosphine group comprise a substituted or unsubstituted monoarylphosphine group, a substituted or unsubstituted diarylphosphine group, or a substituted or unsubstituted triarylphosphine group. The aryl group in the arylphosphine group may be a monocyclic aryl group or a polycyclic aryl group. The arylphosphine group comprising two or more aryl groups may comprise monocyclic aryl groups, polycyclic aryl groups, or both monocyclic aryl groups and polycyclic aryl groups.

In the present specification, the aryl group is not particularly limited, but preferably has 6 to 60 carbon atoms, and may be a monocyclic aryl group or a polycyclic aryl group. According to one embodiment, the number of carbon atoms of the aryl group is from 6 to 30. According to one embodiment, the number of carbon atoms of the aryl group is from 6 to 20. When the aryl group is a monocyclic aryl group, examples thereof may comprise a phenyl group, a biphenyl group, a terphenyl group and the like, but are not limited thereto. Examples of the polycyclic aryl group may comprise a naphthyl group, an anthracenyl group, a phenanthryl group, a pyrenyl group, a perylenyl group, a triphenyl group, a chrysenyl group, a fluorenyl group and the like, but are not limited thereto.

In the present specification, the fluorenyl group may be substituted, and two substituents may bond to each other to form a spiro structure.

When the fluorenyl group is substituted, spirofluorenyl groups such as

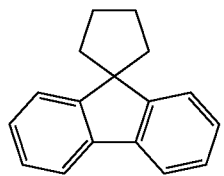 [SMILES: c1ccc2c(c1)-c1ccccc1C21CCCC1]

and

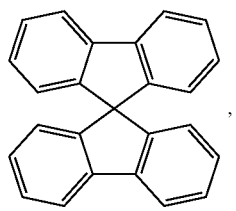 [SMILES: c1ccc2c(c1)-c1ccccc1C21c2ccccc2-c2ccccc21]

and substituted fluorenyl groups such as

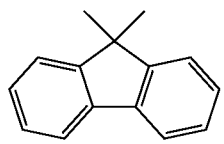

(9,9-dimethylfluorenyl group) and

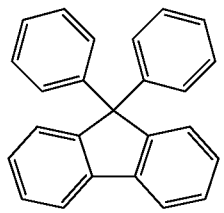 [SMILES: c1ccc(C2(c3ccccc3)c3ccccc3-c3ccccc32)cc1]

(9,9-diphenylfluorenyl group) may be included. However, the structure is not limited thereto.

In the present specification, the heterocyclic group is a heterocyclic group comprising one or more of N, O, P, S, Si and Se as a heteroatom, and although not particularly limited thereto, the number of carbon atoms is preferably from 1 to 60. According to one embodiment, the number of carbon atoms of the heterocyclic group is from 1 to 30. Examples of the heterocyclic group may comprise a pyridyl group, a pyrrole group, a pyrimidyl group, a pyridazinyl group, a furanyl group, a thiophenyl group, an imidazole group, a pyrazole group, an oxazole group, an isoxazole group, a thiazole group, an isothiazole group, a triazole group, an oxadiazole group, a thiadiazole group, dithiazole group, a tetrazole group, a pyranyl group, a thiopyranyl group, a pyrazinyl group, an oxazinyl group, a thiazinyl group, a dioxynyl group, a triazinyl group, a tetrazinyl group, a quinolinyl group, an isoquinolinyl group, a quinolyl group, a quinazolinyl group, a quinoxalinyl group, a naphthyridinyl group, an acridyl group, a xanthenyl group, a phenanthridinyl group, a diazanaphthalenyl group, a triazaindenyl group, an indole group, an indolinyl group, an indolizinyl group, a phthalazinyl group, a pyridopyrimidinyl group, a pyridopyrazinyl group, a pyrazinopyrazinyl group, a benzothiazole group, a benzoxazole group, a benzimidazole group, a benzothiophene group, benzofuranyl group, a dibenzothiophenyl group, a dibenzofuranyl group, a carbazole group, a benzocarbazole group, a dibenzocarbazole group, an indolocarbazole group, an indenocarbazole group, a phenazinyl group, an imidazopyridine group, a phenoxazinyl group, a phenanthridine group, a phenanthroline group, a phenothiazine group, an imidazopyridine group, an imidazophenanthridine group, a benzimidazoquinazoline group, a benzimidazophenanthridine group or the like, but are not limited thereto.

In the present specification, descriptions on the heterocyclic group provided above may be applied to the heteroaryl group except for being aromatic.

In the present specification, descriptions on the aryl group provided above may be applied to the aryl group in the aryloxy group, the arylthioxy group, the arylsulfoxy group, the arylphosphine group, the aralkyl group, the aralkylamine group, the aralkenyl group, the alkylaryl group, the arylamine group and the arylheteroarylamine group.

In the present specification, descriptions on the alkyl group provided above may be applied to the alkyl group in the alkylthioxy group, the alkylsulfoxy group, the aralkyl group, the aralkylamine group, the alkylaryl group and the alkylamine group.

In the present specification, descriptions on the heterocyclic group may be applied to the heteroaryl group in the heteroaryl group, the heteroarylamine group and the arylheteroarylamine group.

In the present specification, descriptions on the alkenyl group provided above may be applied to the alkenyl group in the aralkenyl group.

In the present specification, descriptions on the aryl group provided above may be applied to the arylene group except for being divalent.

In the electrochromic composite provided in one embodiment of the present specification, Ar1 and Ar2 are the same as or different from each other, and are each any one of the following structures.

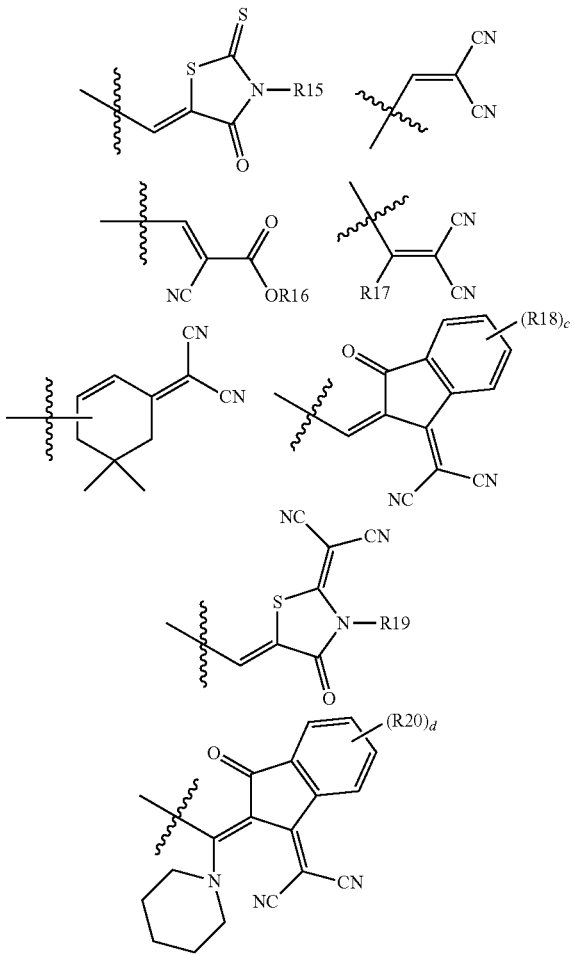

In the structures, c and d are an integer of 1 to 4, when c and d are 2 or greater, structures in the two or more parentheses are the same as or different from each other, and R15 to R20 are the same as or different from each other, and each independently hydrogen; deuterium; a halogen group; a nitrile group; a nitro group; an imide group; an amide group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; or a substituted or unsubstituted heteroaryl group.

In one embodiment of the present application, R15 to R20 are the same as or different from each other, and each independently hydrogen; a halogen group; a nitrile group; an amide group; a hydroxyl group; a substituted or unsubstituted alkyl group; a substituted or unsubstituted cycloalkyl group; a substituted or unsubstituted alkoxy group; a substituted or unsubstituted aryl group; or a substituted or unsubstituted heterocyclic group.

In one embodiment of the present application, R15 to R20 are the same as or different from each other, and each independently hydrogen; a halogen group; a substituted or unsubstituted alkyl group; a substituted or unsubstituted aryl group; or a substituted or unsubstituted heterocyclic group.

In one embodiment of the present application, R15 to R20 are the same as or different from each other, and each independently hydrogen; or a substituted or unsubstituted alkyl group.

In one embodiment of the present application, R15 to R20 are the same as or different from each other, and each independently hydrogen; or a substituted or unsubstituted alkyl group having 1 to 30 carbon atoms.

In one embodiment of the present application, R15 to R20 are the same as or different from each other, and each independently hydrogen; or a substituted or unsubstituted alkyl group having 1 to 20 carbon atoms.

In one embodiment of the present application, R15 to R20 are the same as or different from each other, and each independently hydrogen; or a substituted or unsubstituted alkyl group having 1 to 10 carbon atoms.

In one embodiment of the present application, R15 to R20 are the same as or different from each other, and each independently hydrogen; or an alkyl group having 1 to 10 carbon atoms.

In one embodiment of the present application, R18 and R20 are hydrogen.

In one embodiment of the present application, Ar1 and Ar2 are each

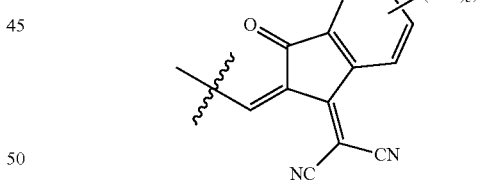

and R18 and c are the same as described above.

In one embodiment of the present application, Ar1 and Ar2 are each

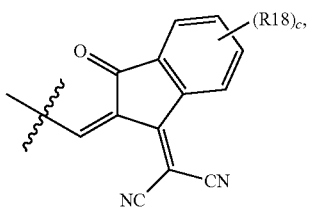

and R18 is hydrogen.

In one embodiment of the present application, Ar1 and Ar2 are each

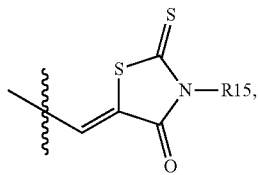

and R15 is the same as described above.

In one embodiment of the present application, Ar1 and Ar2 are each

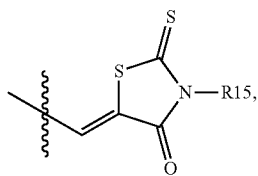

and R15 is an alkyl group having 1 to 10 carbon atoms.

In one embodiment of the present application, Ar1 and Ar2 are each

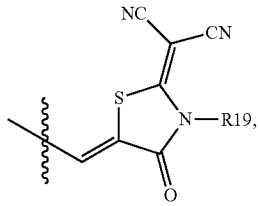

and R19 is the same as described above.

In one embodiment of the present application, Ar1 and Ar2 are each

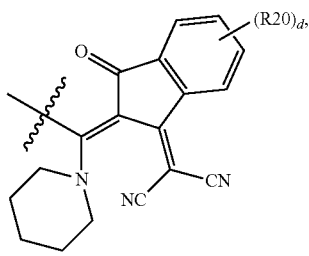

and R20 and d are the same as described above.

In one embodiment of the present application, Ar3 to Ar6 are the same as or different from each other, and each independently hydrogen; deuterium; halogen; a substituted or unsubstituted alkyl group; a substituted or unsubstituted aryl group; a substituted or unsubstituted alkoxy group; or SiRR'R".

In another embodiment, Ar3 to Ar6 are the same as or different from each other, and each independently a substituted or unsubstituted alkyl group; or SiRR'R".

In another embodiment, Ar3 to Ar6 are the same as or different from each other, and each independently a substituted or unsubstituted branched alkyl group; or SiRR'R".

In another embodiment, Ar3 to Ar6 are the same as or different from each other, and each independently a substituted or unsubstituted branched alkyl group having 3 to 30 carbon atoms; or SiRR'R".

In another embodiment, Ar3 to Ar6 are the same as or different from each other, and each independently a substituted or unsubstituted branched alkyl group having 3 to 20 carbon atoms; or SiRR'R".

In one embodiment of the present application, Ar6 may be a substituted or unsubstituted branched alkyl group having 3 to 20 carbon atoms.

In one embodiment of the present application, A may be a substituted or unsubstituted arylene group; or a substituted or unsubstituted heteroarylene group.

In the electrochromic composite provided in another embodiment, A is any one of the following structures.

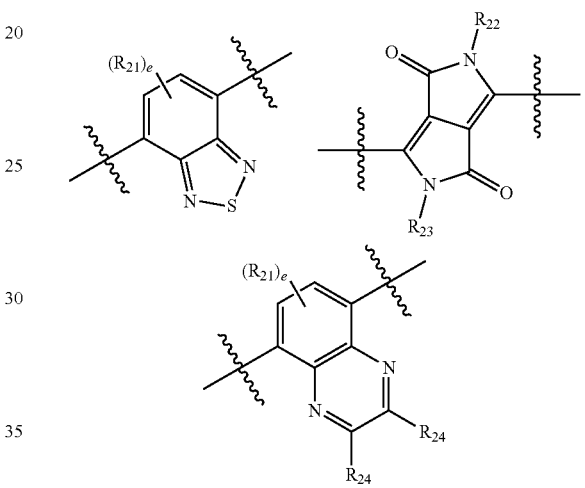

In the structures,

R21 is hydrogen; a halogen group; a substituted or unsubstituted alkyl group; a substituted or unsubstituted aryl group; or a substituted or unsubstituted heteroaryl group, R22 to R24 are the same as or different from each other, and each independently a substituted or unsubstituted alkyl group; a substituted or unsubstituted aryl group; or a substituted or unsubstituted heteroaryl group, e is an integer of 1 or 2, and when e is an integer of 2, $R_{21}$s are the same as or different from each other.

In one embodiment of the present application, R21 may be hydrogen; or a halogen group.

In another embodiment, R21 may be hydrogen; or fluorine.

In one embodiment of the present application, R22 and R23 are the same as or different from each other, and may be each independently a substituted or unsubstituted alkyl group.

In another embodiment, R22 and R23 are the same as or different from each other, and may be each independently an alkyl group unsubstituted or substituted with SiRR'R".

In one embodiment of the present application, R24 may be a substituted or unsubstituted aryl group.

In another embodiment, R24 may be a substituted or unsubstituted aryl group having 6 to 40 carbon atoms.

In another embodiment, R24 may be an aryl group having 6 to 40 carbon atoms unsubstituted or substituted with an alkoxy group having 1 to 15 carbon atoms.

In another embodiment, R24 may be an aryl group having 6 to 40 carbon atoms unsubstituted or substituted with an octyloxy group.

In one embodiment of the present application, R1 to R18 are the same as or different from each other, and may be each independently hydrogen; a halogen group; a substituted or unsubstituted alkoxy group; a substituted or unsubstituted alkyl group; a substituted or unsubstituted aryl group; or a substituted or unsubstituted heteroaryl group.

In another embodiment, R1 to R18 are the same as or different from each other, and may be each independently hydrogen; a halogen group; a substituted or unsubstituted alkoxy group; a substituted or unsubstituted alkyl group having 1 to 30 carbon atoms; a substituted or unsubstituted aryl group having 6 to 30 carbon atoms; or a substituted or unsubstituted heteroaryl group having 2 to 30 carbon atoms.

In another embodiment, R1 to R18 are the same as or different from each other, and may be each independently hydrogen; a halogen group; an alkoxy group unsubstituted or substituted with an alkyl group having 1 to 30 carbon atoms; or a linear or branched alkyl group having 3 to 30 carbon atoms.

In one embodiment of the present application, R, R' and R" are the same as or different from each other, and may be each independently hydrogen; deuterium; a halogen group; a nitrile group; a nitro group; an imide group; an amide group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; or a substituted or unsubstituted heteroaryl group.

In another embodiment, R, R' and R" are the same as or different from each other, and may be each independently hydrogen; a substituted or unsubstituted alkyl group; an alkylsilyloxy group; or an alkylthioxy group.

In another embodiment, R, R' and R" are the same as or different from each other, and may be each independently hydrogen; a linear or branched alkyl group; an alkylsilyloxy group; or an alkylthioxy group.

In another embodiment, R, R' and R" are the same as or different from each other, and may be each independently hydrogen; a linear alkyl group having 1 to 10 carbon atoms; a branched alkyl group having 3 to 20 carbon atoms; an alkylsilyloxy group; or an alkylthioxy group.

In one embodiment of the present application, a1 may be a number of $0<a1<1$ and a2 may be a number of $0<a2<1$, b1 may be a number of $0<b1<1$ and b2 may be a number of $0<b2<1$, and a1+a2 and b1+b2 may be an integer of 1.

In one embodiment of the present application, a1 may be a number of $0<a1<0.8$, and a2 may be a number of $0<a2<0.3$.

In another embodiment, a1 may be a number of $0.5<a1<0.8$, and a2 may be a number of $0<a2<0.29$.

In another embodiment, a1 may be 0.75, and a2 may be 0.25.

a1 and a2 mean a molar ratio of monomers included in the repeated unit, and a1 may be larger than a2.

In one embodiment of the present application, b1 may be a number of $0<b1<0.6$, and b2 may be a number of $0<b2<0.6$.

In another embodiment, b1 may be a number of $0.1<b1<0.55$, and b2 may be a number of $0.1<b2<0.55$.

In another embodiment, b1 may be 0.5, and b2 may be 0.5.

b1 and b2 mean a molar ratio of monomers included in the repeated unit, b1 and b2 may be the same number.

In one embodiment of the present application, the organic compound having electrochromic properties may be represented by any one of the following compounds.

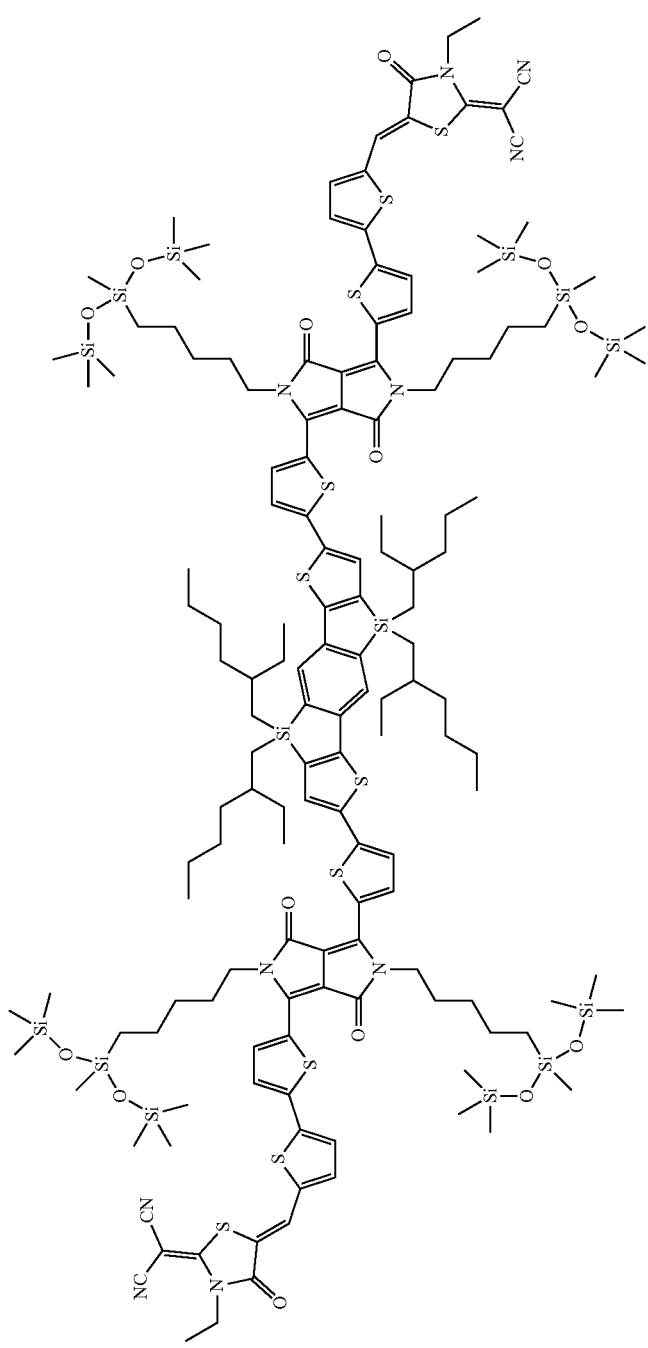

-continued
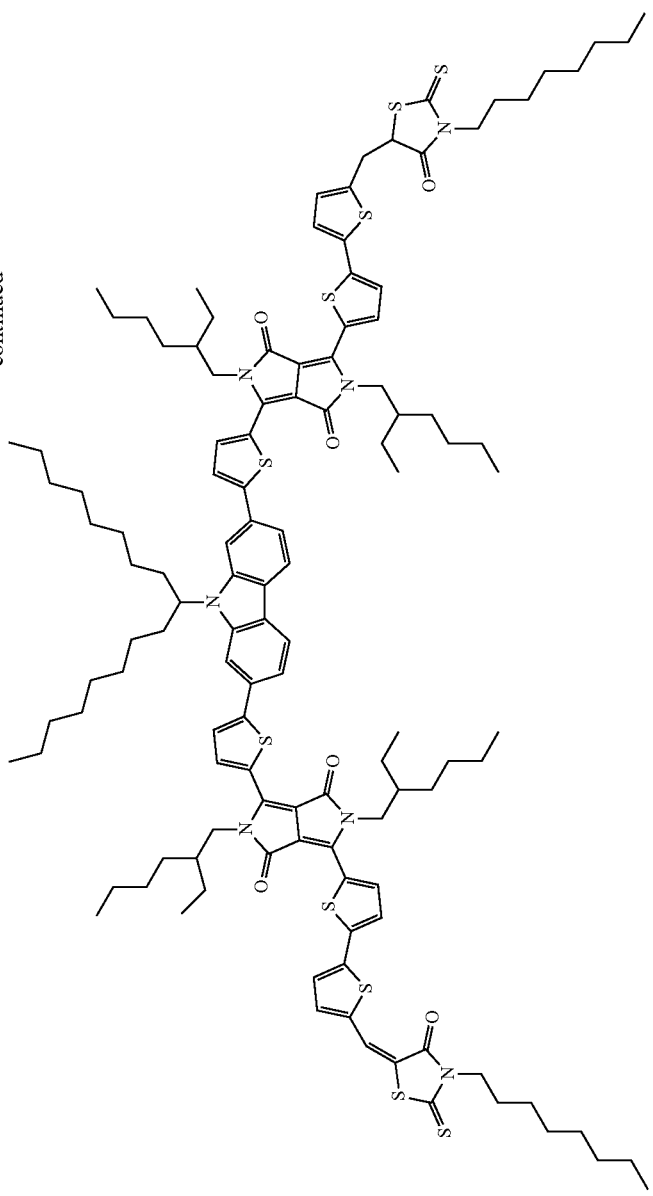

-continued
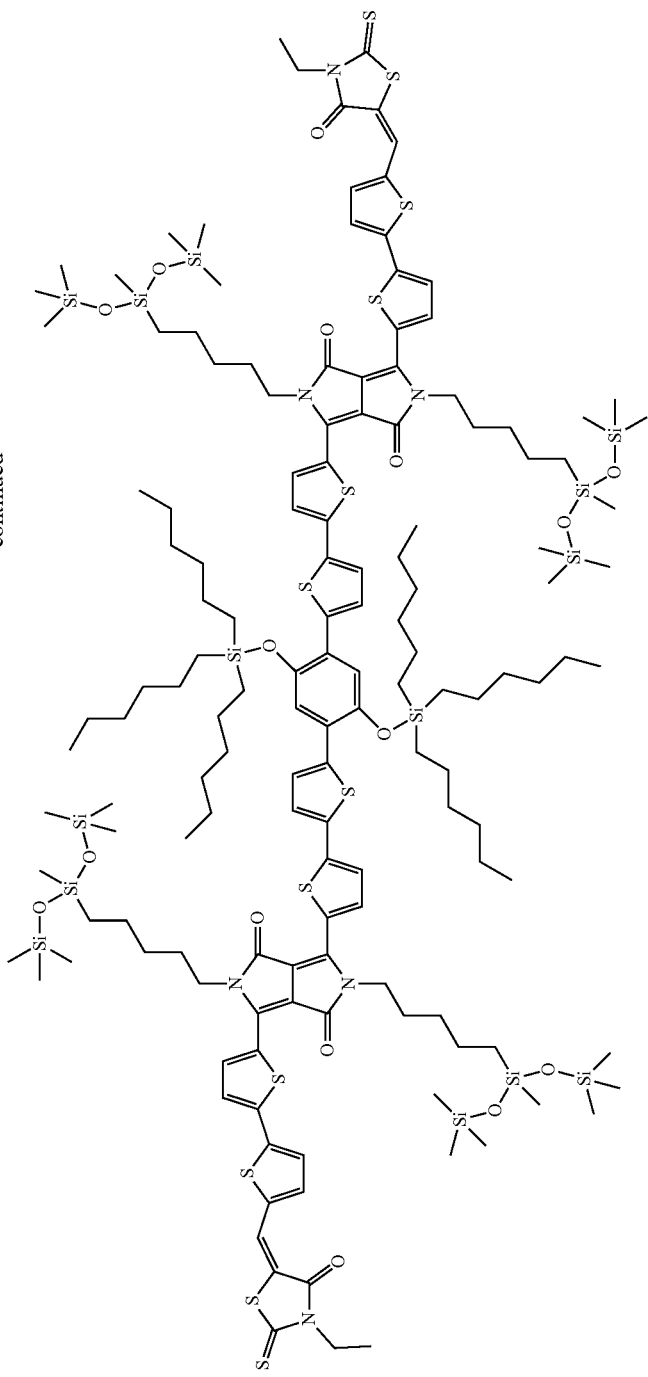

-continued
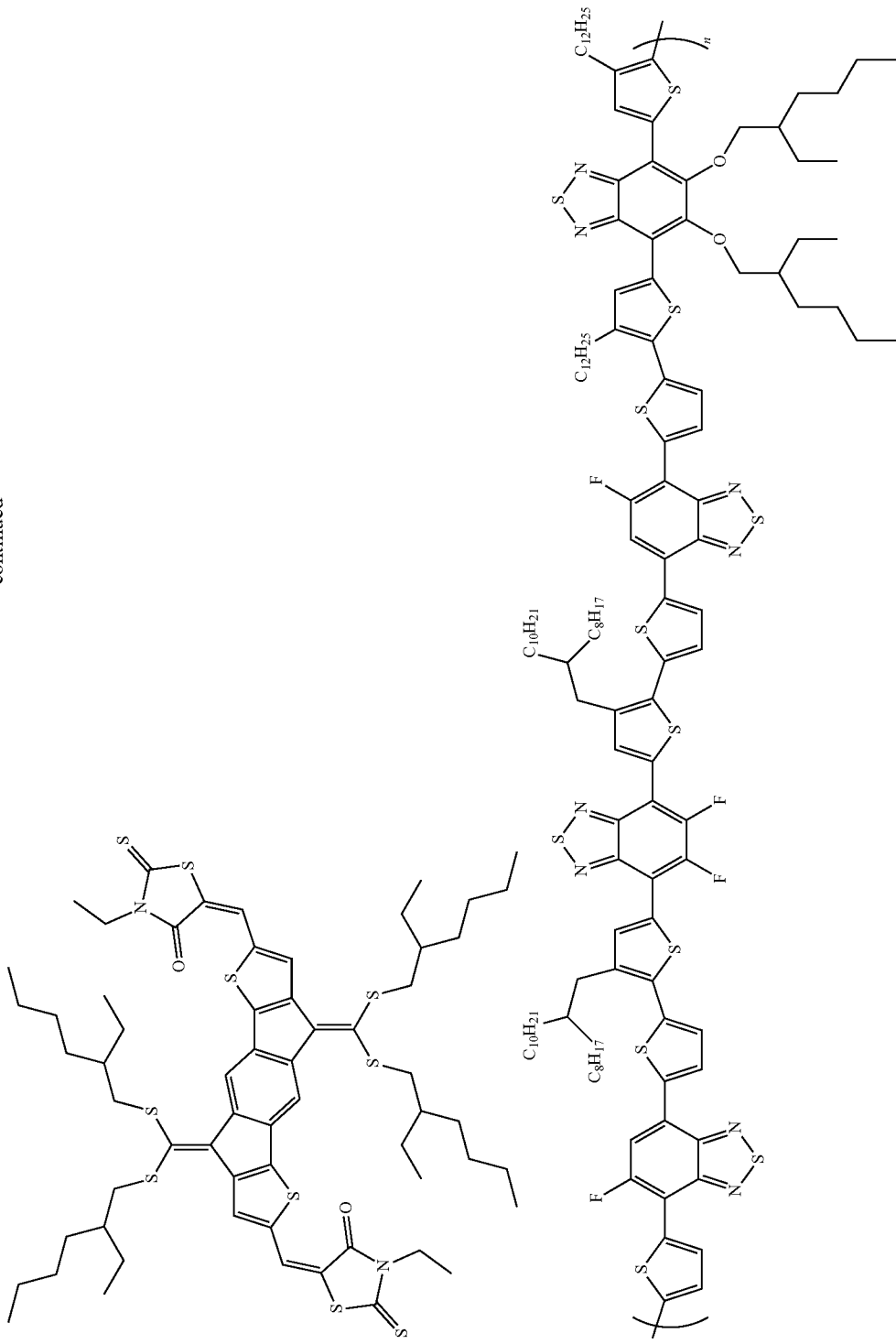

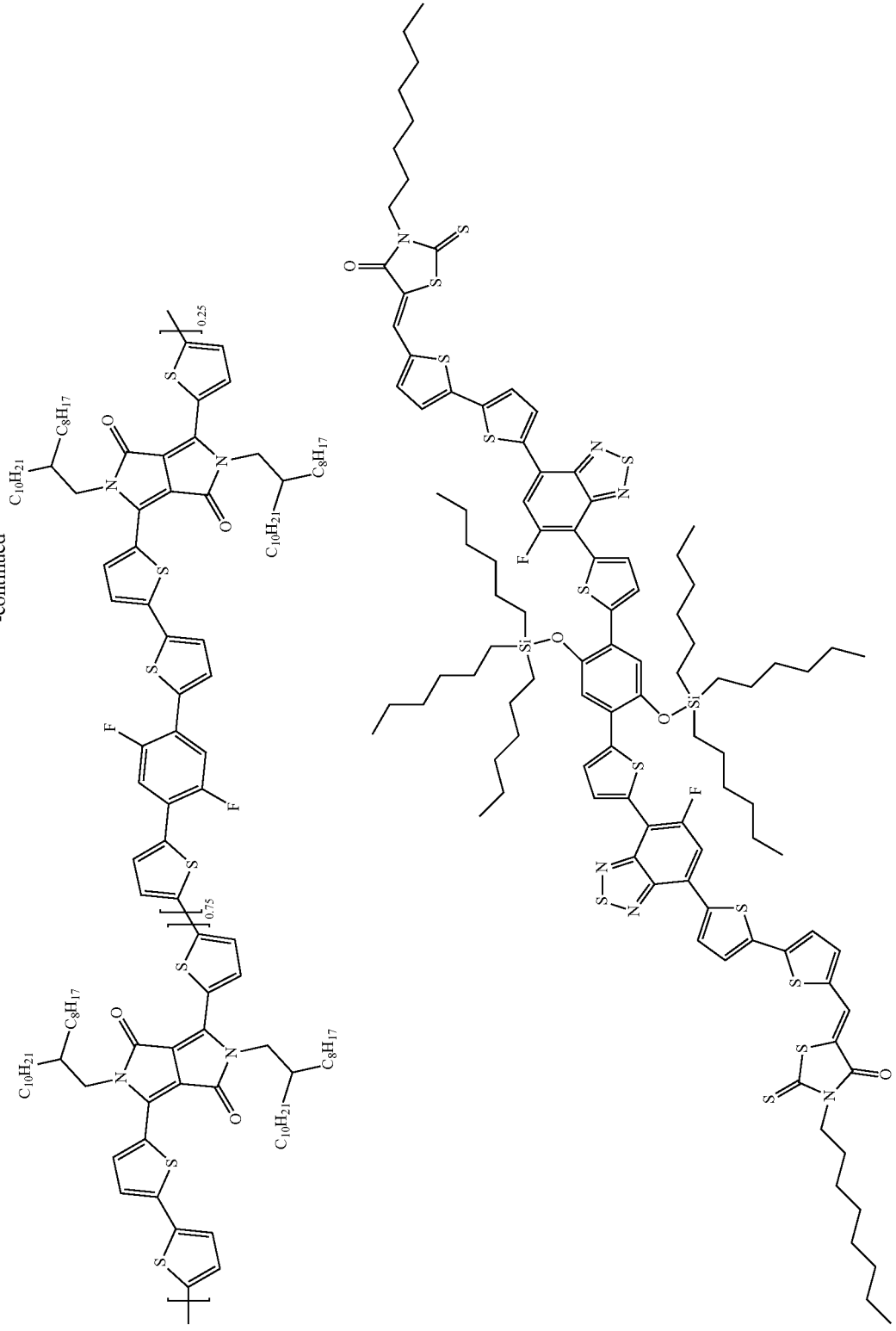

-continued
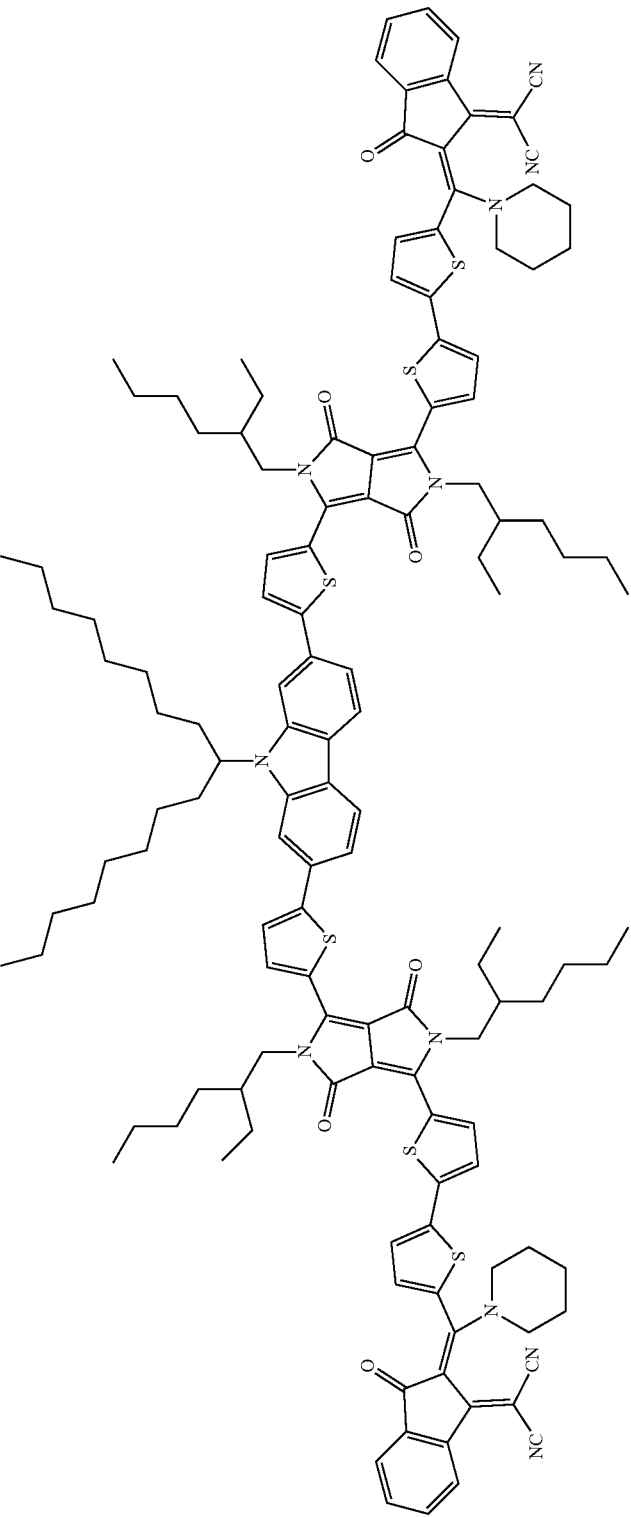

-continued
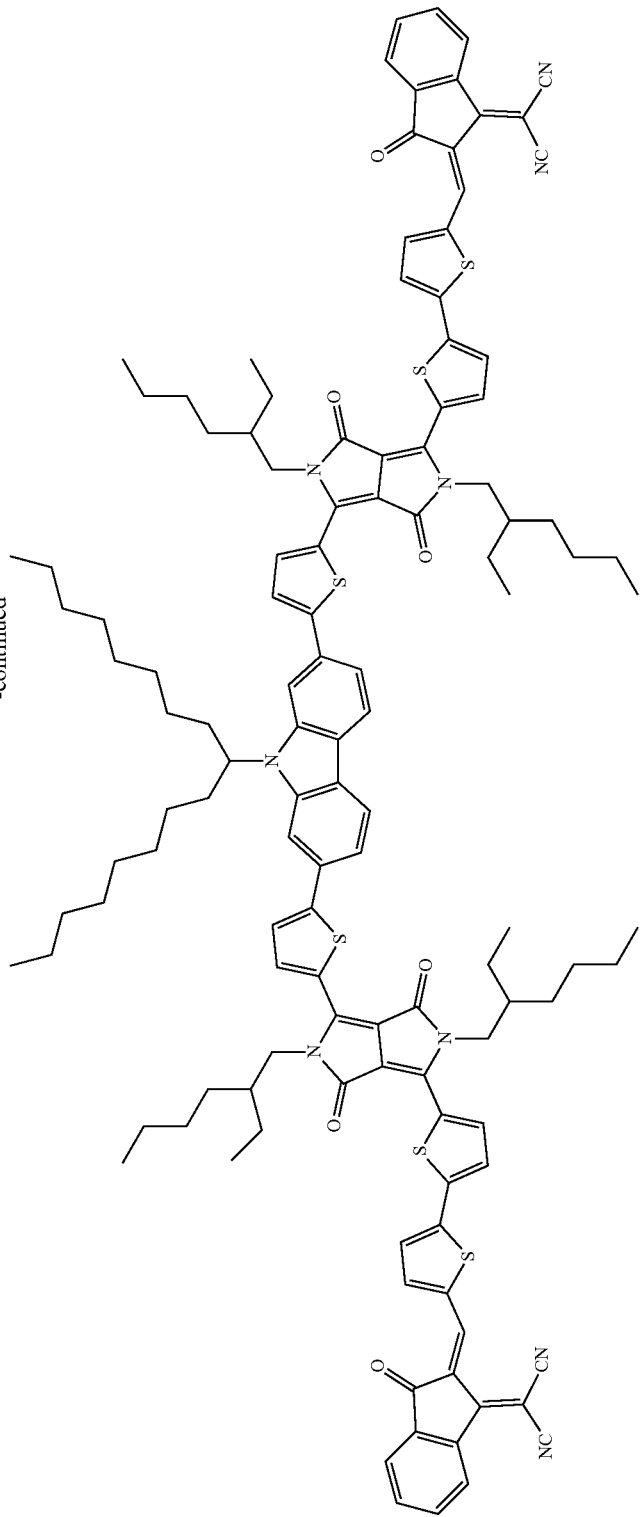

-continued
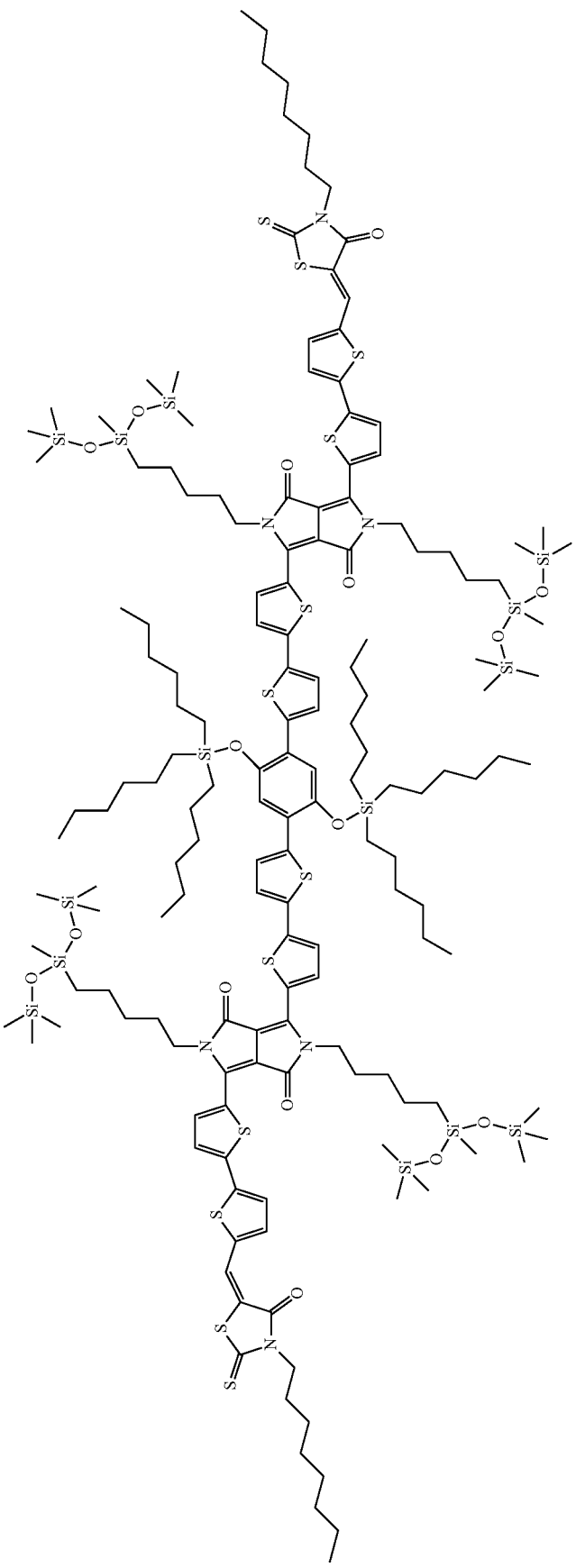

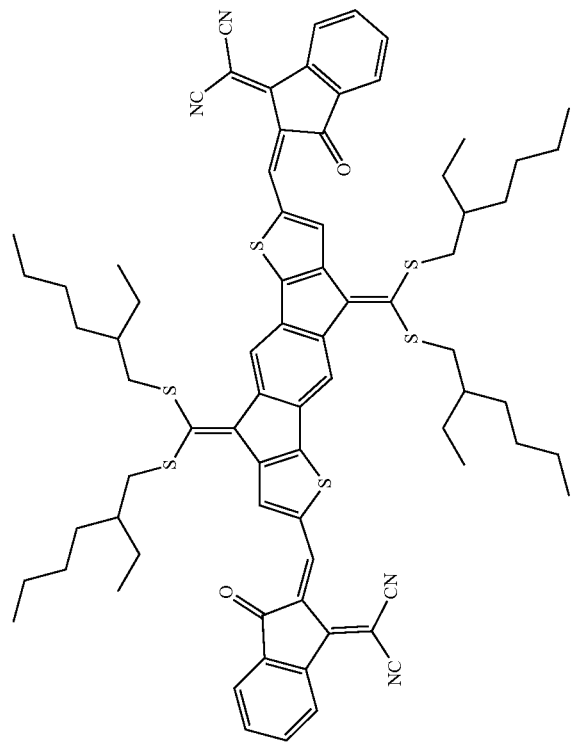
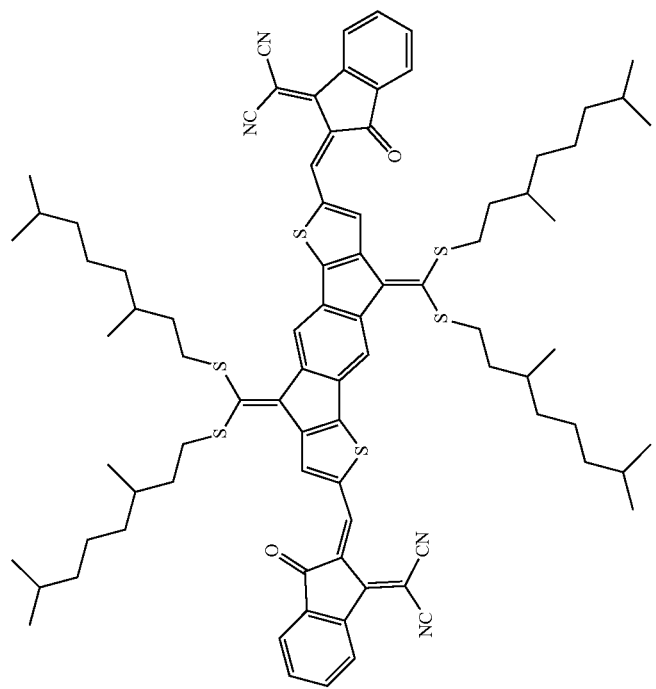

-continued
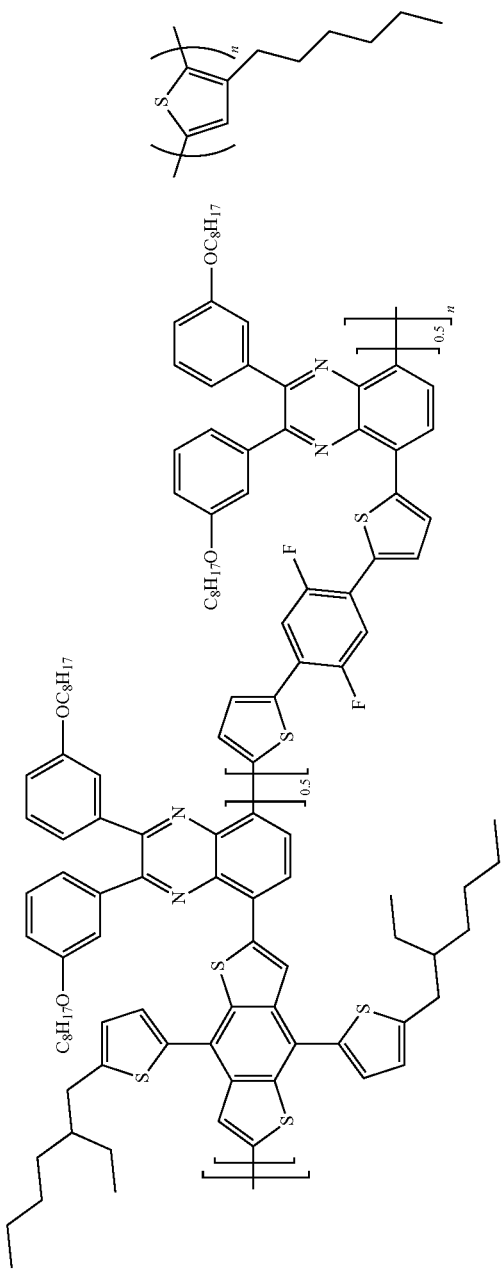

In the chemical formulae, n is an integer of 1 to 1000.

One embodiment of the present application provides an electrochromic device comprising a first electrode; a second electrode provided opposite to the first electrode; an electrolyte layer provided between the first electrode and the second electrode; and an electrochromic layer provided between the electrolyte layer and the second electrode, wherein the electrochromic layer comprises the electrochromic composite according to one embodiment of the present application.

In one embodiment of the present application, the first electrode and the second electrode are not particularly limited as long as they are known in the art. In one embodiment, the first electrode and the second electrode may each independently comprise indium doped tin oxide (ITO), antimony doped tin oxide (ATO), fluorine doped tin oxide (FTO), indium doped zinc oxide (IZO), ZnO, platinum and the like, but are not limited thereto.

In one embodiment of the present application, the first electrode and the second electrode may each be a transparent electrode. Specifically, ITO having transmittance of 80% or higher may be used.

In one embodiment of the present application, the first electrode and the second electrode each independently have a thickness of 10 nm to 500 nm.

The first electrode or the second electrode may mean a substrate coated with an anode active material commonly used in an electrochromic device. In addition, one example of the substrate may be a current collector. A copper, nickel or SUS current collector may be used depending on a voltage range, and specifically, a copper current collector may be used.

The anode may mean being coated with a common anode active material used in an electrochromic device, and as types thereof, lithium, metal materials capable of forming an alloy with lithium, transition metal oxides, materials capable of doping or de-doping lithium, materials capable of reversibly intercalating or deintercalating lithium ions, or the like may be used.

More specifically, according to one embodiment of the present application, the first electrode and the second electrode each independently comprise one or more types of metals selected from the group consisting of lithium (Li), potassium (K), calcium (Ca), sodium (Na), magnesium (Mg), aluminum (Al), zinc (Zn), iron (Fe), nickel (Ni), tin (Sn), lead (Pb), copper (Cu), indium (In), titanium (Ti), vanadium (V) and zirconium (Zr), or alloys thereof.

In addition, specific examples of the transition metal oxide may include vanadium oxides, lithium vanadium oxides and the like, examples of the material capable of doping and de-doping lithium may include Si, SiOx (0<x<2), Si—Y alloys (Y is an alkali metal, an alkali earth metal, a group 13 element, a group 14 element, a transition metal, a rare earth element or a combination thereof, but is not Si), Sn, $SnO_2$, Sn—Y (Y is an alkali metal, an alkali earth metal, a group 13 element, a group 14 element, a transition metal, a rare earth element or a combination thereof, but is not Sn) and the like, or a mixture of at least one thereof and $SiO_2$ may also be used.

Specific examples of the element Y are not particularly limited, but may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

The material capable of reversibly intercalating or deintercalating lithium ions is a carbon material, and any carbon-based anode active material generally used in an electrochromic device may be used, and as typical examples, crystalline carbon, amorphous carbon or a combination thereof may be used. Examples of the crystalline carbon may comprise graphite such as natural graphite or artificial graphite in an amorphous form, a plate form, a flake form, a spherical or fibrous form, and examples of the amorphous carbon may include soft carbon (low temperature baked carbon), hard carbon, mesophase pitch carbide, baked coke and the like.

In one embodiment of the present application, the method of forming the electrochromic layer is not particularly limited, and may use methods known in the art. For example, an electroplating method, sputtering, an e-beam evaporation method, a chemical vapor deposition method, a sol-gel coating method or the like may be used.

In one embodiment of the present application, the electrolyte layer may be prepared using materials and methods known in the art. Specifically, a pentaerythritol triacrylate (PETA) monomer, 1 M or higher $LiClO_4$, polycarbonate or the like may be used, however, the material and the method are not limited thereto.

In one embodiment of the present application, a solid electrolyte or a liquid electrolyte may be used as the electrolyte layer, and the electrolyte layer is not particularly limited as long as it is capable of performing a role of migrating ions and electrons.

In one embodiment of the present application, the electrolyte layer may comprise a lithium salt, a plasticizer, an oligomer, a monomer, an additive, a radical initiator and the like. The oligomer used in the present disclosure needs to have compatibility with the plasticizer.

In one embodiment of the present application, the electrochromic layer may have a thickness of greater than or equal to 10 nm and less than or equal to 1.5 μm, and preferably greater than or equal to 20 run and less than or equal to 1 μm.

The degree of bleaching and coloring may be adjusted through changing a thickness of the electrochromic layer, and the layer may be adjusted to be thin when transmittance is required, and adjusted to be thick when opacity is required rather than transparency.

One embodiment of the present application provides a method for manufacturing an electrochromic device comprising preparing a first electrode; forming a second electrode opposite to the first electrode; forming an electrolyte layer between the first electrode and the second electrode; and forming an electrochromic layer between the electrolyte layer and the second electrode, wherein the electrochromic layer comprises the electrochromic composite according to one embodiment of the present application.

In one embodiment of the present application, the method for forming an electrochromic layer may be a solution process.

As the solution process, spin coating, bar coating, slot die coating or inkjet coating may be used.

In the present application, the method for preparing the organic compound and the method for manufacturing the electrochromic device will be specifically described in the following preparation examples and examples. However, the following examples are for illustrative purposes only, and the scope of the present specification is not limited thereto.

Preparation Example 1. Preparation of Compound 1

(1) Preparation of Compound A-2

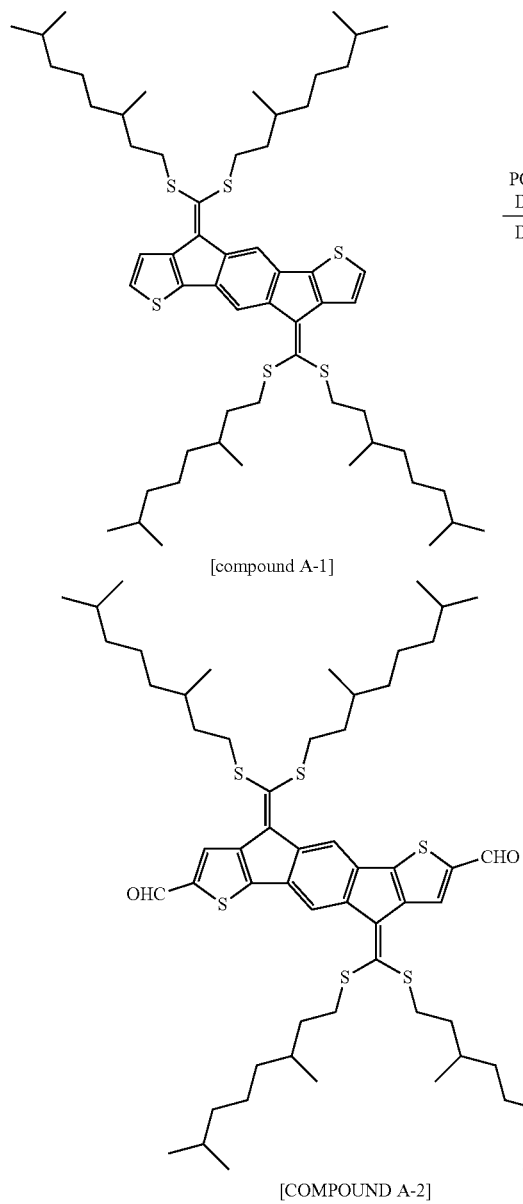

[compound A-1]

[COMPOUND A-2]

1.49 mL of phosphorus oxychloride (POCl$_3$) (16 mmol) was added to 1.55 mL of N,N-dimethylformamide (DMF) (20 mmol), and the result was stirred for 60 minutes at 0° C. to prepare a mixture solution. To the prepared mixture solution, a solution dissolving Compound A-1 (1.53 mmol) in 20 mL of dichloroethane (DCE) was added, and the result was stirred for 48 hours at 100° C. After the stirring, 1 M sodium hydroxide (NaOH) was added thereto, and the result was stirred for 1 hour for neutralization. After that, the result was extracted with dichloromethane, and the extract was dried with anhydrous magnesium sulfate (anhydrous MgSO$_4$) and evaporated. The solvent was removed under vacuum, and then the residue was purified through flash chromatography using hexane and chloroform as an eluent (hexane:chloroform=4:1) to obtain 1.066 g of Compound A-2. (Yield: 67.3%)

Figure 3:
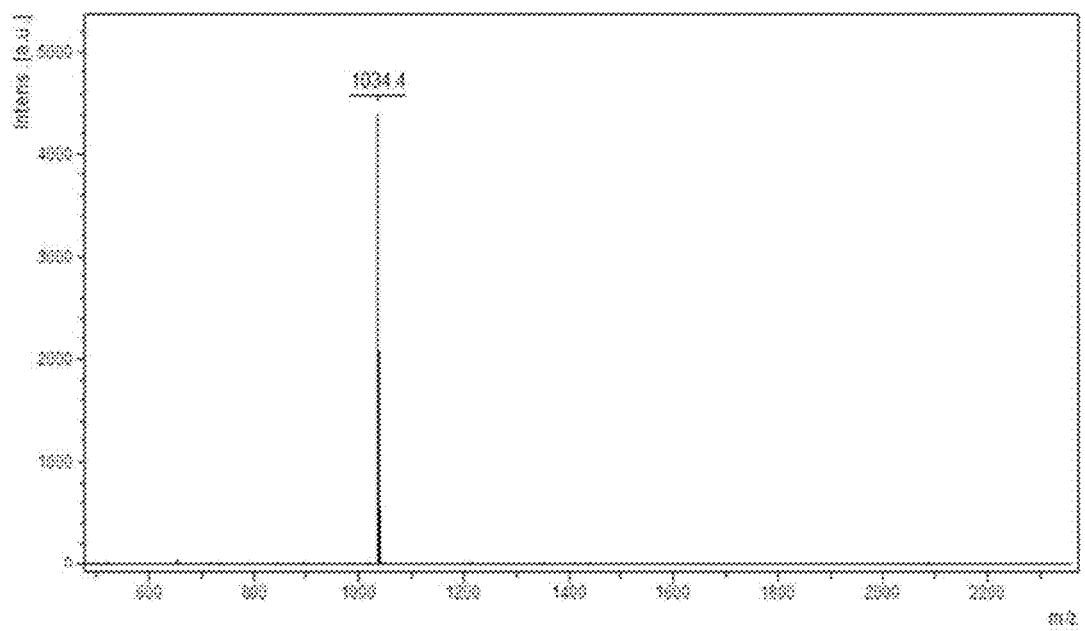
FIG. 3 is a diagram showing an MS spectrum of Compound A-2.

FIG. 3 is a diagram showing an MS spectrum of Compound A-2.

(2) Preparation of Compound 1

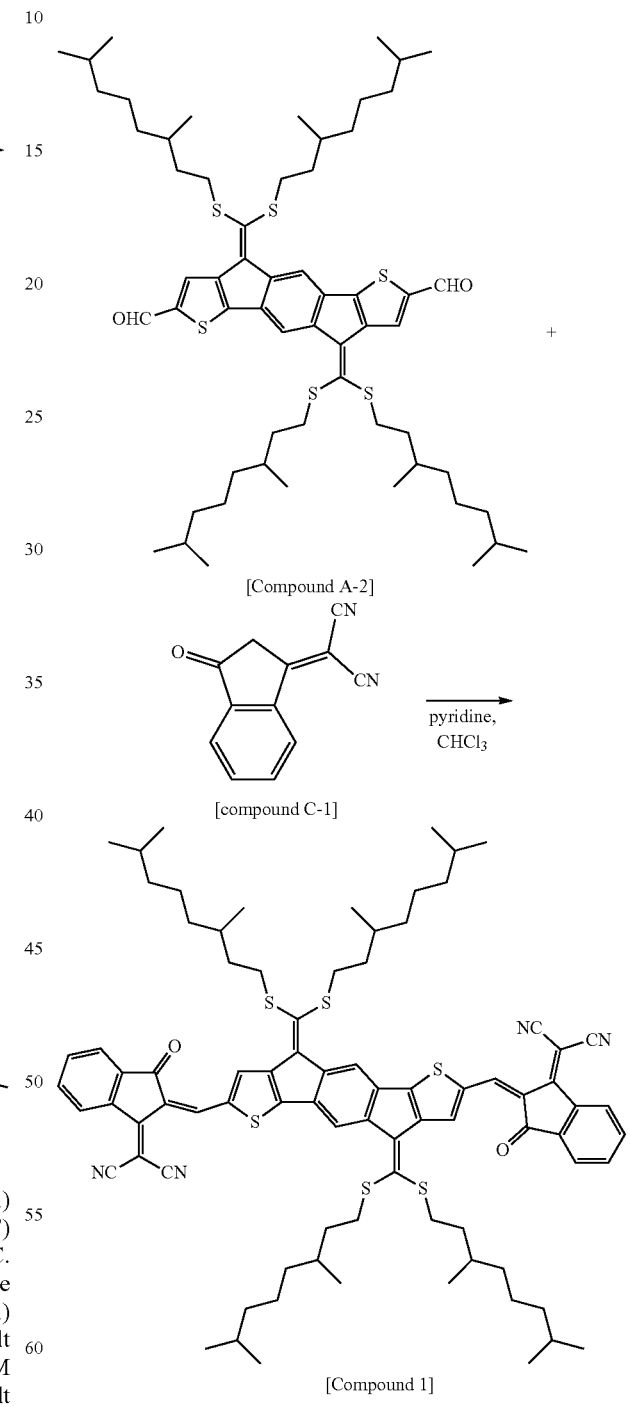

[Compound A-2]

[compound C-1]

[Compound 1]

Under nitrogen (N$_2$) atmosphere, 2 mL of pyridine was added to a solution mixing Compound A-2 (0.725 g, 0.7 mmol) and Compound C-1 (0.68 g, 3.5 mmol) in 40 mL of chloroform (CHCl$_3$). After refluxing this mixture solution for 24 hours under nitrogen atmosphere, the solution was extracted with dichloromethane (CH$_2$Cl$_2$) and washed with water. After removing the solvent, the result was recrystallized through methyl chloride (MC)/methanol, and the product was purified through chromatography using a silica gel column using hexane, acetone, ethyl acetate and chloroform (CHCl$_3$) as an eluent. The produced solids were recrystallized through chloroform. After that, the result was washed with methanol and dried under a vacuum condition to obtain 905 mg of Compound 1. (Yield: 93%)

Figure 4:
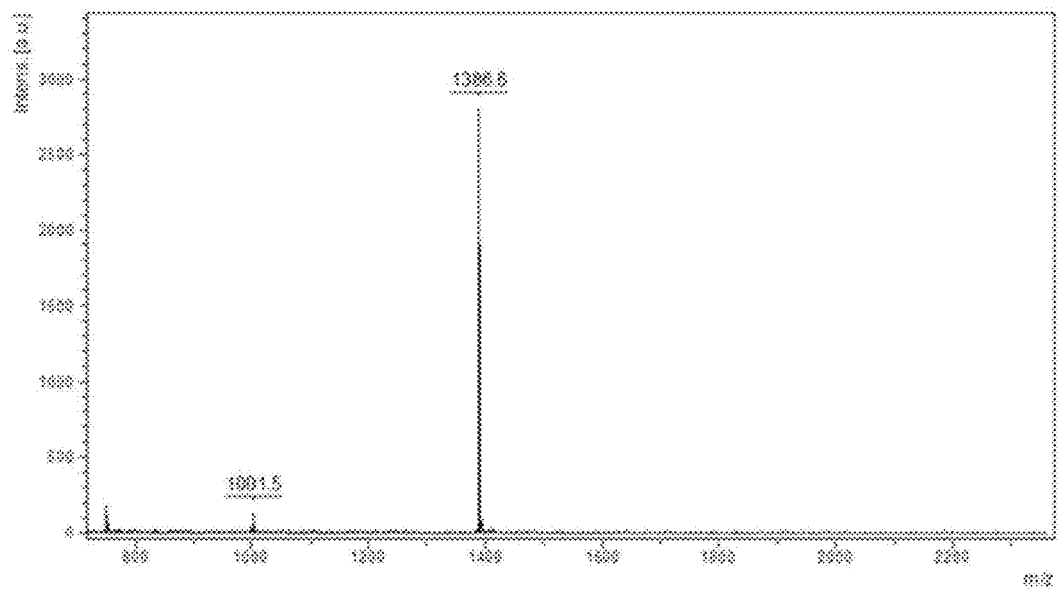
FIG. 4 is a diagram showing an MS spectrum of Compound 1.

FIG. 4 is a diagram showing an MS spectrum of Compound 1.

Preparation Example 2. Preparation of Compound 2

(1) Preparation of Compound B-2

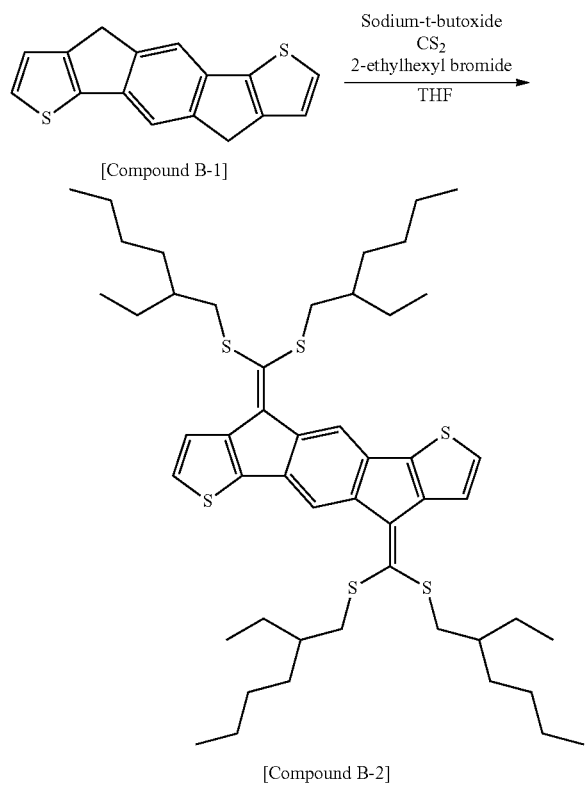

[Compound B-2]

After adding sodium-t-butoxide (NaOC(CH$_3$)$_3$) (4.13 g, 43 mmol) to Compound B-1 (2.5 g, 9.4 mmol)-dissolved tetrahydrofuran (THF) (100 mL), total 2.58 mL of carbon disulfide (CS$_2$) (43 mmol) was added thereto over one hour. After that, 2-ethylhexyl bromide (8.89 mL, 50 mmol) was added thereto, and the result was stirred for 24 hours. After the reaction, ammonium hydroxide (NH$_4$OH) was added thereto to terminate the reaction, the result was extracted with dichloromethane (DCM), and then washed 3 times with water. The product was purified through chromatography using a silica gel column using hexane as an eluent to obtain 3.63 g of Compound B-2 in a red oil form. (Yield: 45%)

Figure 5:
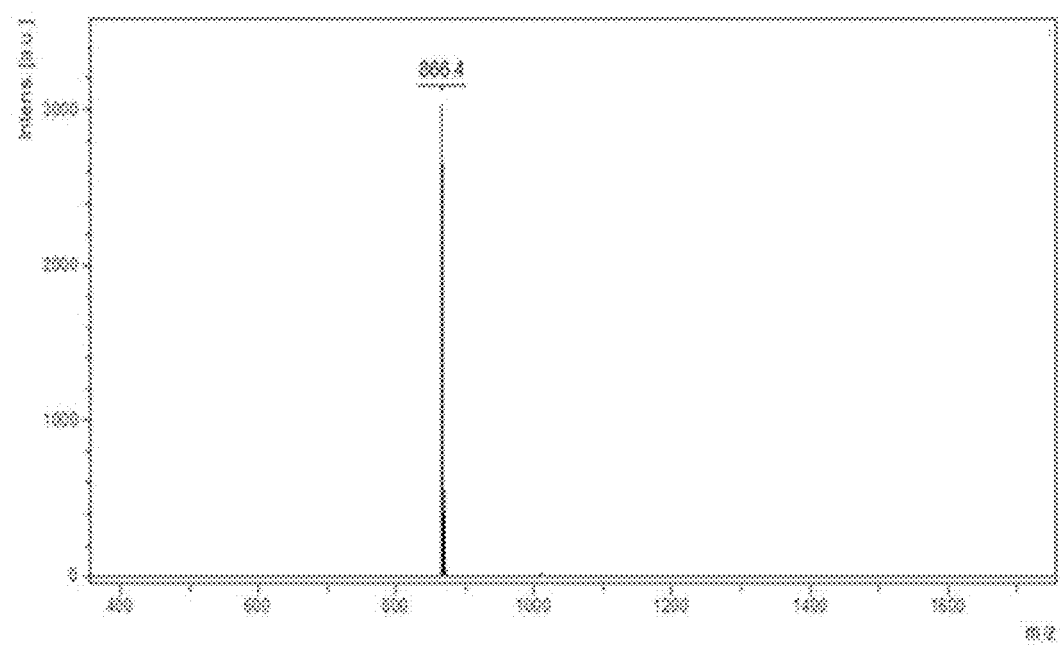
FIG. 5 is a diagram showing an MS spectrum of Compound B-2.

FIG. 5 is a diagram showing an MS spectrum of Compound B-2.

(2) Preparation of Compound B-3

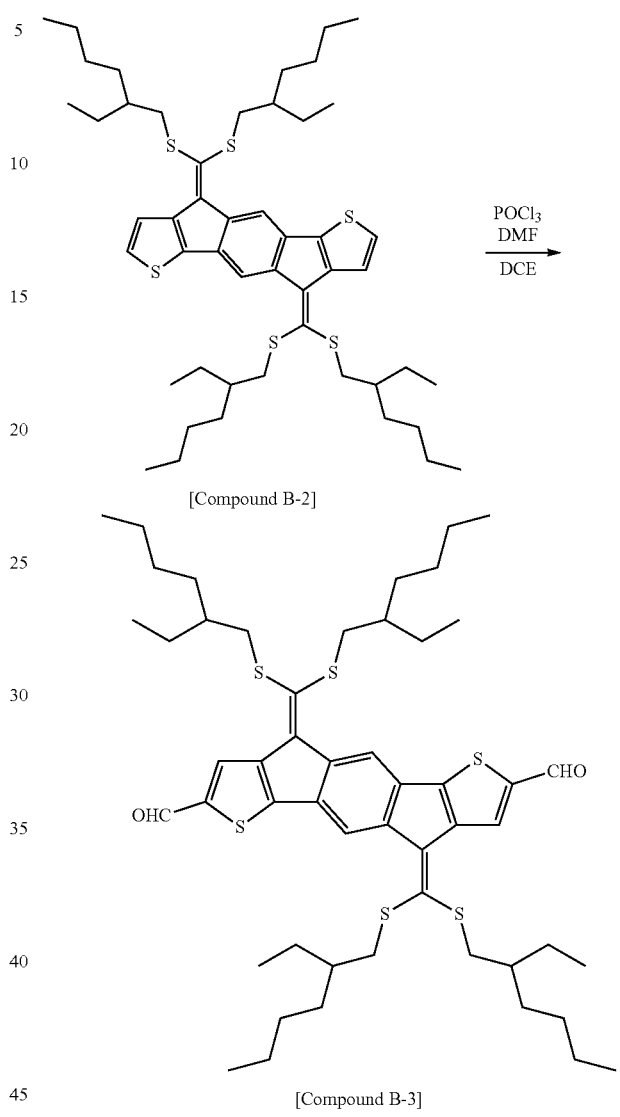

[Compound B-3]

4 mL of phosphorus oxychloride (POCl$_3$) (43 mmol) was added to N,N-dimethylformamide (DMF) (55 mmol), and the result was stirred for 60 minutes at 0° C. to prepare a mixture solution. To the prepared mixture solution, a solution dissolving Compound B-2 (4.19 mmol) in 40 mL of dichloroethane (DCE) was added, and the result was stirred for 48 hours at 100° C. After the stirring, 1 M sodium hydroxide (NaOH) was added thereto, and the result was stirred for 1 hour for neutralization. After that, the result was extracted with dichloromethane, and the extract was dried with anhydrous magnesium sulfate (anhydrous MgSO$_4$) and evaporated. The solvent was removed under vacuum, and then the residue was purified through flash chromatography using hexane and chloroform as an eluent (hexane:chloroform=4:1) to obtain 2.47 g of Compound B-3. (Yield: 64%)

Figure 6:
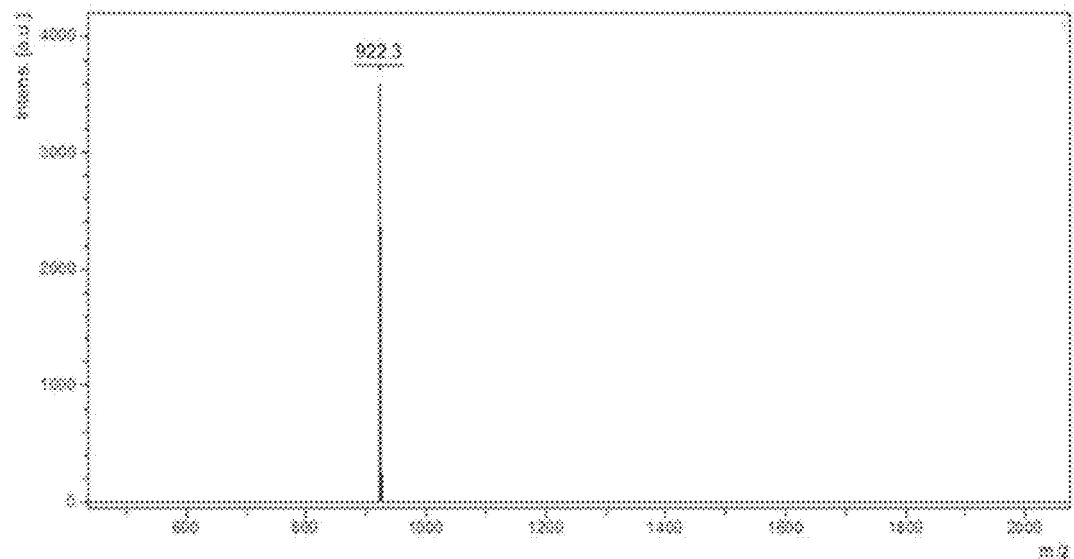
FIG. 6 is a diagram showing an MS spectrum of Compound B-3.

FIG. 6 is a diagram showing an MS spectrum of Compound B-3.

(3) Preparation of Compound 2

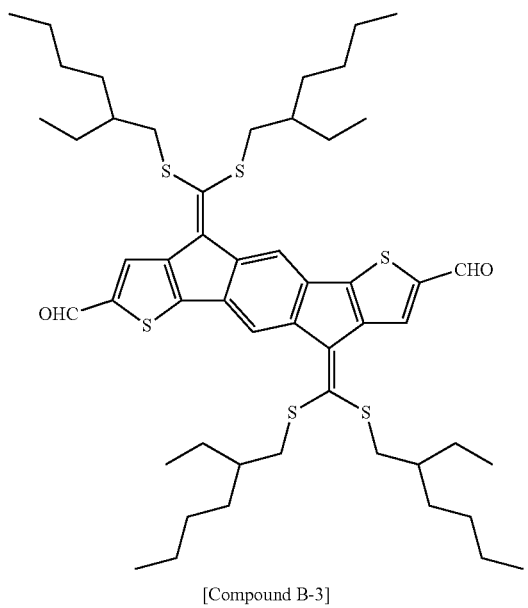

[Compound B-3]

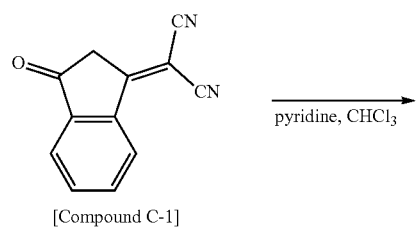

[Compound C-1]

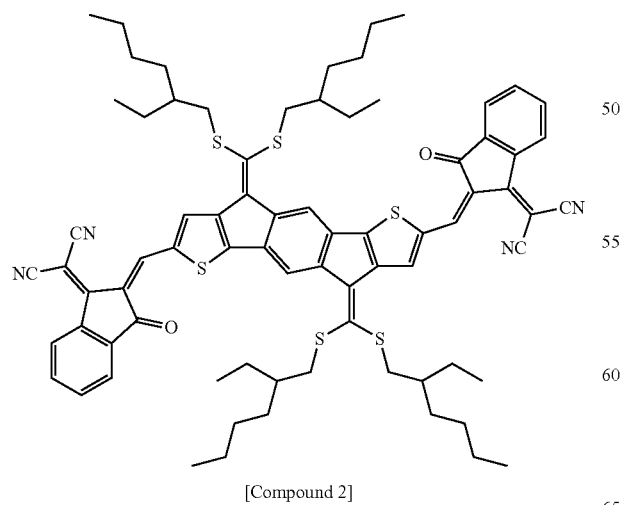

[Compound 2]

Under nitrogen (N$_2$) atmosphere, 2 mL of pyridine was added to a solution mixing Compound B-3 (0.44 g, 0.48 mmol) and Compound C-1 (0.93 g, 4.8 mmol) in 30 mL of chloroform (CHCl$_3$). After refluxing this mixture solution for 24 hours under nitrogen atmosphere, the solution was extracted with dichloromethane (CH$_2$Cl$_2$) and washed with water. After removing the solvent, the result was recrystallized through methyl chloride (MC)/methanol, and the product was purified through chromatography using a silica gel column using hexane, ethyl acetate and chloroform (CHCl$_3$) as an eluent. The produced solids were recrystallized through chloroform. After that, the result was washed with methanol and dried under a vacuum condition to obtain 550 mg of Compound 2. (Yield: 90%)

Figure 7:
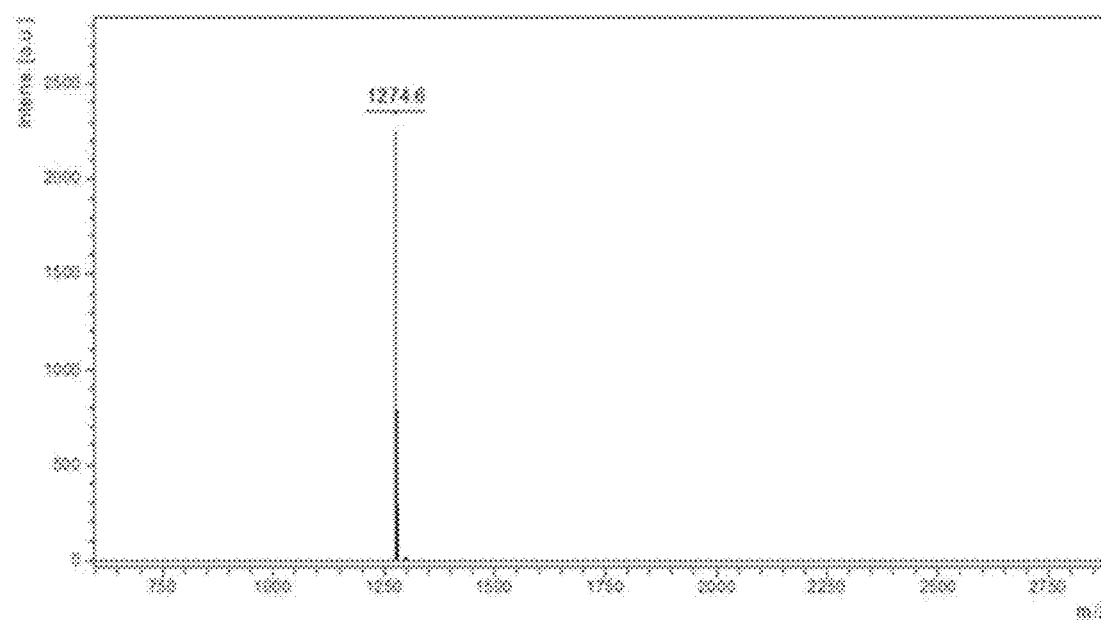
FIG. 7 is a diagram showing an MS spectrum of Compound 2.

FIG. 7 is a diagram showing an MS spectrum of Compound 2.

Preparation Example 3. Preparation of Compound 3

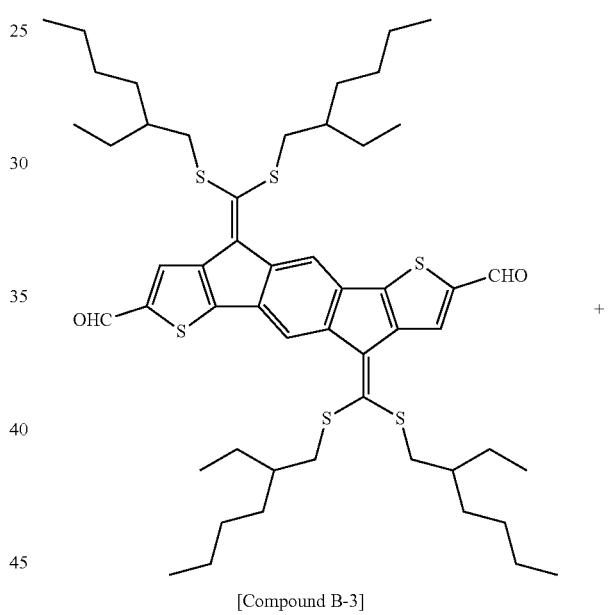

[Compound B-3]

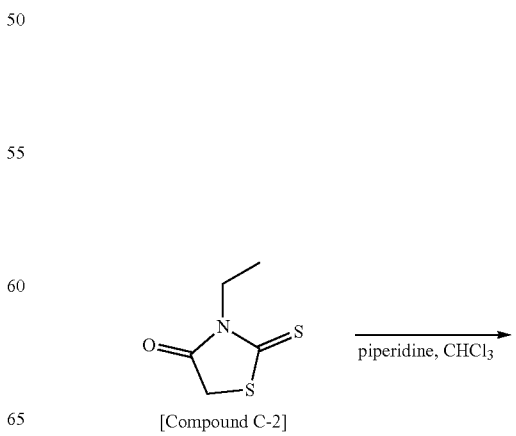

[Compound C-2]

[Compound 3]

Under nitrogen (N₂) atmosphere, three drops of piperidine were added to a solution mixing Compound B-3 (0.83 g, 0.9 mmol) and Compound C-2 (1.45 g, 9 mmol) in 15 mL of chloroform (CHCl₃). After refluxing this mixture solution for 24 hours under nitrogen atmosphere, the solution was extracted with dichloromethane (CH₂Cl₂) and washed with water. After removing the solvent, the result was recrystallized through methyl chloride (MC)/methanol, and the product was purified through chromatography using a silica gel column using hexane, ethyl acetate and chloroform (CHCl₃) as an eluent. The produced solids were recrystallized through chloroform. After that, the result was washed with methanol and dried under a vacuum condition to obtain 918 mg of Compound 3. (Yield: 84.3%) (MALDI-TOF MS: 1208.3 g/mol)

Figure 8:
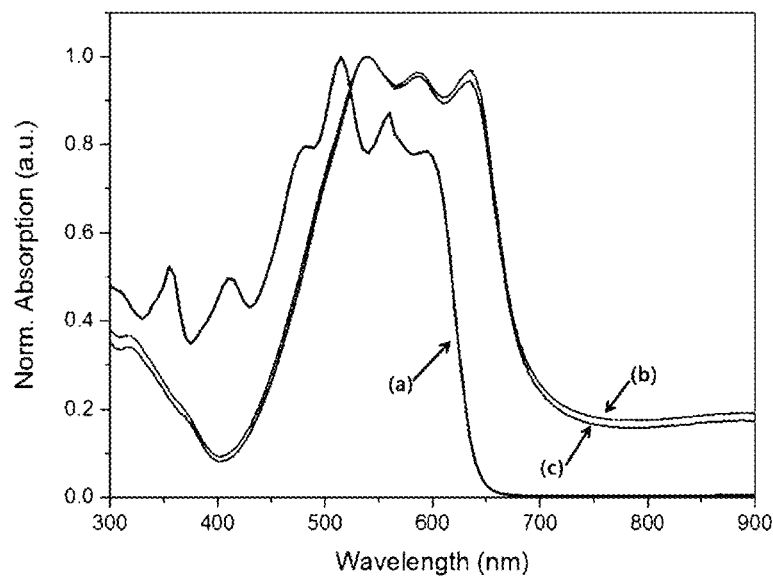
FIG. 8 is a diagram showing UV spectra of Compound 3.

FIG. 8 is a diagram showing UV spectra of Compound 3.

In FIG. 8, (a) shows UV data of Compound 3 in a solution state, (b) shows UV data measuring Compound 3 in a film state, and (c) shows UV data measuring Compound 3 after heat treating for 10 minutes at 110° C. in a film state.

Herein, the solution state is a state in which Compound 3 is dissolved in a chlorobenzene solution, and the film was formed through spin coating Compound 3 in the solution state.

In FIG. 8, it was identified that the vibronic peak of (c) increased after heat treating the film compared to the vibronic peak before heat treating the film. Accordingly, it was identified that crystallinity was superior after the heat treatment.

Figure 9:
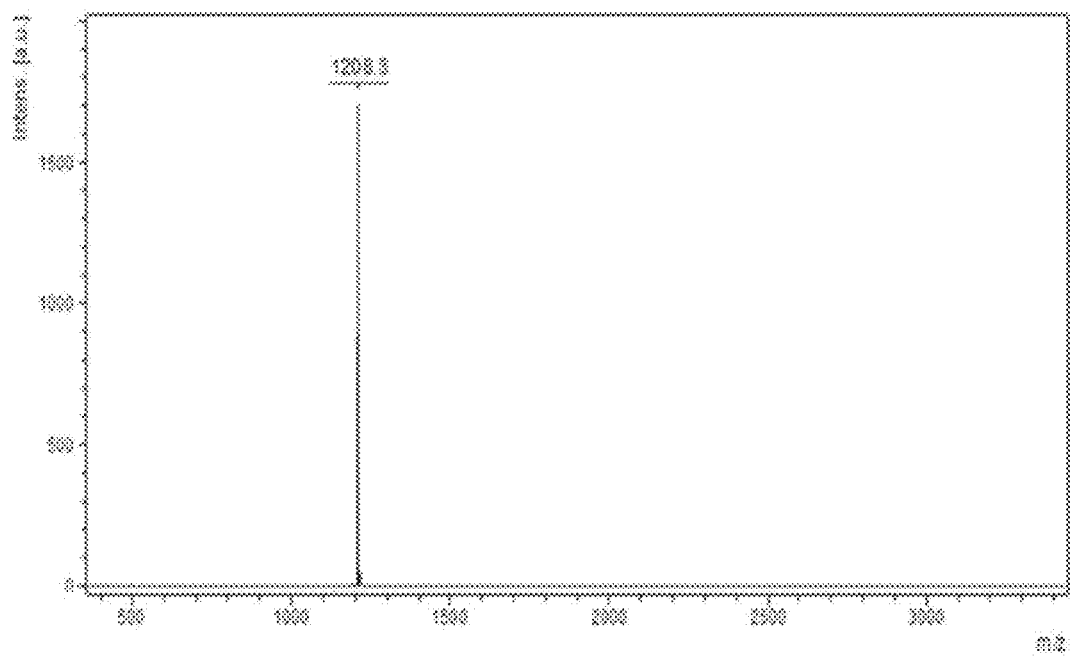
FIG. 9 is a diagram showing an MS spectrum of Compound 3.

FIG. 9 is a diagram showing an MS spectrum of Compound 3.

Preparation Example 4. Preparation of Compound 4

(1) Preparation of Compound 4-1

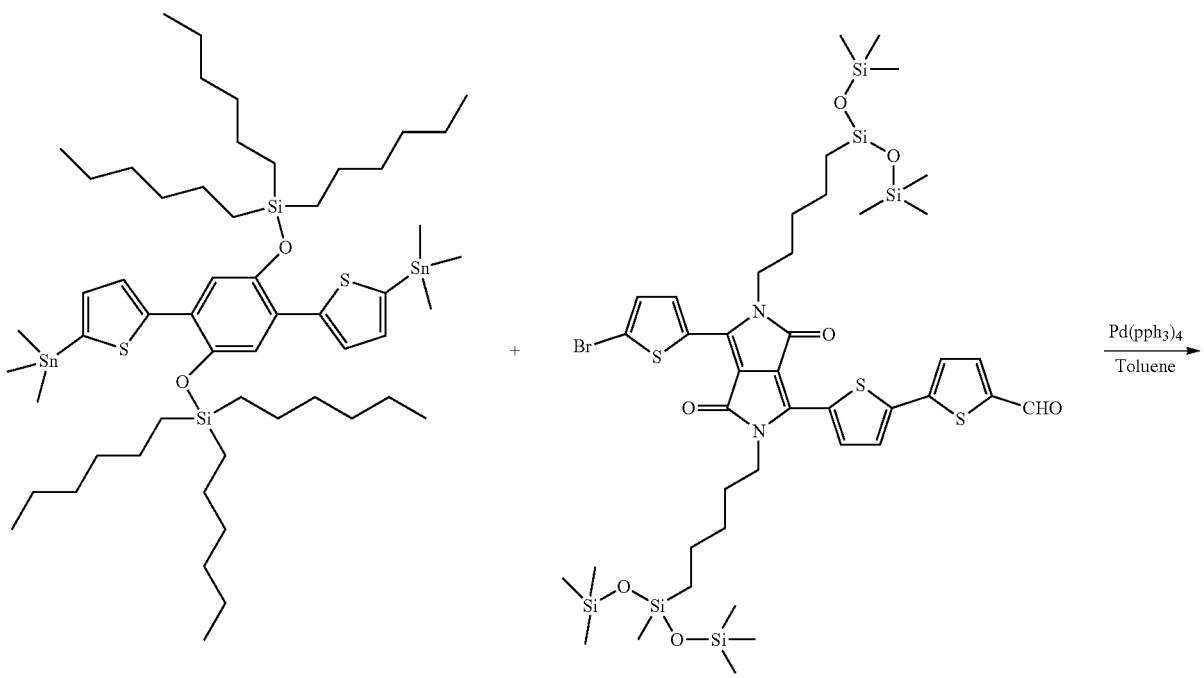

-continued

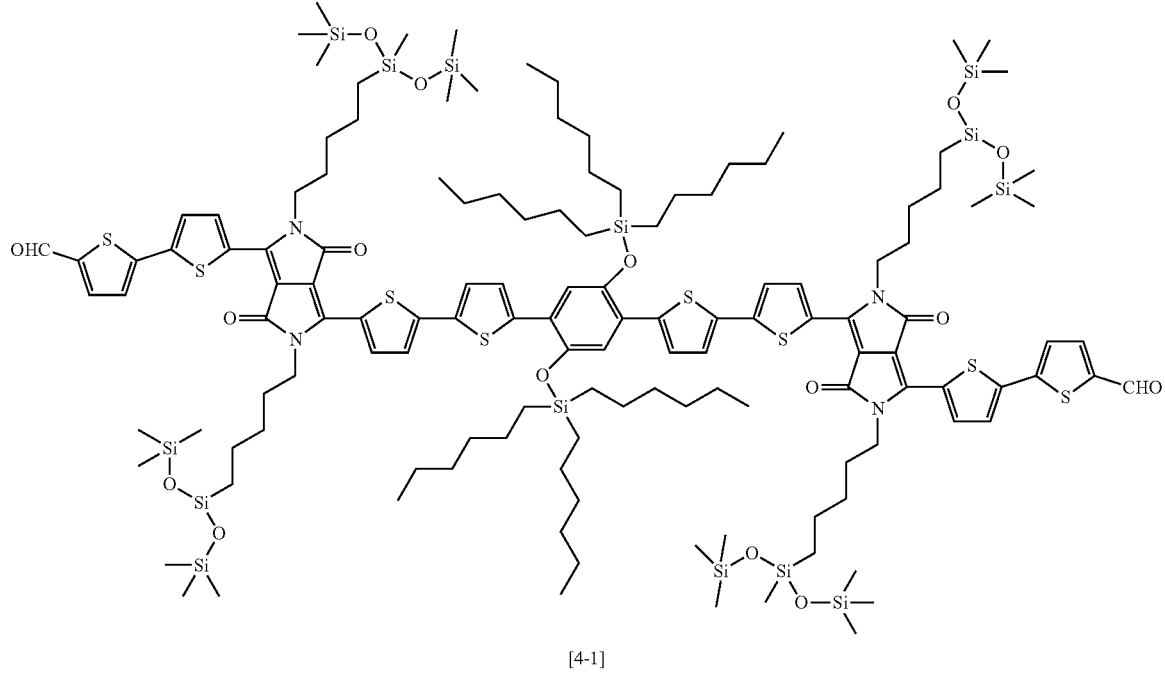

[4-1]

A Sn-introduced compound (0.268 g, 0.23 mmol) and a Br-introduced compound (0.557 g, 0.52 mmol) were dissolved in toluene:DMF=3:1 (20 mL), a Pd(pph₃)₄ catalyst (0.014 g, 0.012 mmol) was introduced thereto, and the result was stirred for 48 hours at 110° C. After the reaction, the result was extracted with DCM, and after removing residual water with magnesium sulfate (MgSO₄), the solvent was removed under vacuum. The residual product passed through a silica column (eluent: Hex to CH:EA=495:5) to obtain purple powders (Compound 4-1).

(2) Preparation of Compound 4

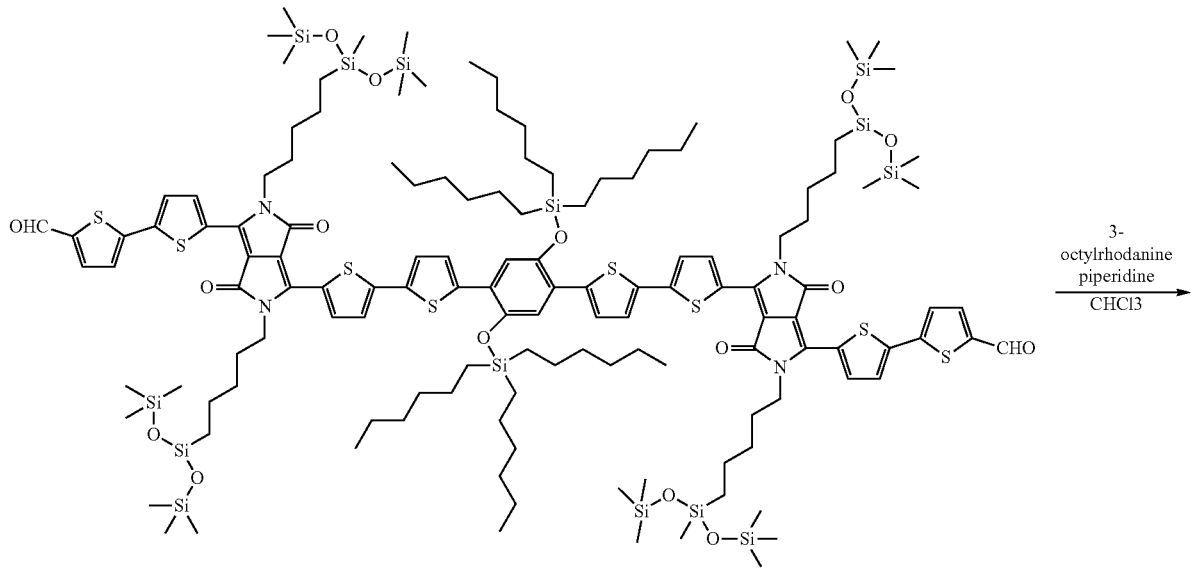

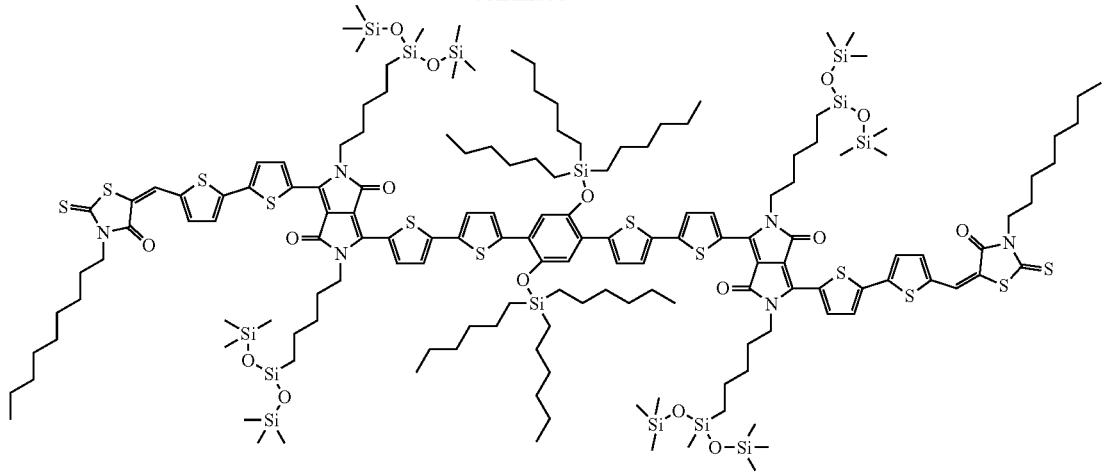

[4]

The precursor and 3-octylrhodanine were dissolved in CHCl₃, three drops of piperidine were introduced thereto at room temperature, and the result was refluxed for 24 hours. After the reaction, the result was extracted with DCM, and after removing residual water with magnesium sulfate (MgSO₄), the solvent was removed under vacuum. The residual product passed through a silica column (eluent: CHCl₃ to CHCl₃ with EA) to obtain dark green solids. The obtained solids (Compound 4) were recrystallized with CHCl₃ and hexane.

Figure 10:
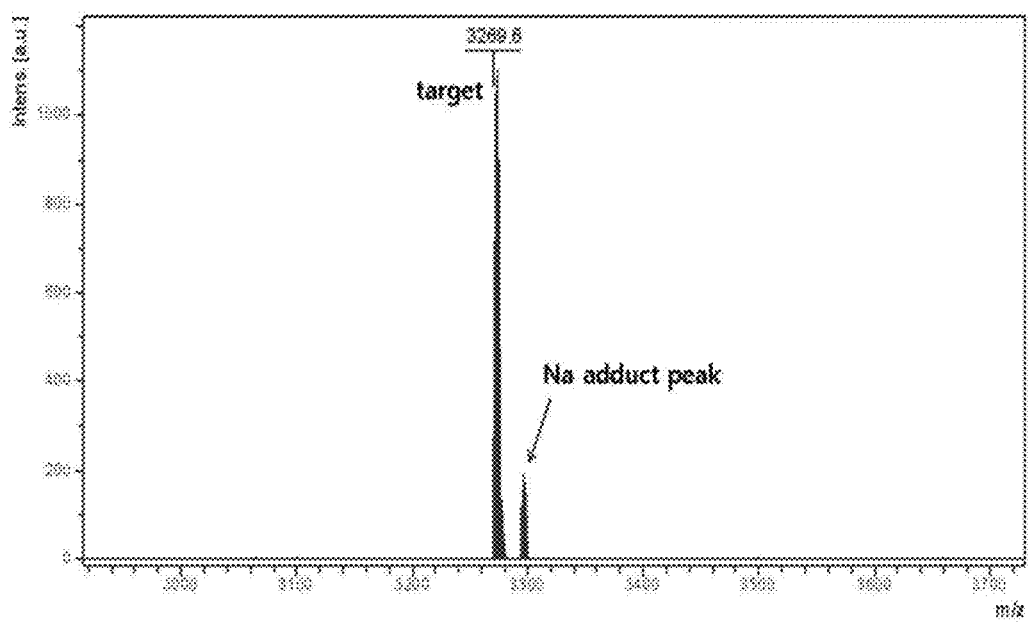
FIG. 10 is a diagram showing an MS spectrum of Compound 4.

FIG. 10 is a diagram showing an MS spectrum of Compound 4.

Preparation Example 5. Preparation of Compound 5

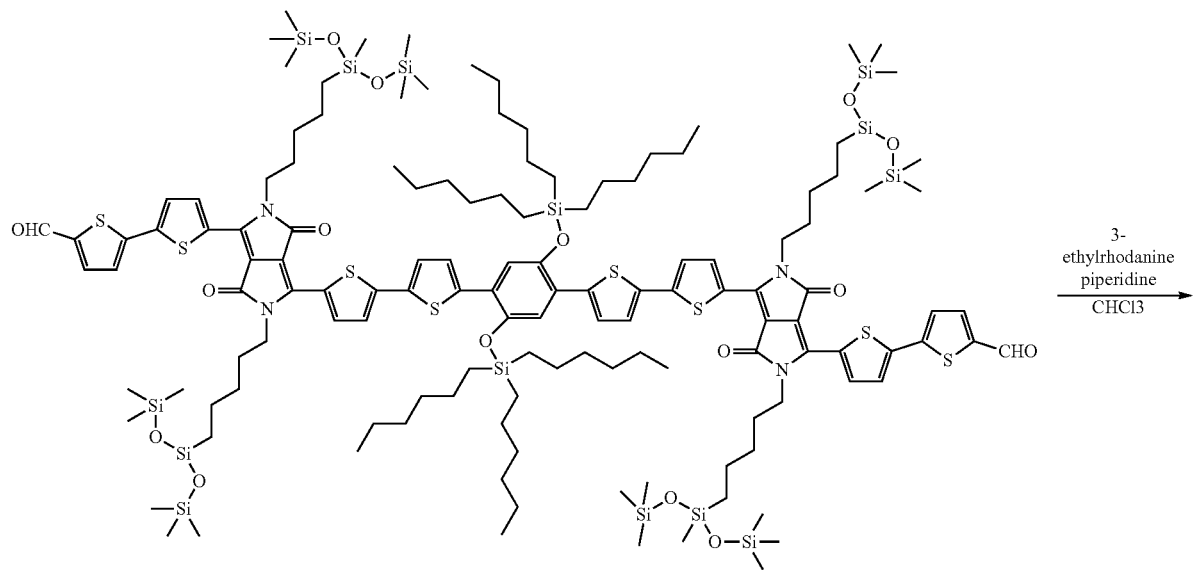

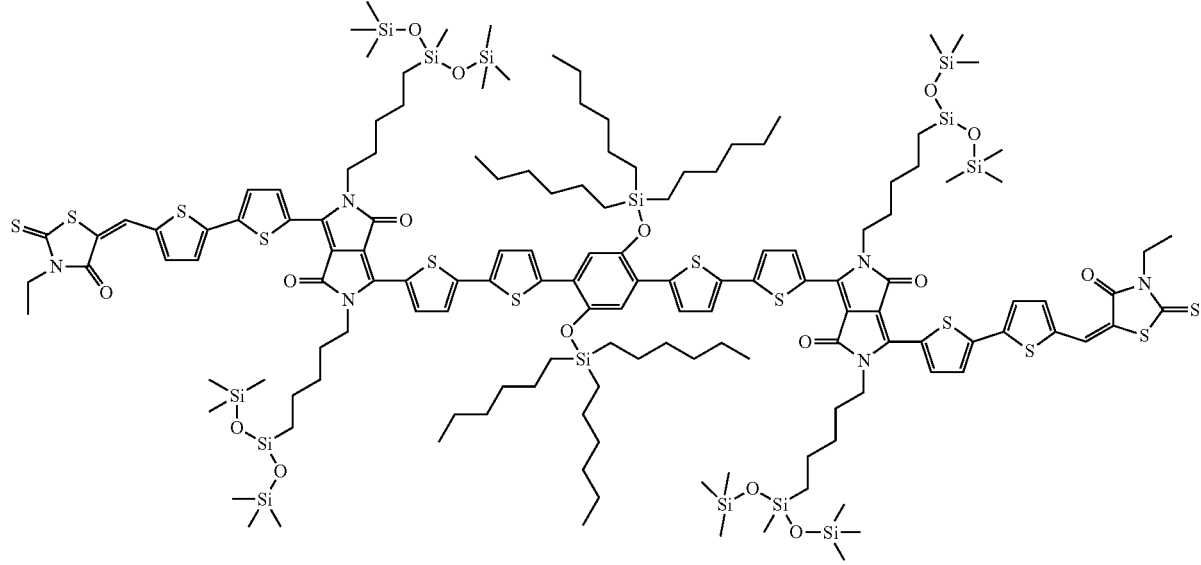 [SMILES: CCCCCC[Si](CCCCCC)(CCCCCC)Oc1cc(-c2ccc(-c3ccc(C4=C5C(=O)N(CCCCC[Si](C)(O[Si](C)(C)C)O[Si](C)(C)C)C(c6ccc(-c7ccc(/C=C8/SC(=S)N(CC)C8=O)s7)s6)=C5C(=O)N4CCCCC[Si](C)(O[Si](C)(C)C)O[Si](C)(C)C)s3)s2)c(O[Si](CCCCCC)(CCCCCC)CCCCCC)cc1-c1ccc(-c2ccc(C3=C4C(=O)N(CCCCC[Si](C)(O[Si](C)(C)C)O[Si](C)(C)C)C(c5ccc(-c6ccc(/C=C7/SC(=S)N(CC)C7=O)s6)s5)=C4C(=O)N3CCCCC[Si](C)(O[Si](C)(C)C)O[Si](C)(C)C)s2)s1]

[5]

The precursor and 3-ethylrhodanine were dissolved in CHCl$_3$, three drops of piperidine were introduced thereto at room temperature, and the result was refluxed for 24 hours. After the reaction, the result was extracted with DCM, and after removing residual water with magnesium sulfate (MgSO$_4$), the solvent was removed under vacuum. The residual product passed through a silica column (eluent: CHCl$_3$ to CHCl$_3$ with EA) to obtain dark green solids. The obtained solids (Compound 5) were recrystallized with CHCl$_3$ and hexane.

Figure 11:
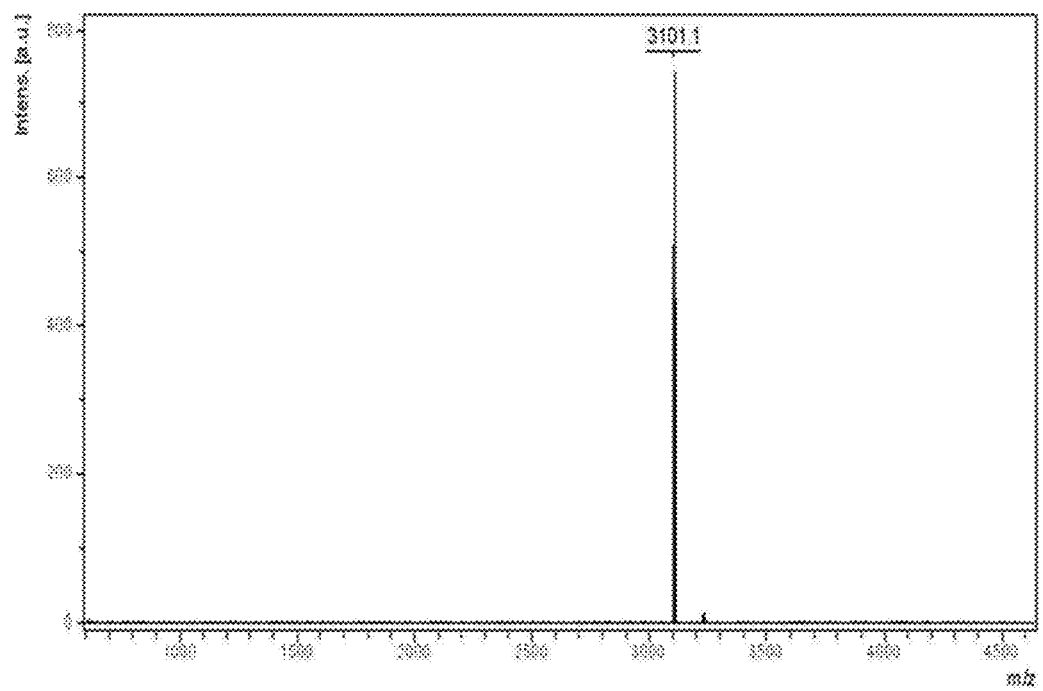
FIG. 11 is a diagram showing an MS spectrum of Compound 5.

FIG. 11 is a diagram showing an MS spectrum of Compound 5.

Preparation Example 6. Preparation of Compound 6

(1) Preparation of Compound 6-3

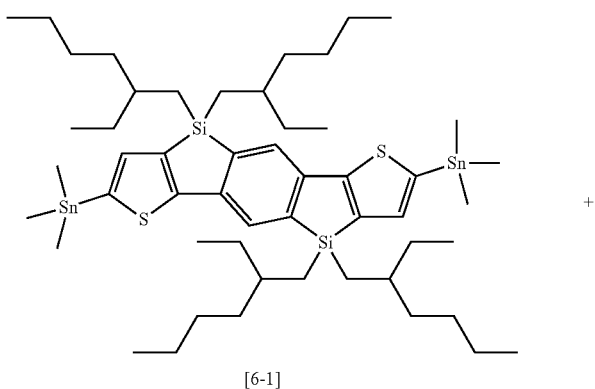

[6-1]

-continued

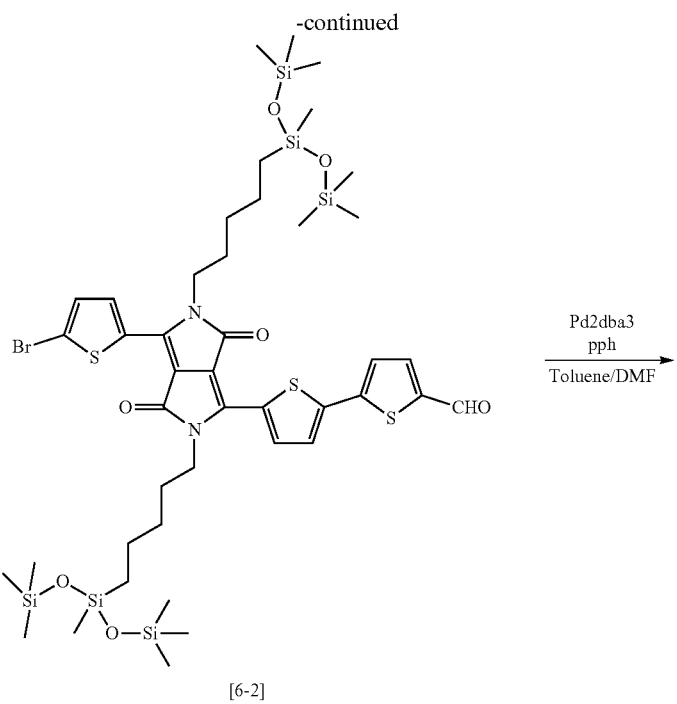

[6-2]

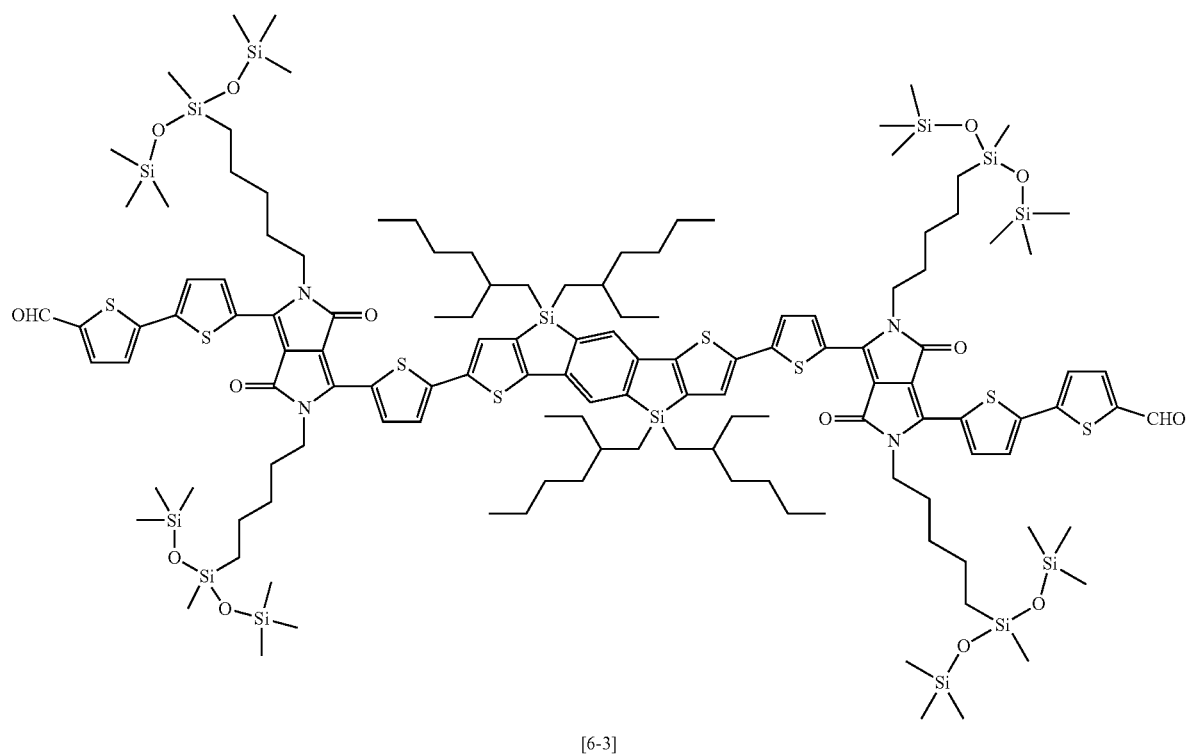

[6-3]

Compound 6-1 (1.18 g, 1.1 mmol) and Compound 6-2 (2.62 g, 2.45 mmol) were dissolved in toluene (60 mL) and DMF (6 mL), a $Pd_2dba_3$ catalyst (0.0504 g, 0.055 mmol) and a $PPh_3$ ligand (0.058 g, 0.22 mmol) were introduced thereto, and the result was stirred for 48 hours at 110° C. After the reaction, the result was extracted with DCM, and after removing residual water with magnesium sulfate ($MgSO_4$), the solvent was removed under vacuum. The residual product passed through a silica column (eluent: DCM to Cf) to obtain dark purple solids (Compound 6-3) (59%).

(2) Preparation of Compound 6

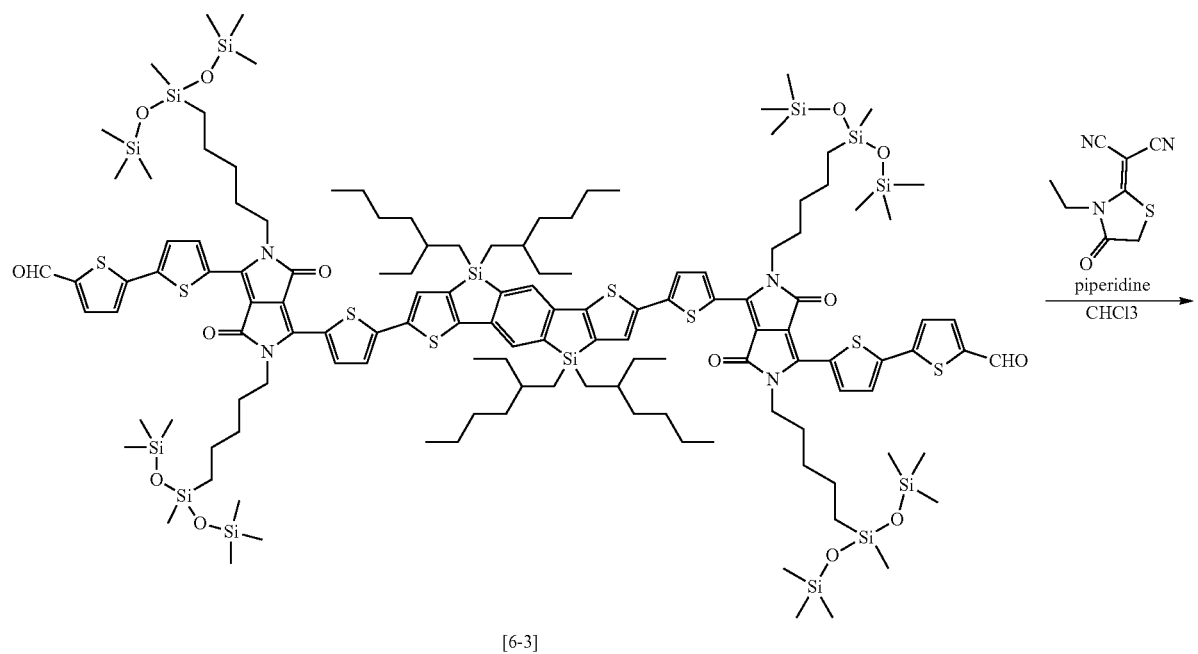

[6-3]

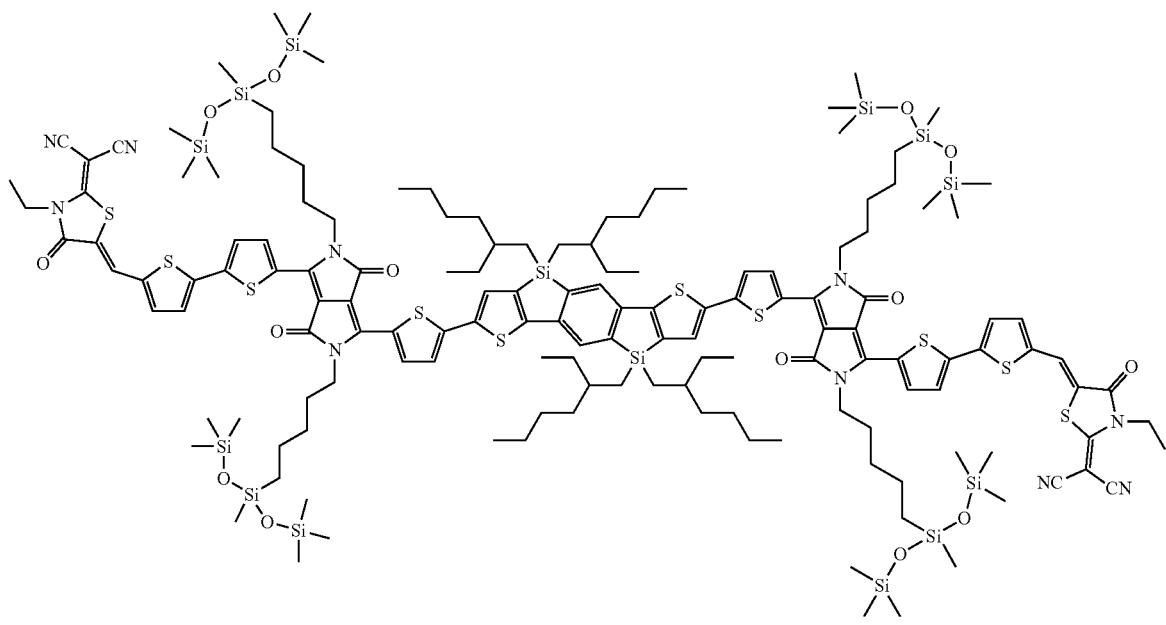

[6]

The precursor and an end group were dissolved in CHCl₃, three drops of piperidine were introduced thereto at room temperature, and the result was refluxed for 24 hours. After the reaction, the result was extracted with DCM, and after removing residual water with magnesium sulfate (MgSO₄), the solvent was removed under vacuum. The residual product passed through a silica column (eluent: CHCl₃ to CHCl₃ with EA) to obtain dark green solids (Compound 6). The obtained solids were recrystallized with CHCl₃ and hexane.

Figure 12:
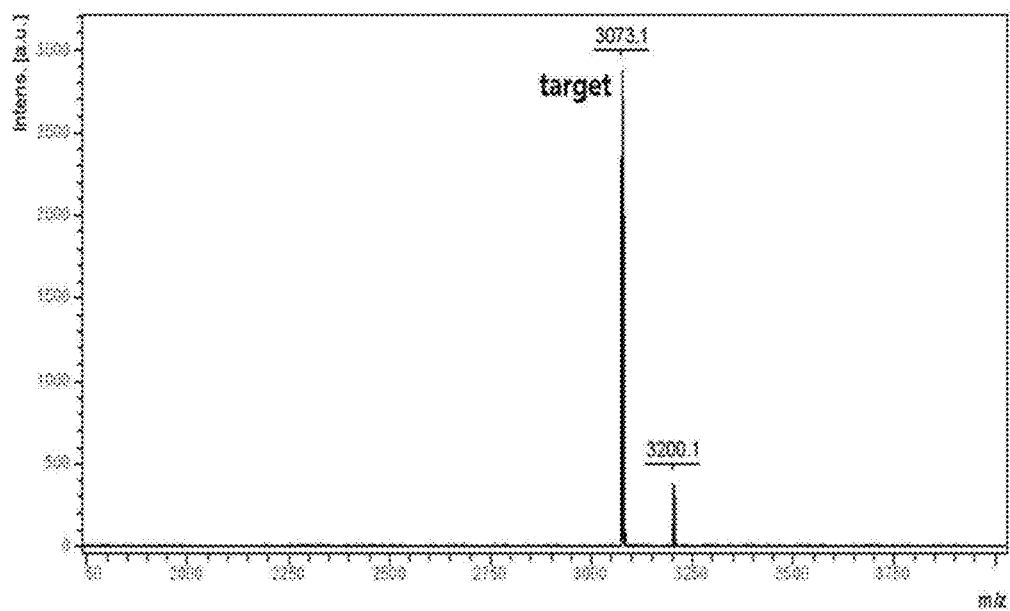
FIG. 12 is a diagram showing an MS spectrum of Compound 6.

FIG. 12 is a diagram showing an MS spectrum of Compound 6.

Preparation Example 7. Preparation of Compound 7

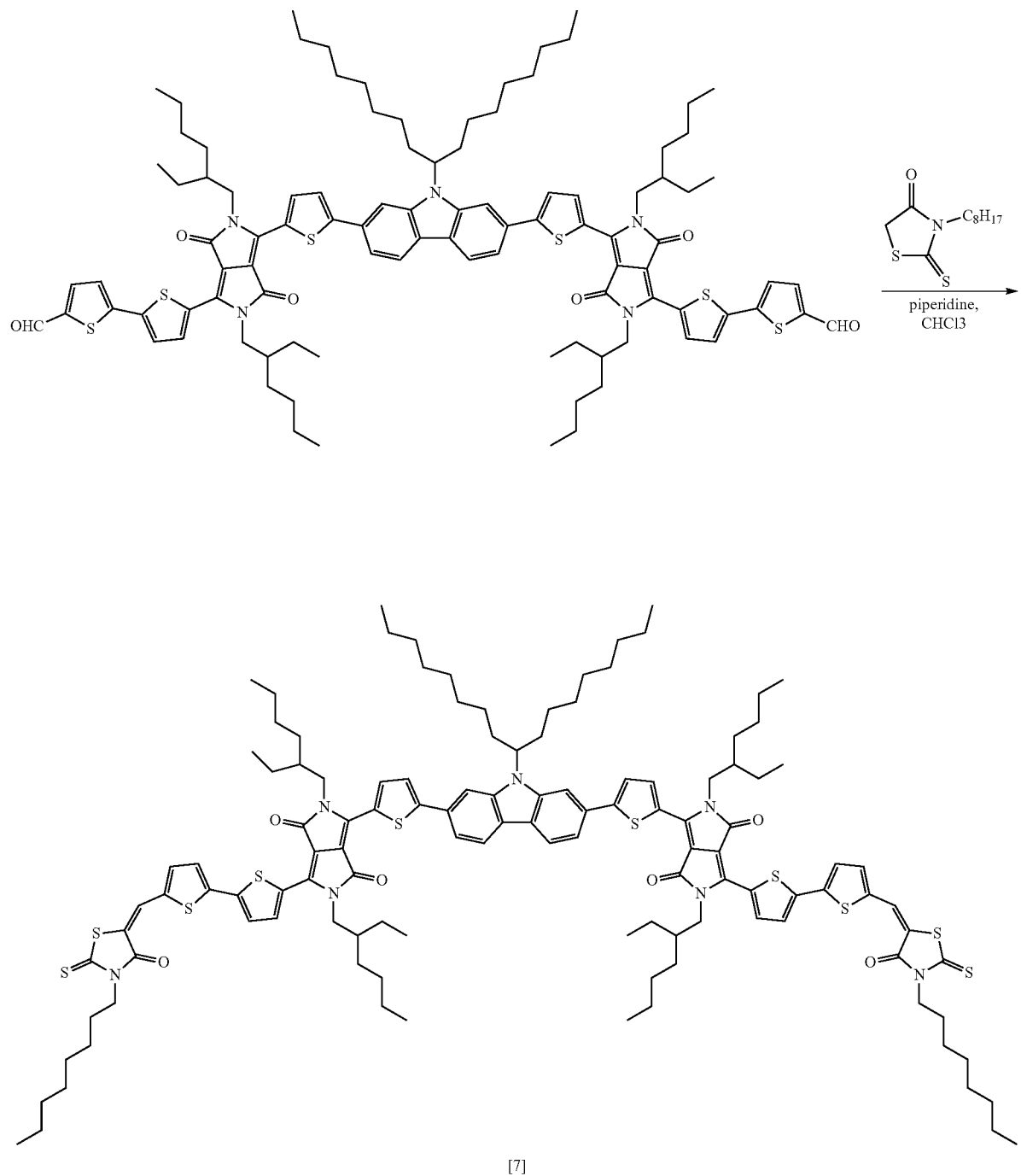

[7]

The precursor (1.17 g, 0.7 mmol) and 3-octylrhodanine (1.72 g, 7.0 mmol) were dissolved in CHCl₃ (70 mL), three drops of piperidine were introduced thereto at room temperature, and the result was refluxed for 24 hours. After the reaction, the result was extracted with DCM, and after removing residual water with magnesium sulfate (MgSO₄), the solvent was removed under vacuum. The residual product passed through a silica column (eluent: CHCl₃ to CHCl₃ with EA) to obtain dark green solids. The obtained solids (Compound 7) were recrystallized with CHCl₃ and hexane (96%).

Figure 13:
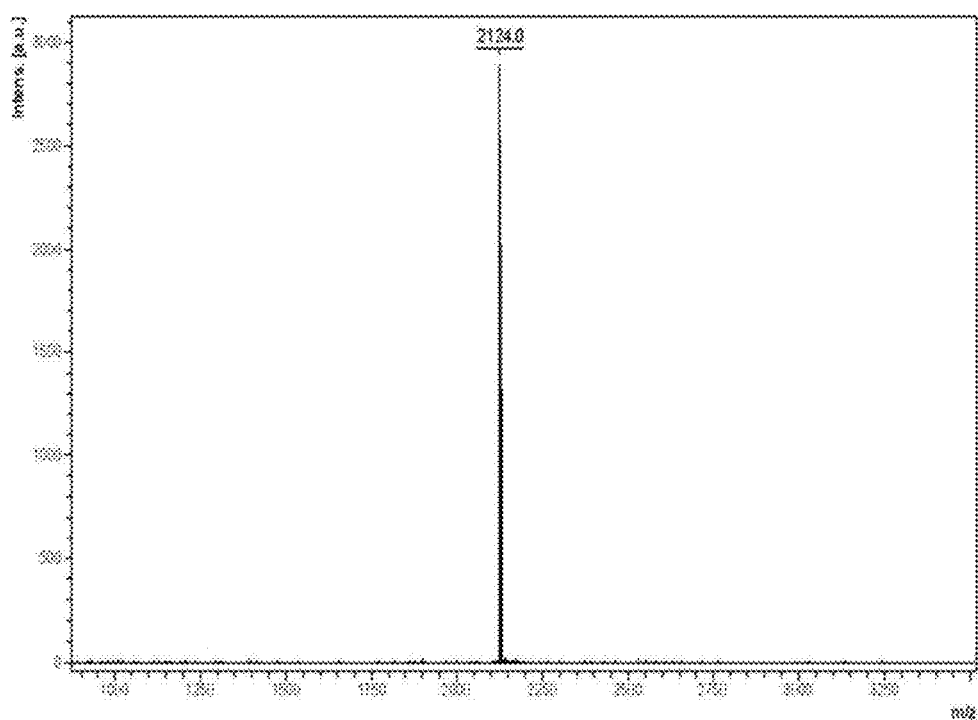
FIG. 13 is a diagram showing an MS spectrum of Compound 7.

FIG. 13 is a diagram showing an MS spectrum of Compound 7.

Preparation Example 8. Preparation of Compound 8

(1) Preparation of Compound 8-2

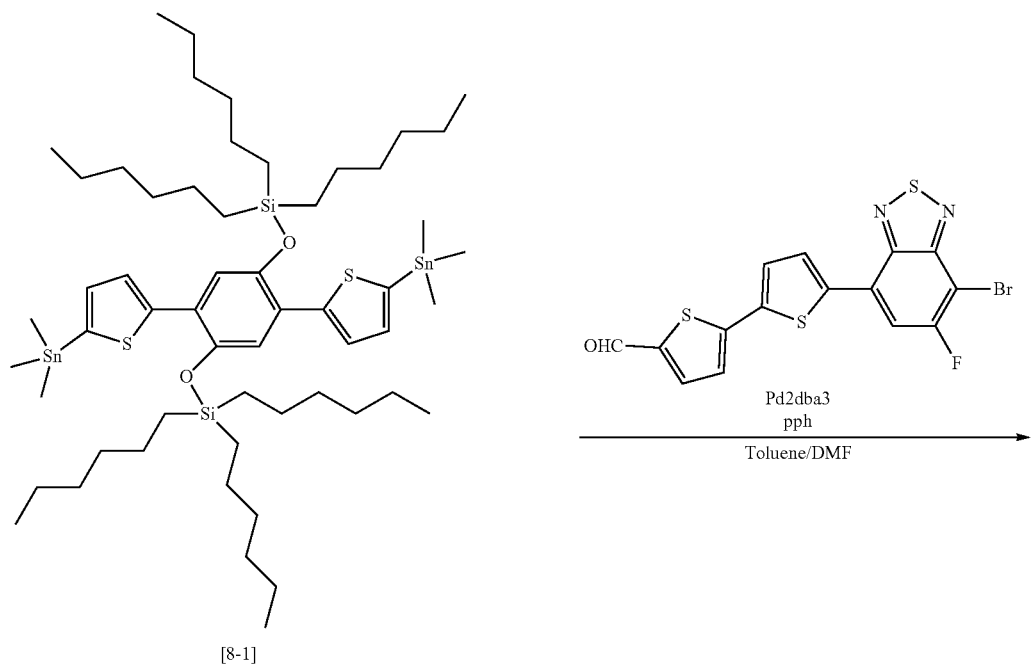

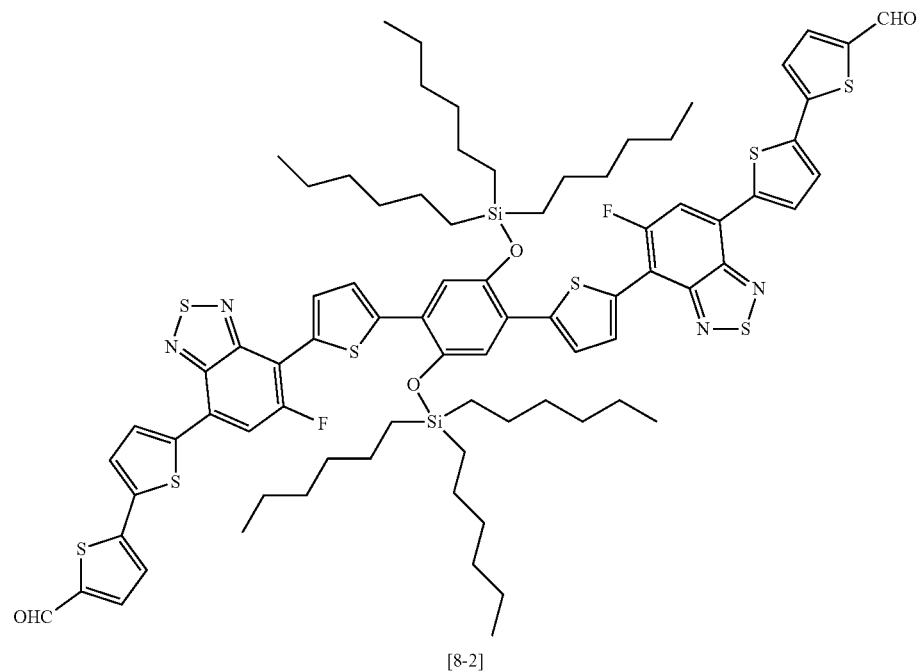

Compound 8-1 (0.99 g, 0.85 mmol) and a bromo compound (0.808 g, 1.9 mmol) were dissolved in toluene (40 mL) and DMF (4 mL), a $Pd_2dba_3$ catalyst (0.0385 g, 0.042 mmol) and a $PPh_3$ ligand (0.0441 g, 0.168 mmol) were introduced thereto, and the result was stirred for 48 hours at 110° C. After the reaction, the result was extracted with DCM, and after removing residual water with magnesium sulfate ($MgSO_4$), the solvent was removed under vacuum. The residual product passed through a silica column (eluent: DCM to Cf) to obtain dark purple solids (Compound 8-2).

Figure 14:
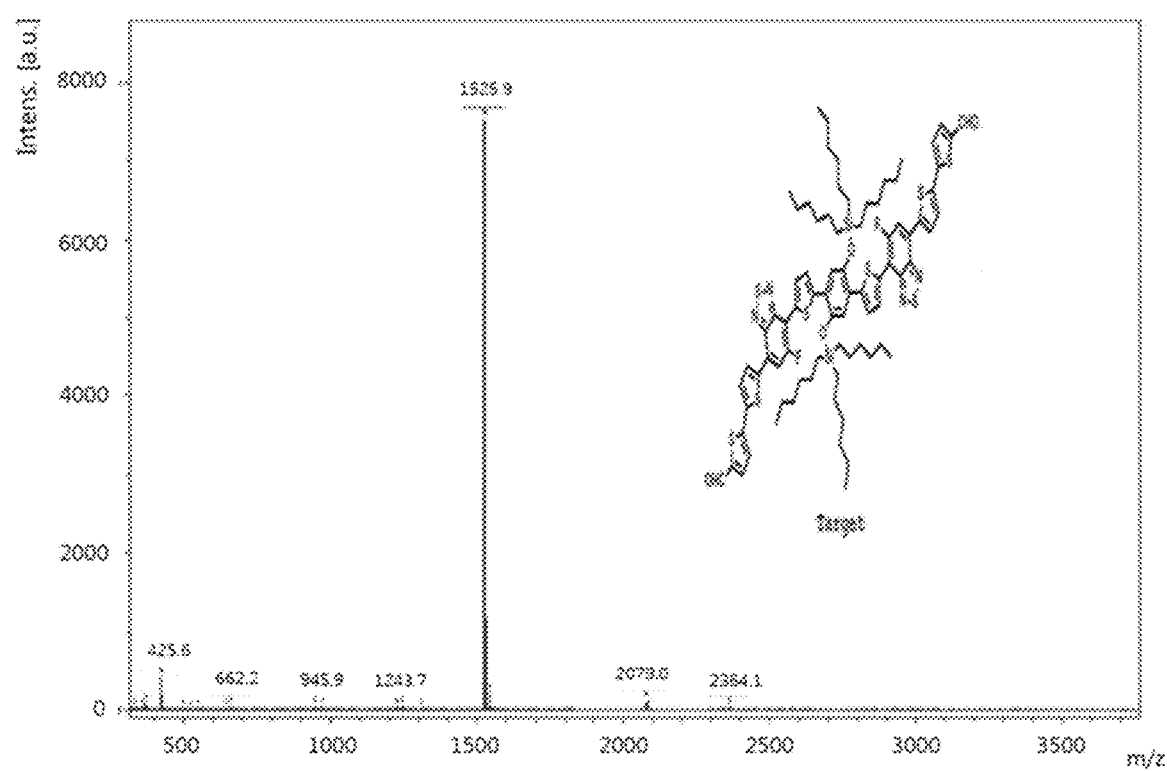
FIG. 14 is a diagram showing an MS spectrum of Compound 8-2.

FIG. 14 is a diagram showing an MS spectrum of Compound 8-2.

(2) Preparation of Compound 8

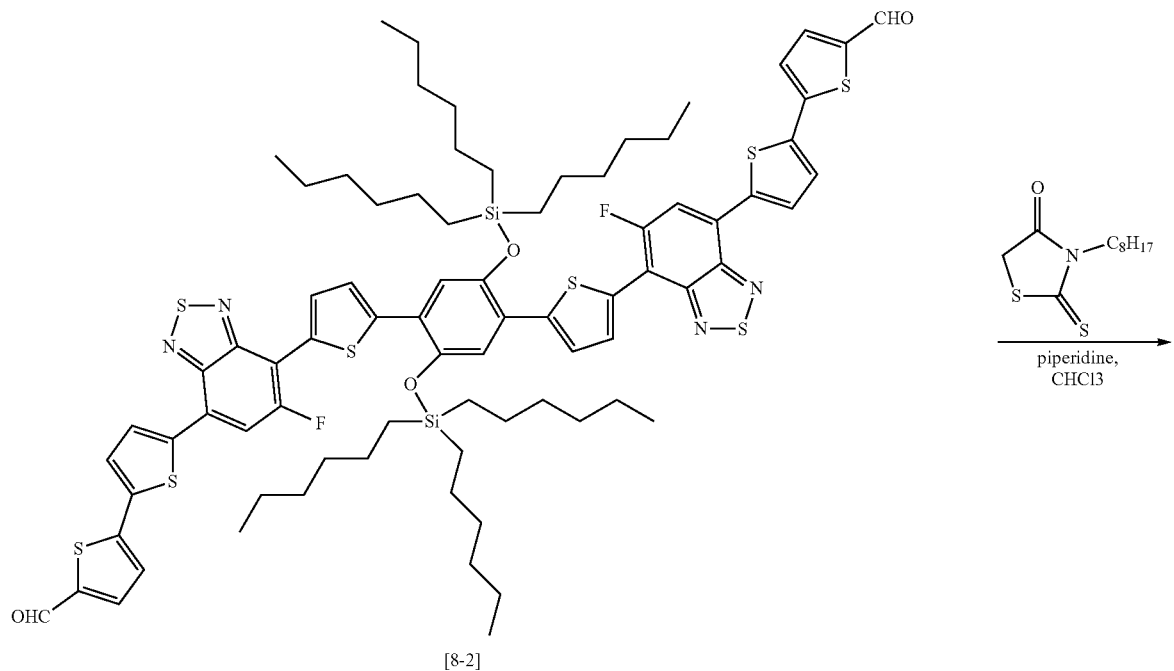

[8-2]

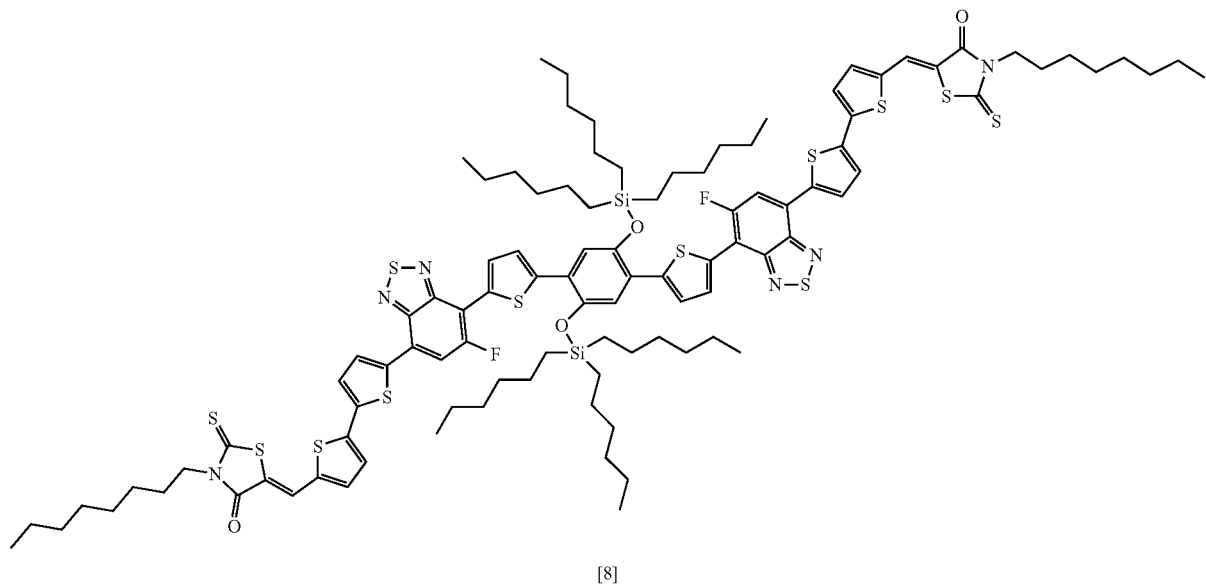

[8]

Compound 8-2 (0.153 g, 0.1 mmol) and 3-octylrhodanine (0.245 g, 1.0 mmol) were dissolved in CHCl₃ (10 mL), three drops of piperidine were introduced thereto at room temperature, and the result was refluxed for 24 hours. After the reaction, the result was extracted with DCM, and after removing residual water with magnesium sulfate (MgSO₄), the solvent was removed under vacuum. The residual product passed through a silica column (eluent: CH₂Cl₂ to CHCl₃) to obtain dark purple solids (Compound 8).

Figure 15:
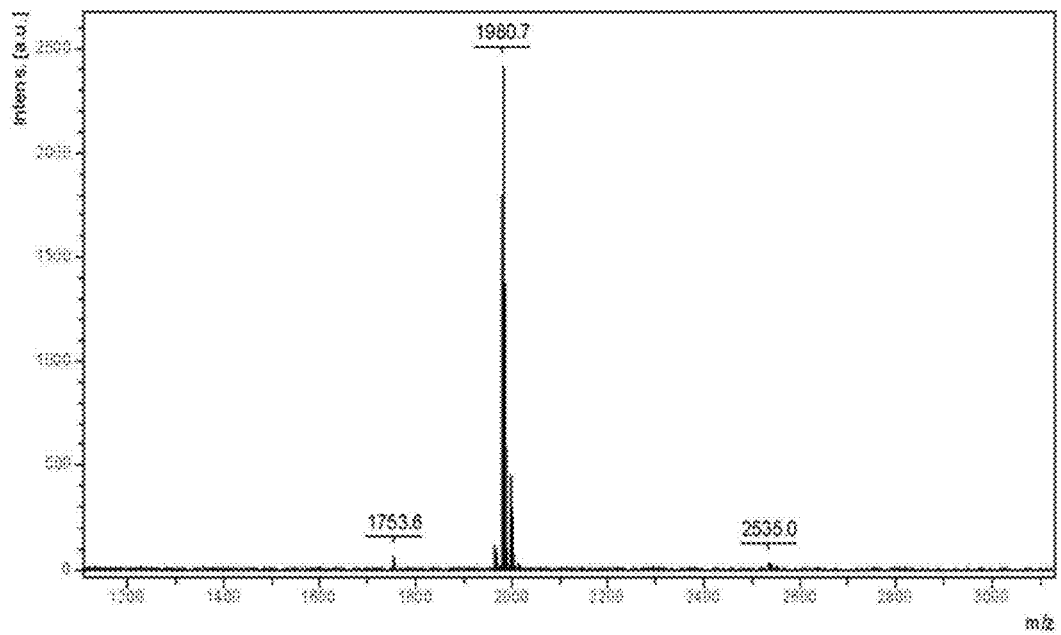
FIG. 15 is a diagram showing an MS spectrum of Compound 8.

FIG. 15 is a diagram showing an MS spectrum of Compound 8.

Preparation Example 9. Preparation of Compound 9

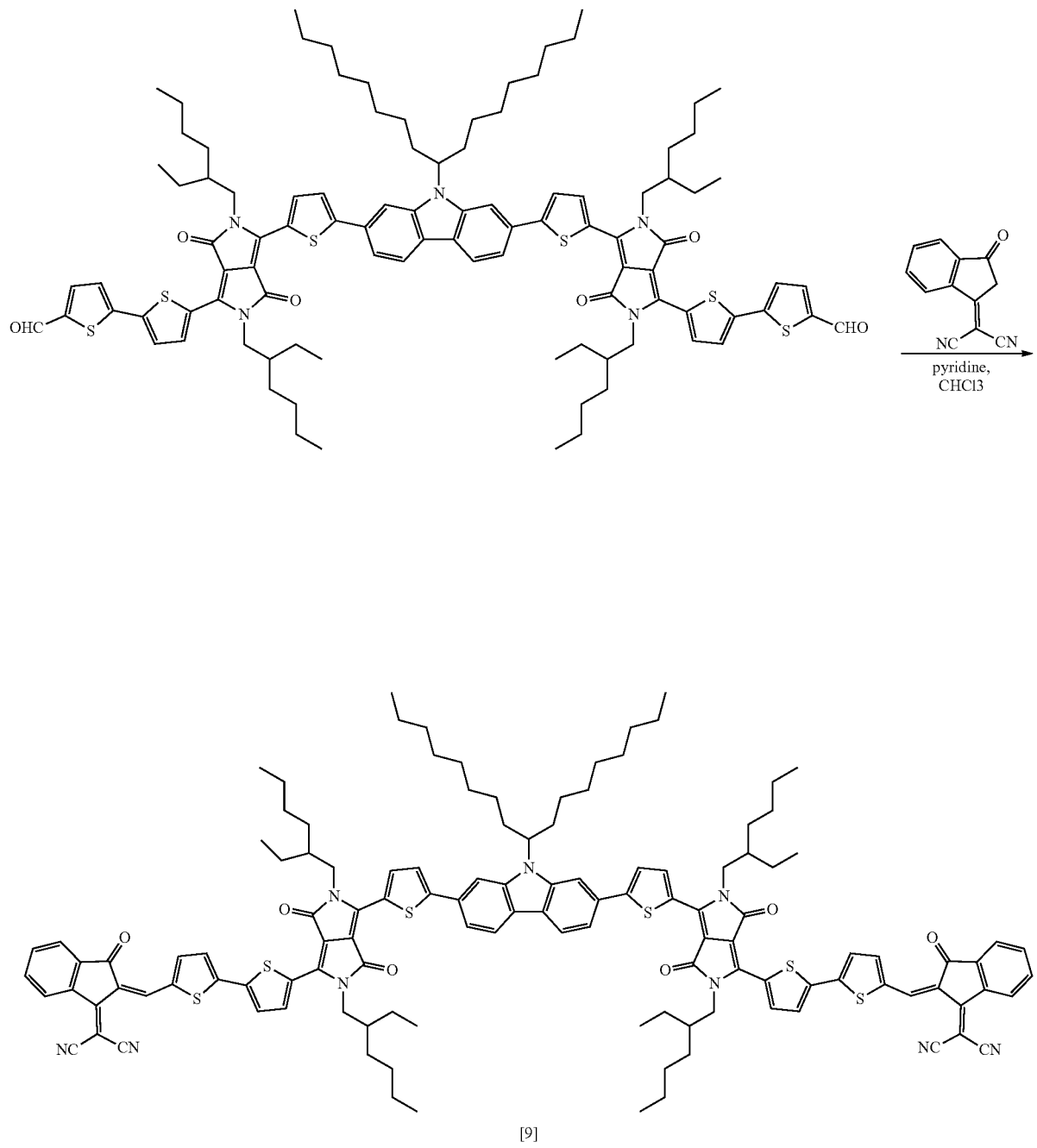

[9]

The precursor and an end group were dissolved in CHCl₃ (10 mL), pyridine (5 mL) was introduced thereto at room temperature, and the result was refluxed for 24 hours. After the reaction, the result was extracted with DCM, and after removing residual water with magnesium sulfate (MgSO₄), the solvent was removed under vacuum. The residual product passed through a silica column (eluent: CH₂Cl₂ to CHCl₃) to obtain dark purple solids (Compound 9).

Figure 16:
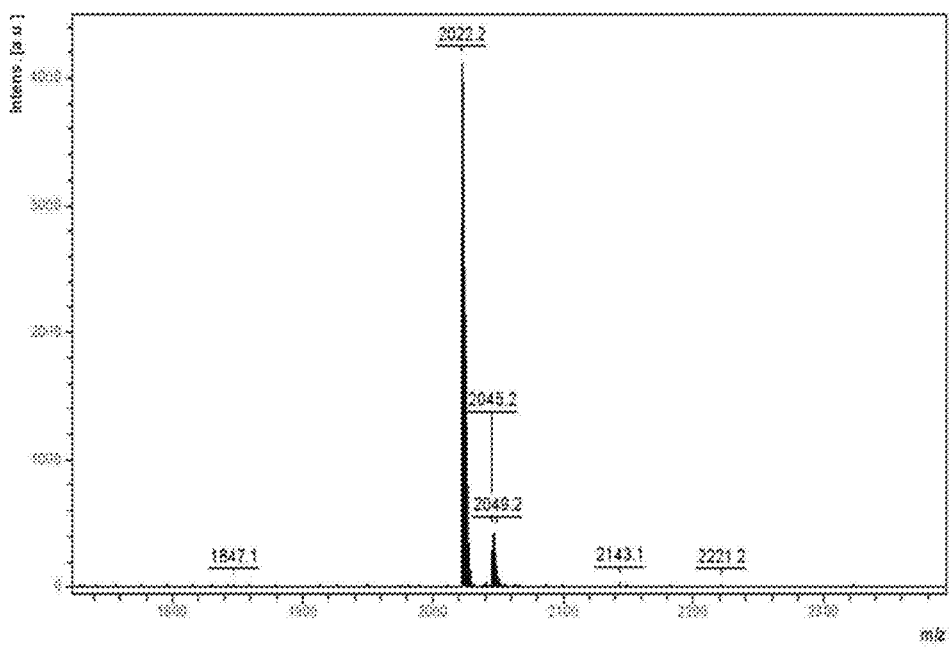
FIG. 16 is a diagram showing an MS spectrum of Compound 9.

FIG. 16 is a diagram showing an MS spectrum of Compound 9.

Preparation Example 10. Preparation of Compound 10

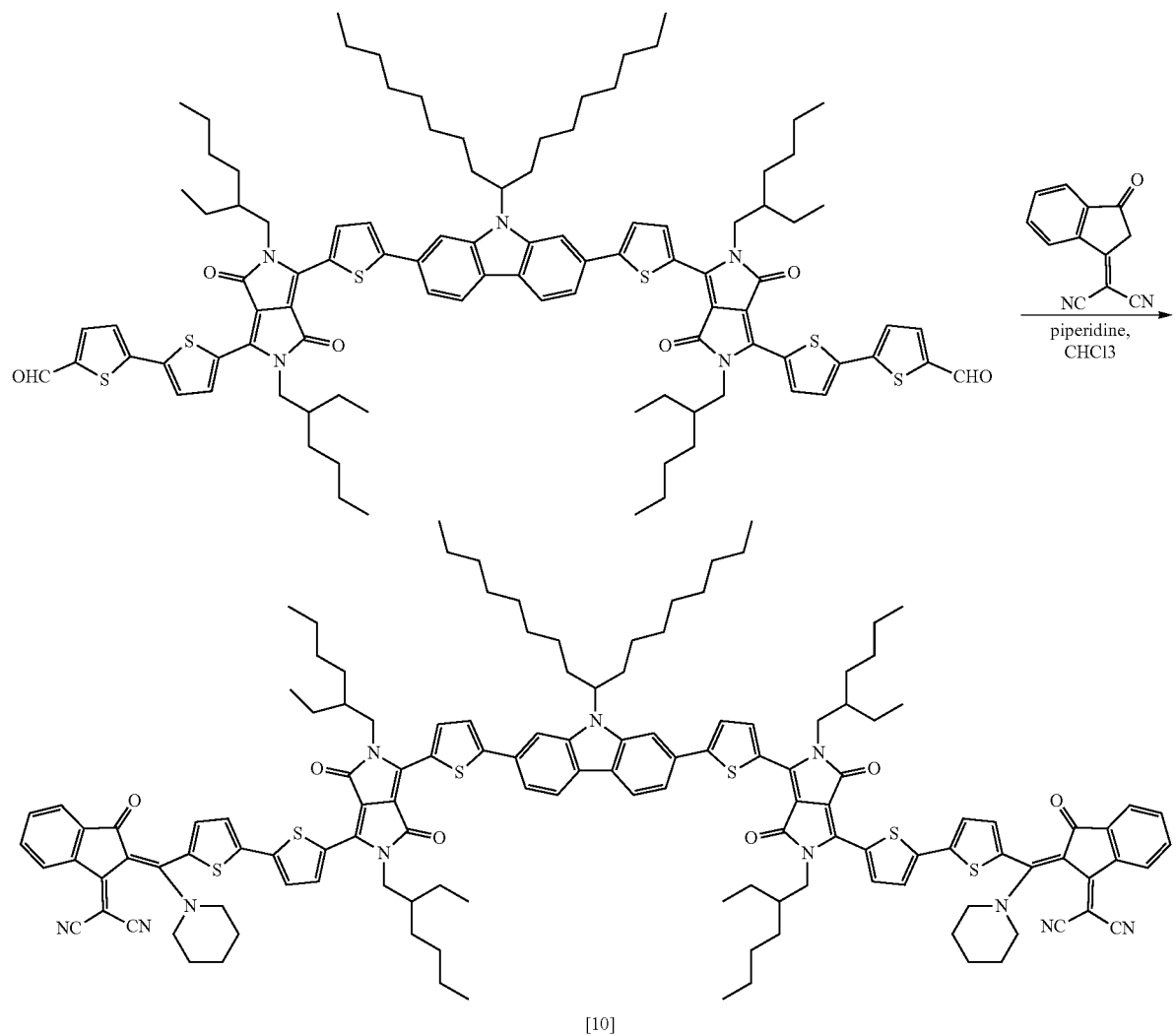

[10]

The precursor and an end group were dissolved in CHCl$_3$ (10 mL), piperidine (1 mL) was introduced thereto at room temperature, and the result was refluxed for 24 hours. After the reaction, the result was extracted with DCM, and after removing residual water with magnesium sulfate (MgSO$_4$), the solvent was removed under vacuum. The residual product passed through a silica column (eluent: CH$_2$Cl$_2$ to CHCl$_3$) to obtain dark purple solids (Compound 10).

Figure 17:
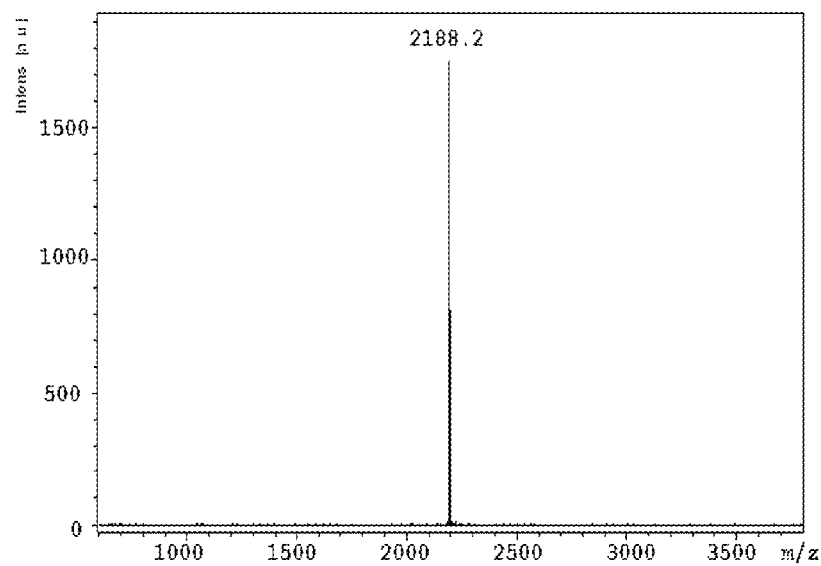
FIG. 17 is a diagram showing an MS spectrum of Compound 10.

FIG. 17 is a diagram showing an MS spectrum of Compound 10.

Preparation Example 11. Preparation of Compound 11

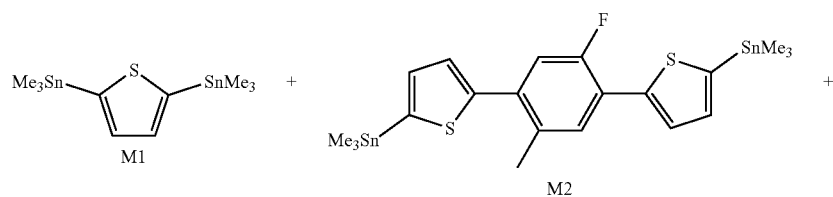

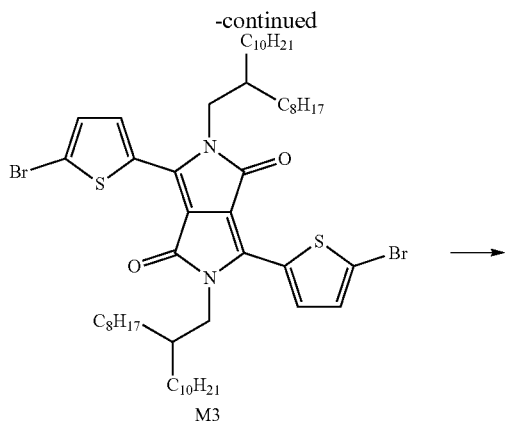

M3

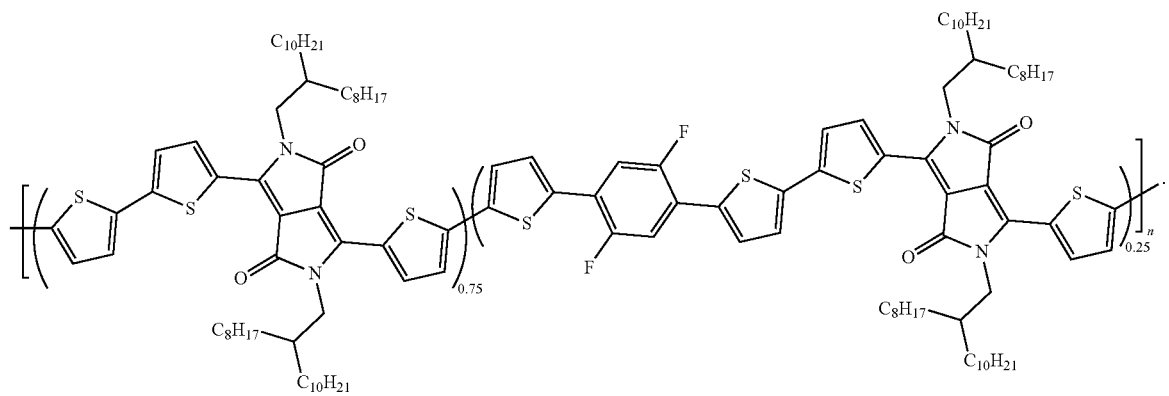

M1 (215 mg, 0.525 mmol), M2 (106 mg, 0.175 mmol), M3 (712 mg, 0.7 mmol), tris(dibenzylideneacetone)dipalladium(0) (2 mol %) and tri(o-tolyl)phosphine (8 mol %) were introduced to a microwave reactor, dissolved in chlorobenzene (6 mL), and the result was polymerized for 10 minutes at 120° C., 20 minutes at 150° C., 30 minutes at 170° C., and 10 minutes at 180° C. After the polymerization, 2,5-bis(trimethylstannyl)thiophene and 4-bromobenzotrifluoride were introduced thereto, and the result was further reacted for 30 minutes at 150° C. The reaction material was immersed into methanol, and purified through Soxhlet in the order of methanol, hexane, dichloromethane and chloroform. The polymer dissolved in chloroform was precipitated in methanol, and then filtered to obtain a final polymer. (Yield=82.4%; Mn=44.6 kDa, and polydispersity index (PDI)=1.44)

Preparation Example 12. Preparation of Compound 12

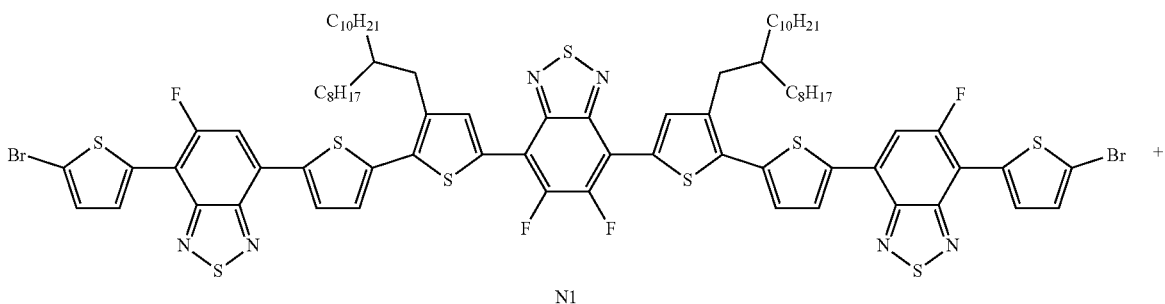

N1

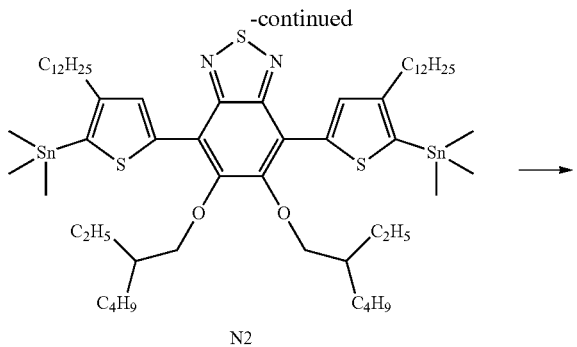

N2

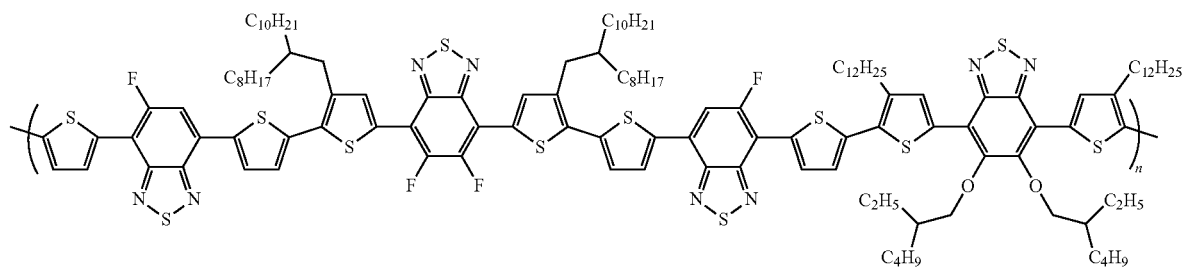

N1 (506.4 mg, 0.3 mmol), N2 (365.7 mg, 0.3 mmol) and tetrakis(triphenylphosphine)palladium (6.9 mg, 0.006 mmol) were introduced to a microwave reactor, dissolved in toluene (4 mL) and DMF (2 mL), and the result was polymerized for 10 minutes at 110° C., 10 minutes at 130° C., 10 minutes at 140° C., and 60 minutes at 150° C. After the polymerization, the reaction material was immersed into methanol, and purified through Soxhlet in the order of methanol, hexane, dichloromethane and chloroform. The polymer dissolved in chloroform was precipitated in methanol, and then filtered to obtain a final polymer. (Yield=24%, Mn=9.9 kDa, PDI=1.508)

Preparation Example 13. Preparation of Compound 13

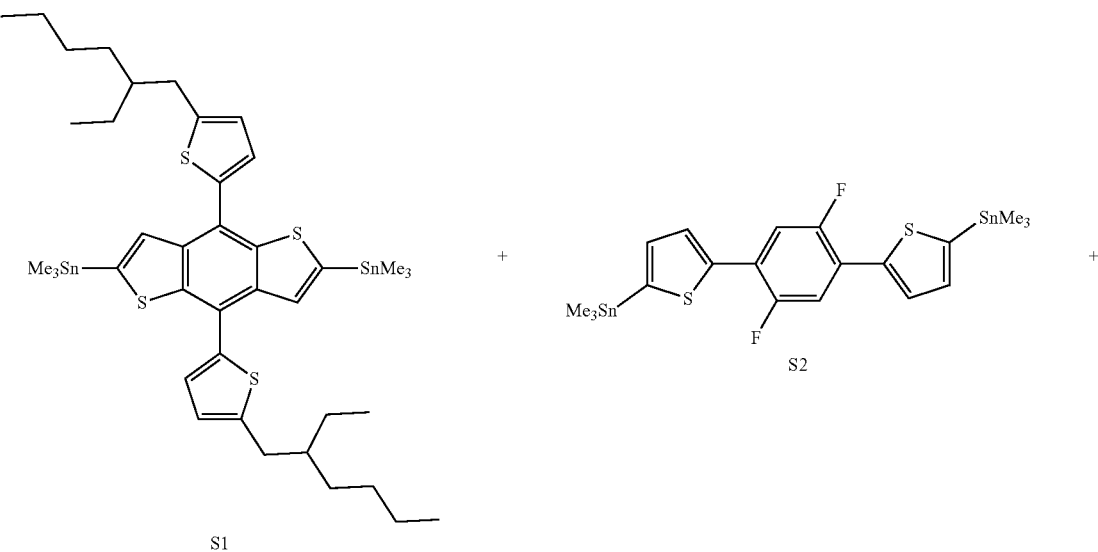

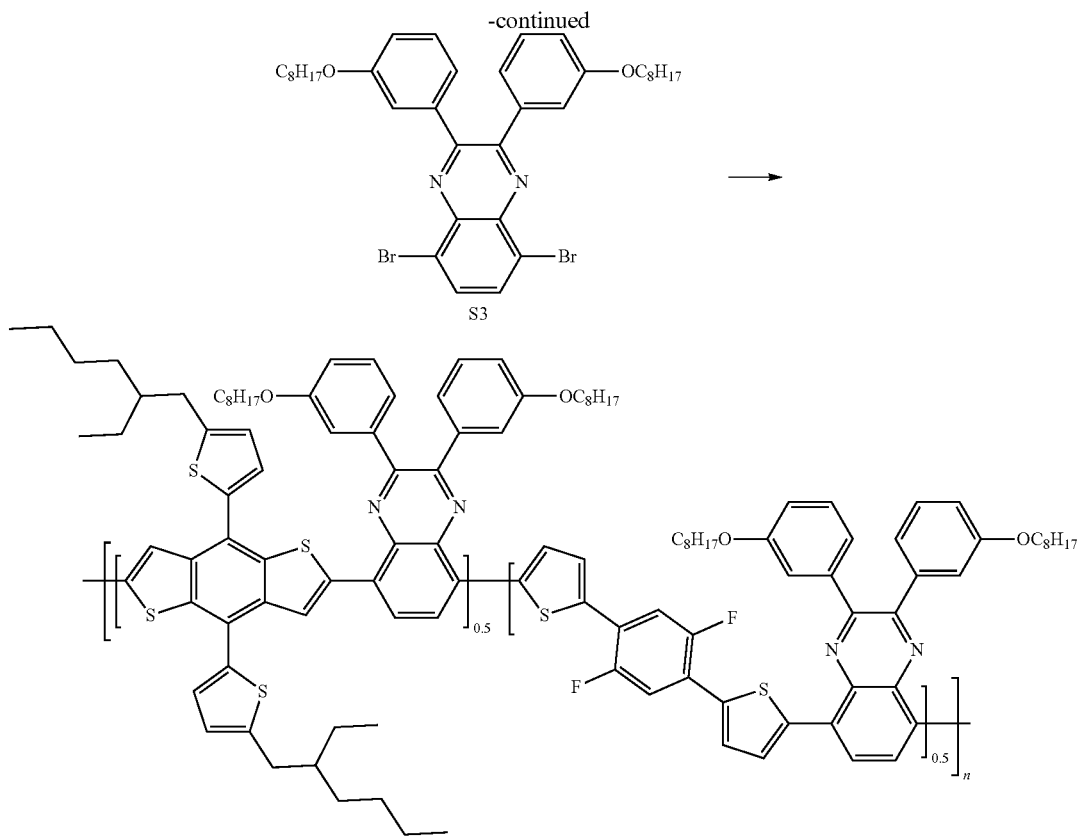
-continued

S1 (0.316 g, 0.35 mmol), S2 (0.211 g, 0.35 mmol), S3 (0.487 g, 0.7 mmol), tris(dibenzylideneacetone)dipalladium (0) (2 mol %), tri(o-tolyl)phosphine (8 mol %) and vacuum chlorobenzene (7 mL) were introduced to a microwave reactor, and the result was polymerized for 10 minutes at 120° C., 20 minutes at 150° C., 30 minutes at 170° C., and 10 minutes at 180° C. After the polymerization, the polymer was final capped with 2,5-bis(trimethylstannyl)thiophene and 4-bromobenzotrifluoride each for 30 minutes at 150° C. After the polymerization, the reaction material was immersed into methanol, and purified through Soxhlet in the order of methanol, hexane and dichloromethane. The polymer dissolved in dichloromethane was precipitated in methanol, and then filtered to obtain a final polymer. (Yield=24%, Mn=3.2 kDa, PDI=1.57)

Example 1

After dissolving Compound 5 according to Preparation Example 5 in a chlorobenzene solvent in 7 wt %, a poly(3-hexylthiophene (P3HT)-wrapped carbon nanotube was mixed with the chlorobenzene solution (concentration-100 μg/mL) in a 1:1 volume ratio. After that, the result was spin coated on an indium tin oxide (ITO) substrate, a working electrode, and then dried. As an electrolyte layer, a material dissolving $LiClO_4$ in propylene carbonate was used as the electrolyte, and platinum and silver electrodes were used as a counter electrode and a reference electrode, respectively, to manufacture an electrochromic device.

Comparative Example 1

An electrochromic device was manufactured in the same manner as in Example 1 except that the poly(3-hexylthiophene (P3HT)-wrapped carbon nanotube was not used.

Figure 18:
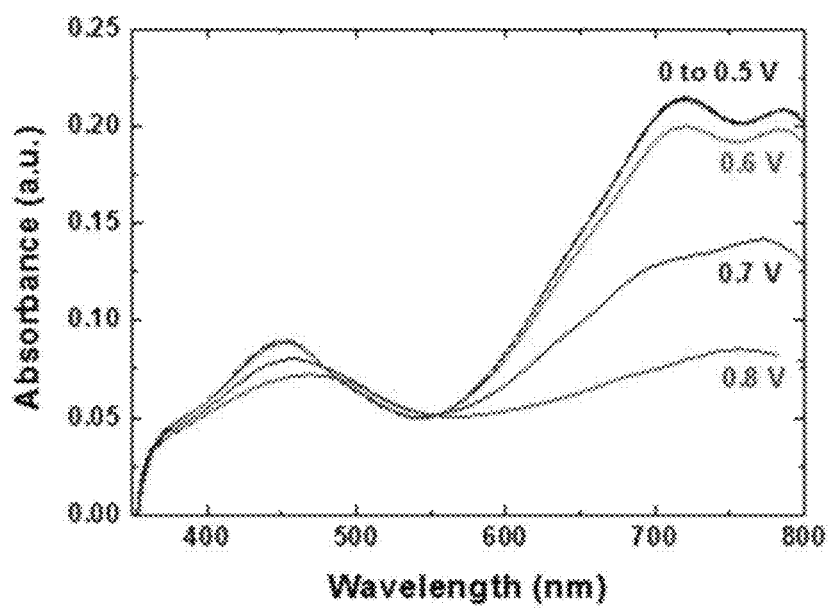
FIG. 18 is a diagram showing an absorption wavelength depending on changes in a voltage applied to an electrochromic device according to Comparative Example 1.
Figure 19:
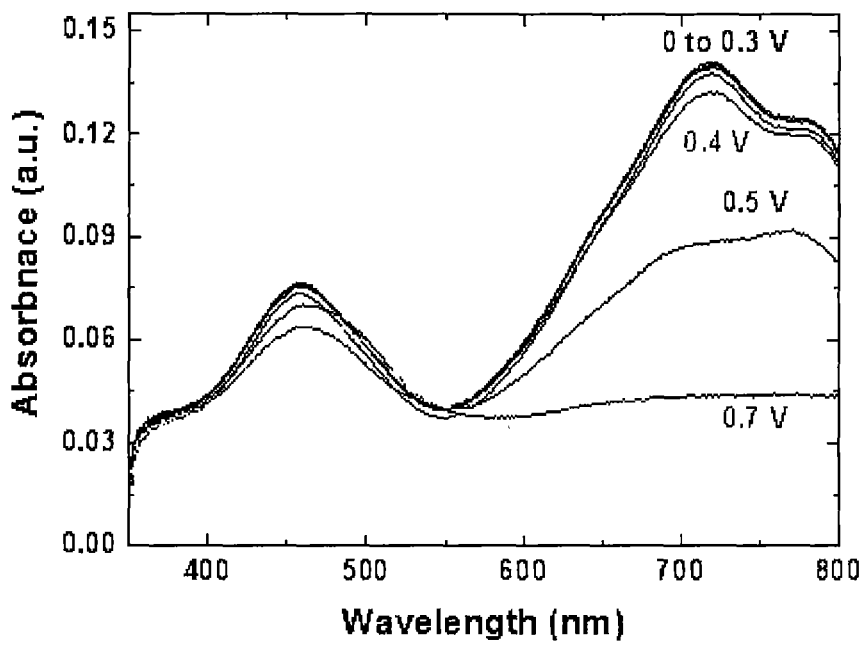
FIG. 19 is a diagram showing an absorption wavelength depending on changes in a voltage applied to an electrochromic device according to Example 1.

For the electrochromic devices manufactured according to Example 1 and Comparative Example 1, changes in the absorption wavelength depending on the changes in the applied voltage were measured, and the results are shown in FIG. 18 and FIG. 19.

In FIG. 18 of Comparative Example 1, decoloration, a phenomenon of decreasing absorption, was observed from 0.6 V, however, it was identified that, in FIG. 19 of Example 1, absorption decreased from 0.4 V. Through this, a decrease in the driving voltage of the electrochromic device was identified, and it was identified that device stability of the electrochromic device was relatively improved since the device was driven at a low voltage.

Figure 20:
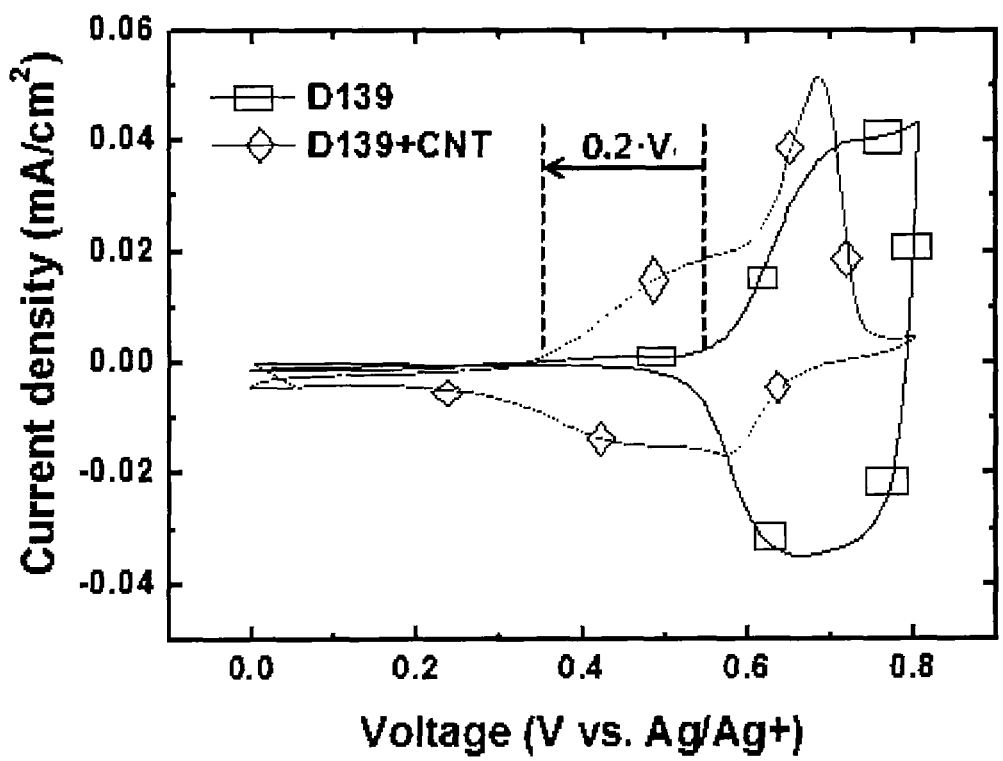
FIG. 20 is a diagram showing CV results on electrochromic devices according to Example 1 and Comparative Example 1.

In addition, FIG. 20 is a diagram showing CV results of Example 1 and Comparative Example 1. As identified in FIG. 20, it was identified that, in the CV, the electrochromic device of Example 1 had oxidation potential decreasing by approximately 0.2 V compared to the electrochromic device of Comparative Example 1, which means an increase in the activity of the electrochemical reaction.

Example 2

After dissolving P3HT in a chlorobenzene solvent in 7 wt %, a poly(3-hexylthiophene (P3HT)-wrapped carbon nanotube was mixed with the chlorobenzene solution (concentration-100 μl g/mL) in a 0.5:1 volume ratio. After that, the result was spin coated on an indium tin oxide (ITO) substrate, a working electrode, and then dried. As an electrolyte layer, a material dissolving $LiClO_4$ in propylene carbonate was used as the electrolyte, and platinum and silver electrodes were used as a counter electrode and a reference electrode, respectively, to manufacture an electrochromic device.

Example 3

After dissolving P3HT in a chlorobenzene solvent in 7 wt %, a poly(3-hexylthiophene (P3HT)-wrapped carbon nanotube was mixed with the chlorobenzene solution (concentration-100 μg/mL) in a 1:1 volume ratio. After that, the result was spin coated on an indium tin oxide (ITO) substrate, a working electrode, and then dried. As an electrolyte layer, a material dissolving $LiClO_4$ in propylene carbonate was used as the electrolyte, and platinum and silver electrodes were used as a counter electrode and a reference electrode, respectively, to manufacture an electrochromic device.

Example 4

After dissolving P3HT in a chlorobenzene solvent in 7 wt %, a poly(3-hexylthiophene (P3HT)-wrapped carbon nanotube was mixed with the chlorobenzene solution (concentration-100 μg/mL) in a 2:1 volume ratio. After that, the result was spin coated on an indium tin oxide (ITO) substrate, a working electrode, and then dried. As an electrolyte layer, a material dissolving $LiClO_4$ in propylene carbonate was used as the electrolyte, and platinum and silver electrodes were used as a counter electrode and a reference electrode, respectively, to manufacture an electrochromic device.

Comparative Example 2

An electrochromic device was manufactured in the same manner as in Example 2 except that the poly(3-hexylthiophene (P3HT)-wrapped carbon nanotube was not used.

Example 5

After dissolving Compound 13 according to Preparation Example 13 in a chlorobenzene solvent in 7 wt %, a poly(3-hexylthiophene (P3HT)-wrapped carbon nanotube was mixed with the chlorobenzene solution (concentration-100 μg/mL) in a 1:1 volume ratio. After that, the result was spin coated on an indium tin oxide (ITO) substrate, a working electrode, and then dried. As an electrolyte layer, a material dissolving $LiClO_4$ in propylene carbonate was used as the electrolyte, and platinum and silver electrodes were used as a counter electrode and a reference electrode, respectively, to manufacture an electrochromic device.

Figure 26:
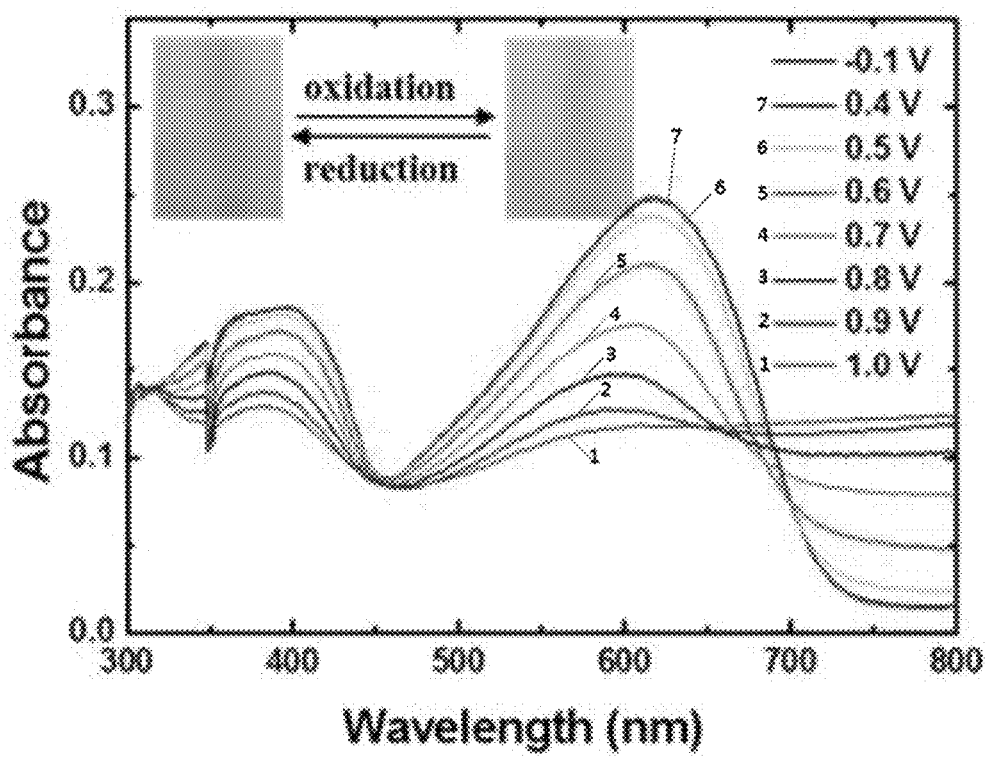
FIG. 26 is a diagram showing changes in absorbance depending on changes in a voltage applied to an electrochromic device according to Example 5.

For the electrochromic device manufactured according to Example 5, changes in absorbance depending on the changes in the applied voltage (spectroelectrochemical graph) were measured, and the results are shown in FIG. 26.

As seen in FIG. 26, absorption peaks were observed at 400 nm and 620 nm before applying a voltage, and it was identified that the absorption peaks gradually decreased when applying a voltage of 0.6 V or greater, and when applying 1.0 V, the absorption peak decreased and transmittance increased.

FIGS. 21 to 25 are diagrams showing differences in the transmittance between a colorated state and a bleached state of Comparative Example 2 and Examples 2 to 5.

Figure 21:
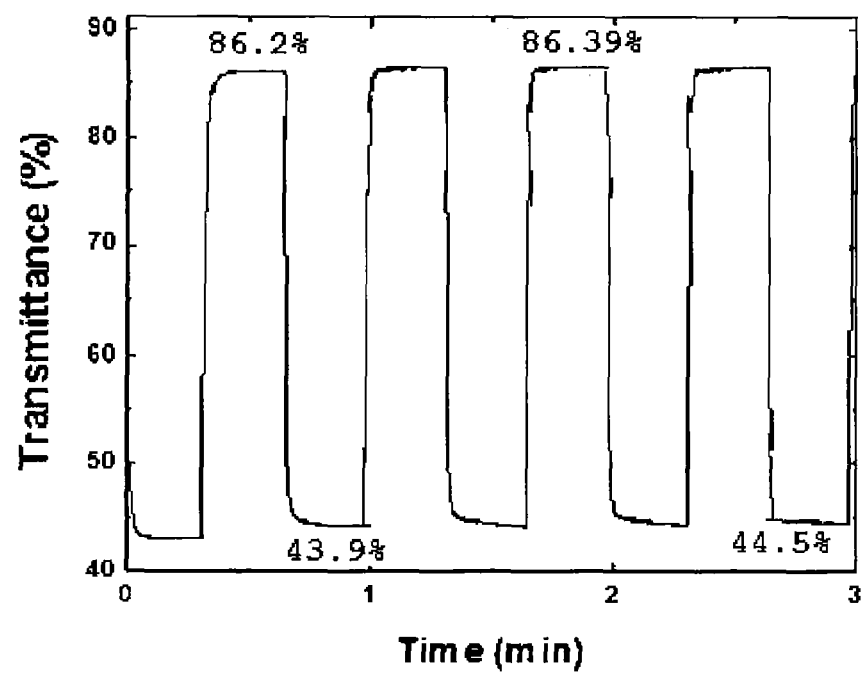
FIGS. 21 to 25 are diagrams showing differences in transmittance between a colorated state and a bleached state of Comparative Example 2 and Examples 2 to 5.

FIG. 21 is a diagram showing a difference in the transmittance between a colorated state and a bleached state of Comparative Example 2. As identified in FIG. 21, a difference in the transmittance between the colorated state and the bleached state was 42.3%, and the coloration speed was 1.1 seconds and the bleaching speed was 1.5 seconds.

Figure 22:
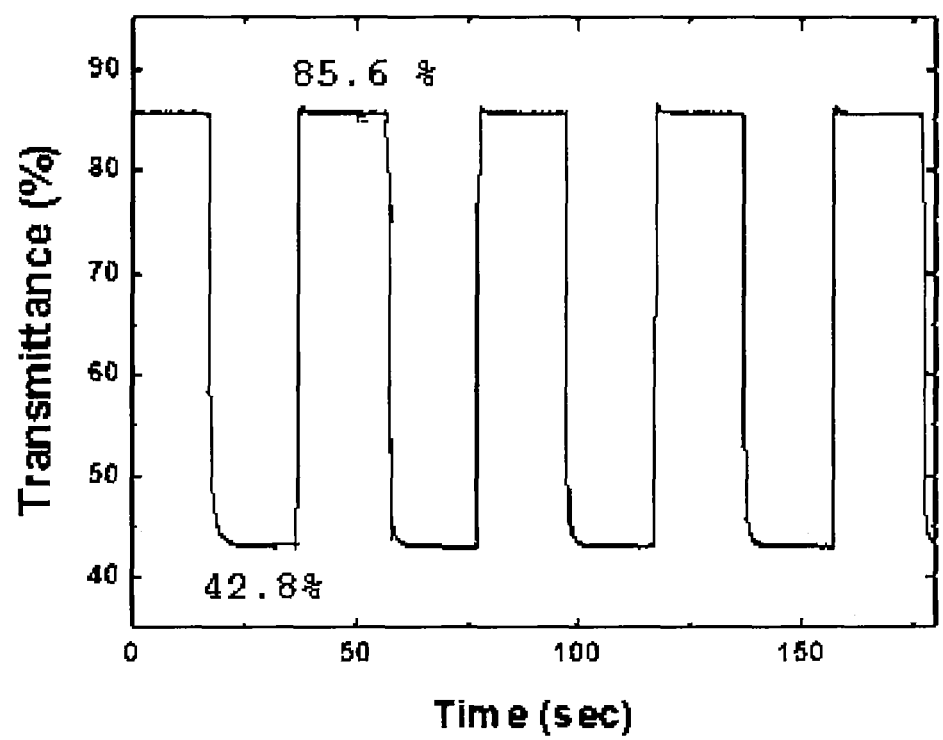

FIG. 22 is a diagram showing a difference in the transmittance between a colorated state and a bleached state of Example 2. A difference in the transmittance between the colorated state and the bleached state was 42.8%, which was not much different from Comparative Example 2 having no carbon nanotube mixing (change in transmittance was not big even when carbon nanotube was introduced). However, the coloration speed was 0.4 seconds and the bleaching speed was 0.4 seconds, which identified that the electrochromic speed became superior when compared to Comparative Example 2.

Figure 23:
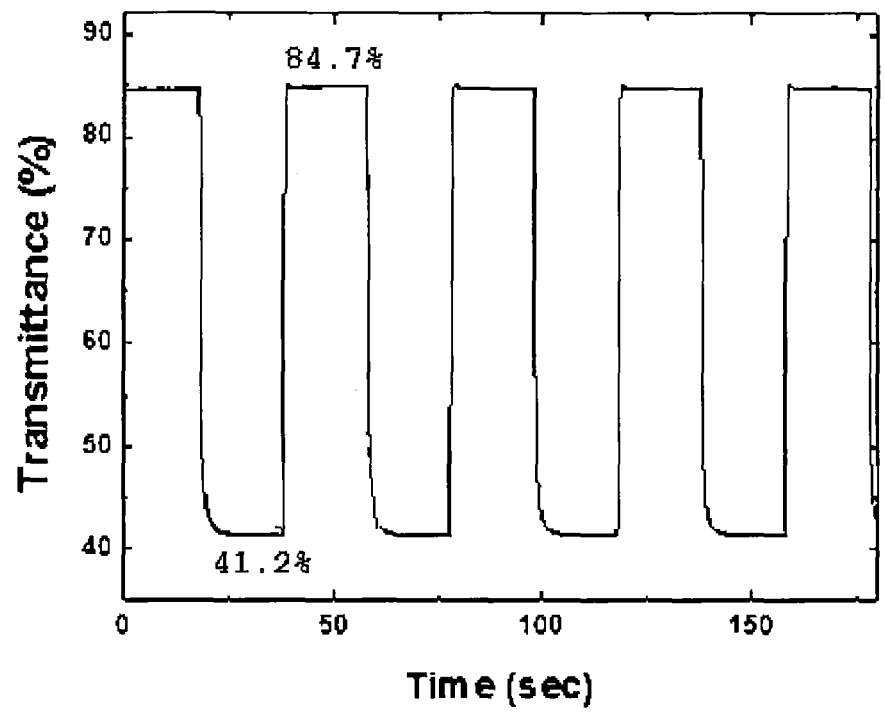

FIG. 23 is a diagram showing a difference in the transmittance between a colorated state and a bleached state of Example 3. A difference in the transmittance between the colorated state and the bleached state was 43.5%, which was not much different from Comparative Example 2 having no carbon nanotube mixing (change in transmittance was not big even when carbon nanotube was introduced). However, the coloration speed was 0.5 seconds and the bleaching speed was 1.1 seconds, which identified that the electrochromic speed became superior when compared to Comparative Example 2.

Figure 24:
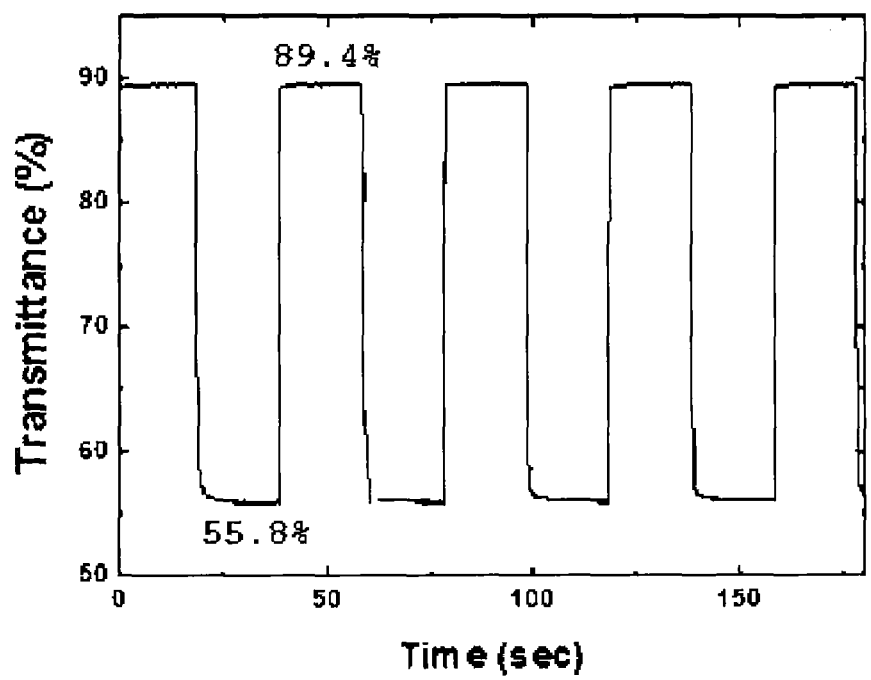

FIG. 24 is a diagram showing a difference in the transmittance between a colorated state and a bleached state of Example 4. A difference in the transmittance between the colorated state and the bleached state was 33.6%, and the coloration speed was 0.4 seconds and the bleaching speed was 0.5 seconds, which identified that the electrochromic speed became superior when compared to Comparative Example 2.

Figure 25:
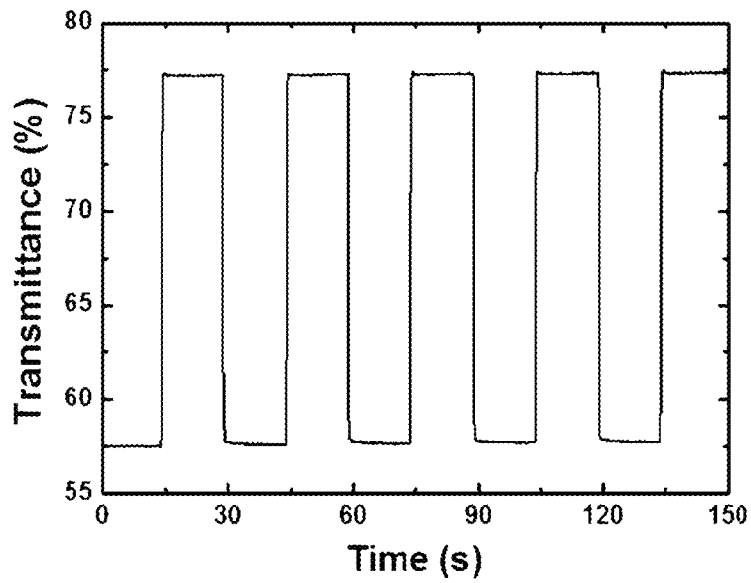

FIG. 25 is a diagram showing a difference in the transmittance between a colorated state and a bleached state of Example 5. A difference in the transmittance between the colorated state and the bleached state was 19.5%, and the coloration speed was 0.19 seconds and the bleaching speed was 0.47 seconds, which identified that the electrochromic speed became superior when compared to Comparative Example 2.

When comparing Examples 2 to 5 and Comparative Example 2, carbon nanotube-based electrochromism has a disadvantage in that transmittance is not favorable in a colorated state, however, since the poly(3-hexylthiophene) (P3HT)-wrapped carbon nanotube was introduced in a small amount, transmittance in the colorated state of Examples 2 to 4 was not much different compared to Comparative Example 2.

In addition, when introducing the poly(3-hexylthiophene) (P3HT)-wrapped carbon nanotube, it was identified that the time taken to bleach in a state having a color and the time taken to change to have a color in a bleached state were faster. This is considered to be due to the fact that the coloration speed and the bleaching speed become faster due to a faster migration speed of charges obtained from carbon nanotube introduction. In other words, improvements in the switching speed was identified.

The coloration speed means time taken to have a color in a bleached state-time taken to become less than 5% of a final color (transmittance). For example, when transmittance in a state having a color is 0% and transmittance in a bleached state is 100%, the time taken to change from 100% to 5% is a coloration speed.

The bleaching speed means time taken to bleach in a state having a color-time taken to become less than 5% of a final bleach. For example, assuming that transmittance in a state having a color is 0% and transmittance in a bleached state is 100%, the time taken to change from 0% to 95% is a bleaching speed.

What is claimed is:

1. An electrochromic composite comprising:
   an organic compound having electrochromic properties; and
   a polymer-covered carbon nanotube comprising a carbon nanotube having at least a portion of a surface of the carbon nanotube covered by a polymer, wherein the organic compound having electrochromic properties includes a compound of Chemical Formula 3:

[Chemical Formula 3]

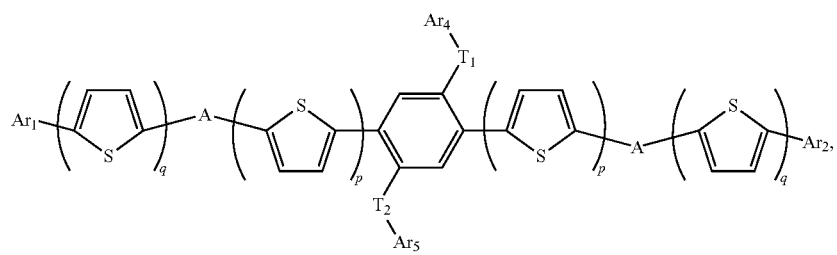

wherein
Ar₁ and Ar₂ are the same as or different from each other, and each is independently a group functioning as an electron acceptor;
Ar₄ and Ar₅ are the same as or different from each other, and each is independently hydrogen, deuterium, halogen, a substituted or unsubstituted alkyl group, substituted or unsubstituted aryl group, a substituted or unsubstituted alkoxy group, or SiRR'R";
A is a substituted or unsubstituted arylene group or a substituted or unsubstituted heteroarylene group;
T₁ and T₂ are the same as or different from each other, and each is independently a direct bond, O, or S;
R, R' and R" are the same as or different from each other, and each is independently hydrogen, deuterium, a halogen group, a nitrile group, a nitro group, an imide group, an amide group, a hydroxyl group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted alkylamine group, a substituted or unsubstituted aralkylamine group, a substituted or unsubstituted arylamine group, a substituted or unsubstituted heteroarylamine group, a substituted or unsubstituted aryl group, or a substituted or unsubstituted heteroaryl group; and
p and q are each an integer of 1 to 5.

2. The electrochromic composite of claim 1, wherein the polymer is spirally wrapped around the carbon nanotube.

3. The electrochromic composite of claim 1, wherein the organic compound and the polymer-covered carbon nanotube have a weight ratio of 10:1 to 400:1 (organic compound:polymer-covered carbon nanotube).

4. The electrochromic composite of claim 1, wherein the polymer comprises one or more selected from the group consisting of thiophene-based polymers and fluorene-based polymers.

5. The electrochromic composite of claim 1, wherein the polymer is present in an amount of 30 parts by weight to 200 parts by weight with respect to 100 parts by weight of the carbon nanotube based on a solid content.

6. The electrochromic composite of claim 1, wherein the polymer has a weight average molecular weight of 3,000 g/mol to 1,000,000 g/mol.

7. The electrochromic composite of claim 1, wherein Ar₁ and Ar₂ are the same as or different from each other, and each independently has a structure selected from:

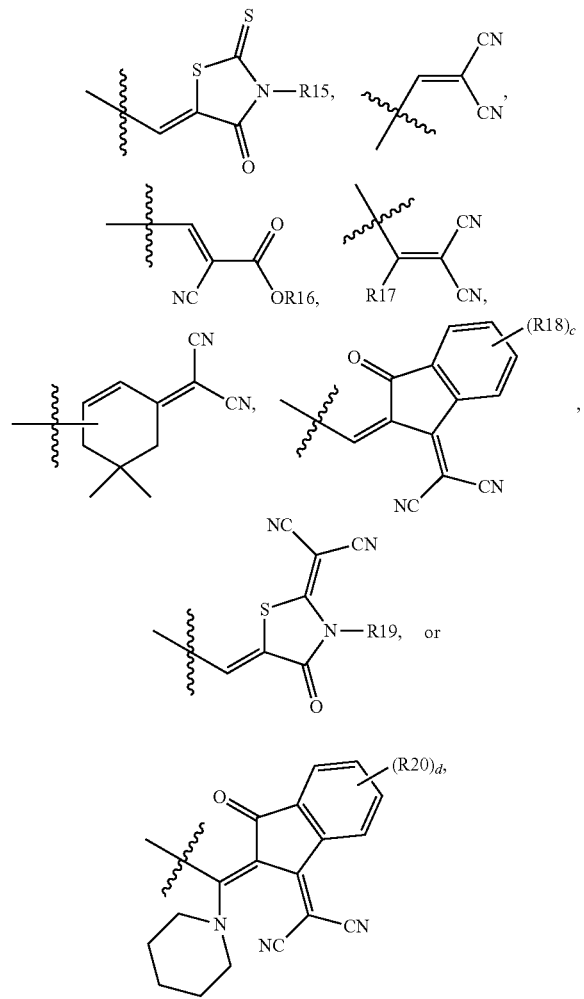

wherein:

c and d are an integer of 1 to 4;

when c and d are 2 or greater, structures in the two or more parentheses are the same as or different from each other; and each R15 to R20 are the same as or different from each other, and each independently is hydrogen, deuterium, a halogen group, a nitrile group, a nitro group, an imide group, an amide group, a hydroxyl group, a substituted or unsubstituted alkyl group, a substituted or unsubstituted cycloalkyl group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted alkenyl group, a substituted or unsubstituted silyl group, a substituted or unsubstituted boron group, a substituted or unsubstituted alkylamine group, a substituted or unsubstituted aralkylamine group, a substituted or unsubstituted arylamine group, a substituted or unsubstituted heteroarylamine group, a substituted or unsubstituted aryl group, or a substituted or unsubstituted heteroaryl group.

8. The electrochromic composite of claim 1, wherein the organic compound having electrochromic properties is one of the following compounds:

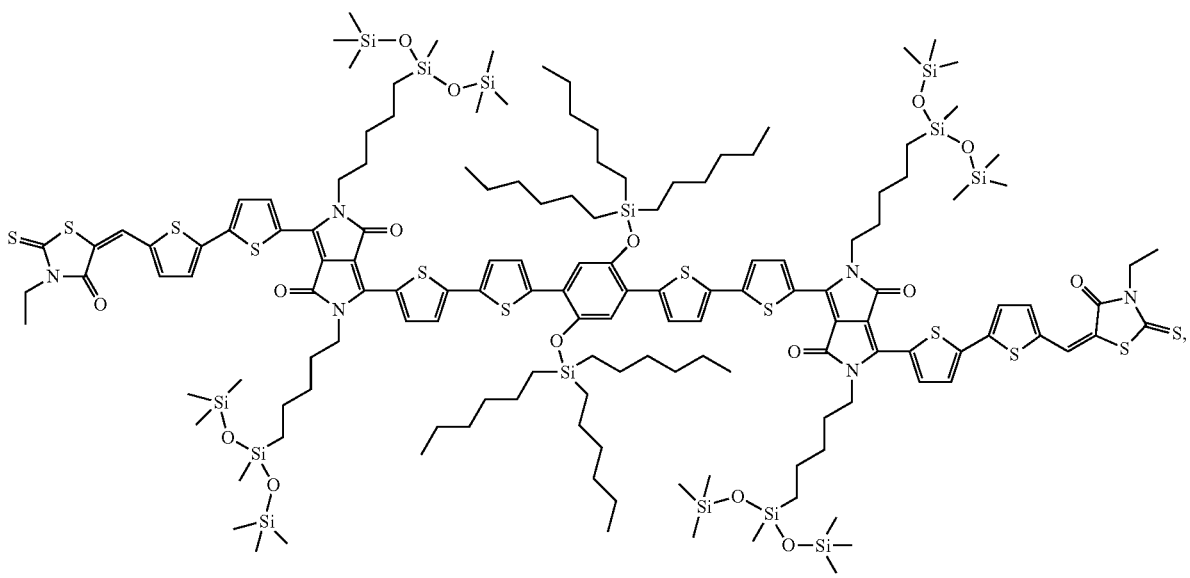 [SMILES: CCCCCC[Si](CCCCCC)(CCCCCC)Oc1cc(-c2ccc(-c3ccc(C4=C5C(=O)N(CCCCC[Si](C)(O[Si](C)(C)C)O[Si](C)(C)C)C(c6ccc(-c7ccc(/C=C8/SC(=S)N(CC)C8=O)s7)s6)=C5C(=O)N4CCCCC[Si](C)(O[Si](C)(C)C)O[Si](C)(C)C)s3)s2)c(O[Si](CCCCCC)(CCCCCC)CCCCCC)cc1-c1ccc(-c2ccc(C3=C4C(=O)N(CCCCC[Si](C)(O[Si](C)(C)C)O[Si](C)(C)C)C(c5ccc(-c6ccc(/C=C7/SC(=S)N(CC)C7=O)s6)s5)=C4C(=O)N3CCCCC[Si](C)(O[Si](C)(C)C)O[Si](C)(C)C)s2)s1]

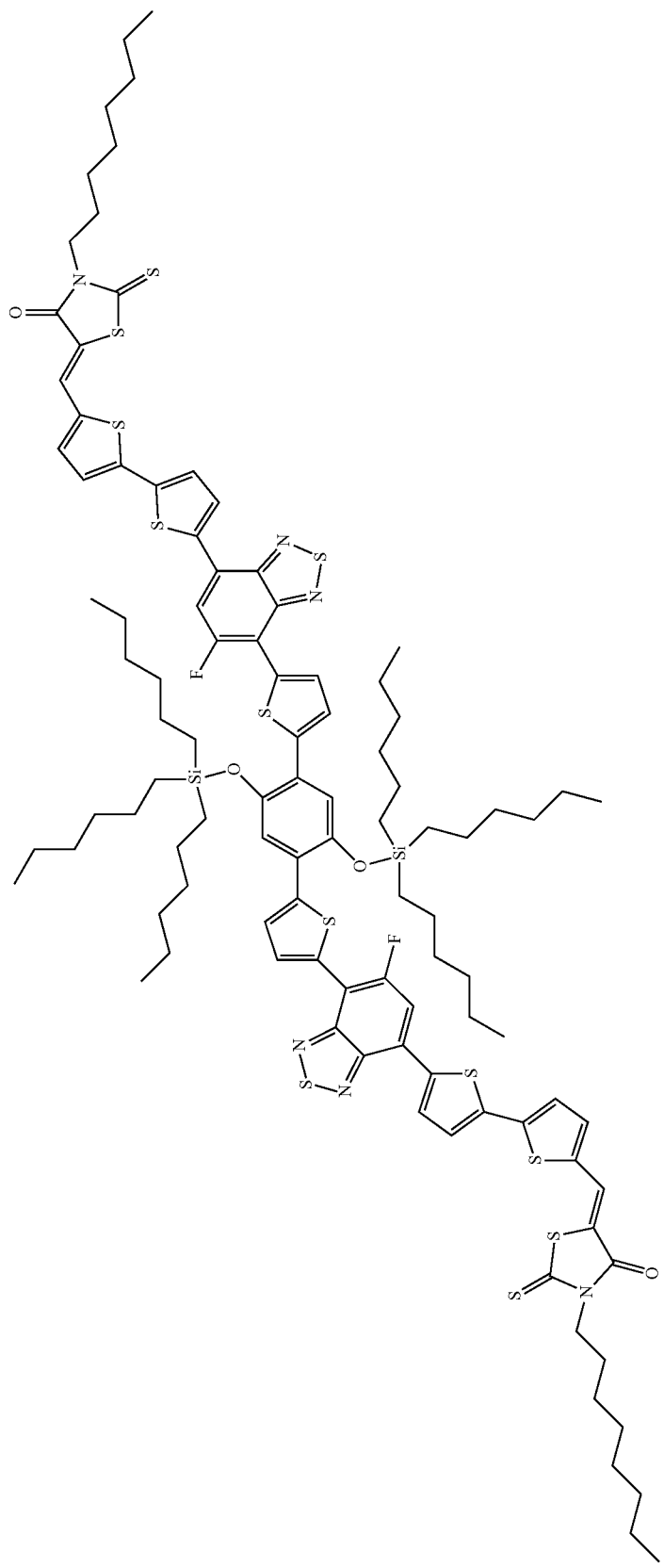

or

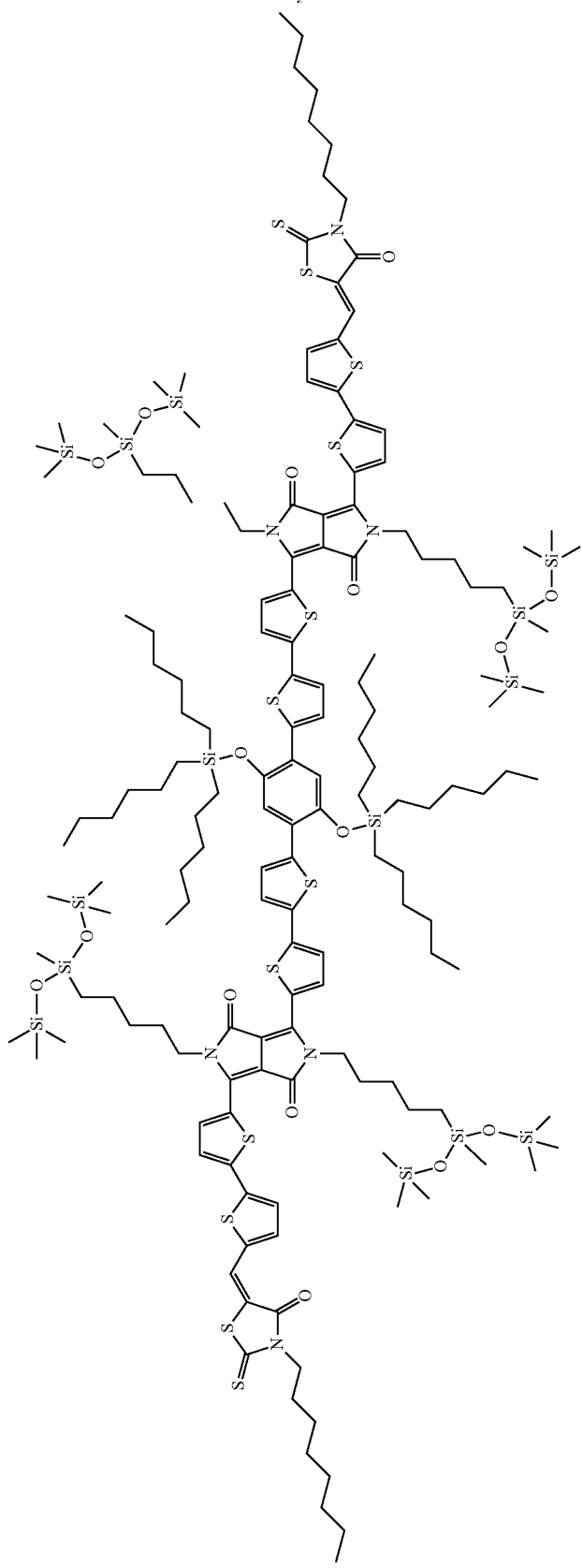

9. An electrochromic device comprising:
a first electrode;
a second electrode provided on the first electrode;
an electrolyte layer provided between the first electrode and the second electrode; and
an electrochromic layer provided between the electrolyte layer and the second electrode,
wherein the electrochromic layer comprises the electrochromic composite of claim 1.

10. The electrochromic device of claim 9, wherein the electrochromic layer has a thickness of 20 nm to 1 μm.

11. A method for manufacturing an electrochromic device comprising:
providing a first electrode;
forming a second electrode on the first electrode;
forming an electrolyte layer between the first electrode and the second electrode; and
forming an electrochromic layer between the electrolyte layer and the second electrode,
wherein the electrochromic layer comprises the electrochromic composite of claim 1.

12. The method for manufacturing an electrochromic device of claim 11, wherein the forming of the electrochromic layer comprises a solution process.

* * * * *